United States Patent
Nakagawa et al.

(10) Patent No.: US 9,960,955 B2
(45) Date of Patent: May 1, 2018

(54) INFORMATION PROCESSING SYSTEM, SWITCHING DEVICE, AND METHOD FOR CONTROLLING INFORMATION PROCESSING SYSTEM

(71) Applicant: FUJITSU LIMITED, Kawasaki-shi, Kanagawa (JP)

(72) Inventors: Yukihiro Nakagawa, Kawasaki (JP); Kazuki Hyoudou, Chofu (JP)

(73) Assignee: FUJITSU LIMITED, Kawasaki (JP)

( * ) Notice: Subject to any disclaimer, the term of this patent is extended or adjusted under 35 U.S.C. 154(b) by 275 days.

(21) Appl. No.: 14/530,946

(22) Filed: Nov. 3, 2014

(65) Prior Publication Data
US 2015/0124591 A1  May 7, 2015

(30) Foreign Application Priority Data
Nov. 6, 2013 (JP) .................... 2013-230394

(51) Int. Cl.
*H04L 12/24* (2006.01)
(52) U.S. Cl.
CPC .......... *H04L 41/0659* (2013.01); *H04L 41/12* (2013.01)
(58) Field of Classification Search
CPC .................. H04L 41/0654; H04L 41/0659
See application file for complete search history.

(56) References Cited

U.S. PATENT DOCUMENTS

| | | | |
|---|---|---|---|
| 2003/0056001 A1 | 3/2003 | Mate et al. | |
| 2006/0253606 A1 | 11/2006 | Okuno | |
| 2007/0177589 A1 | 8/2007 | Endo | |
| 2011/0173492 A1* | 7/2011 | Le Roux | H04L 45/00 714/4.11 |
| 2011/0261723 A1 | 10/2011 | Yamato et al. | |

(Continued)

FOREIGN PATENT DOCUMENTS

| JP | 2004-522383 | 7/2004 |
|---|---|---|
| JP | 2006-313949 | 11/2006 |

(Continued)

OTHER PUBLICATIONS

Japanese Office Action dated May 16, 2017 for corresponding Japanese Patent Application No. 2013-230394, with Partial English Translation, 5 pages.

*Primary Examiner* — Sulaiman Nooristany
(74) *Attorney, Agent, or Firm* — Fujitsu Patent Center

(57) ABSTRACT

An information processing system includes a switching device group including a plurality of switching devices that include a switching device as a root node and switching devices as leaf nodes and are connected in a tree topology. The switching device includes: a controller that, when a failure that occurs in a communication path connected to the root node side of the switching device is detected, writes identification information indicating the communication path from which the failure is detected to a flow table which stores the identification information and output destination port information so as to be associated with each other, thereby switching a plurality of communication paths; and a notification unit that, when a failure that occurs in a communication path connected to the leaf node side of the switching device is detected, notifies another switching device connected to the switching device of a position where the failure occurs.

12 Claims, 41 Drawing Sheets

(56) References Cited

U.S. PATENT DOCUMENTS

| | | | |
|---|---|---|---|
| 2012/0044813 A1* | 2/2012 | Nandagopal | H04L 45/28 370/242 |
| 2015/0063361 A1* | 3/2015 | Hamada | H04L 45/44 370/400 |
| 2015/0207675 A1* | 7/2015 | Hayashi | H04L 45/38 370/225 |

FOREIGN PATENT DOCUMENTS

| | | |
|---|---|---|
| JP | 2007-208369 | 8/2007 |
| WO | 03/012672 | 2/2003 |
| WO | 2011/043379 A1 | 4/2011 |

\* cited by examiner

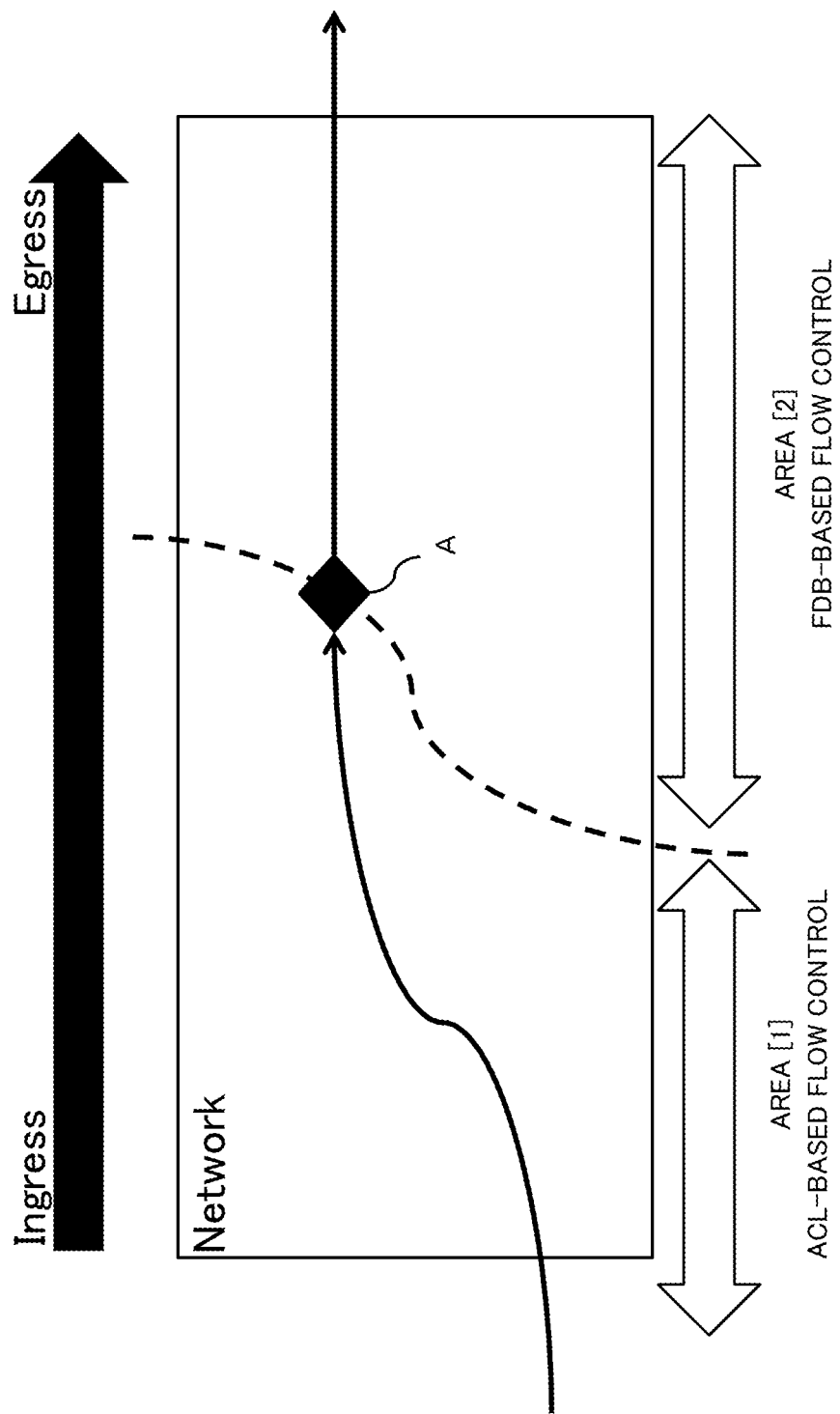

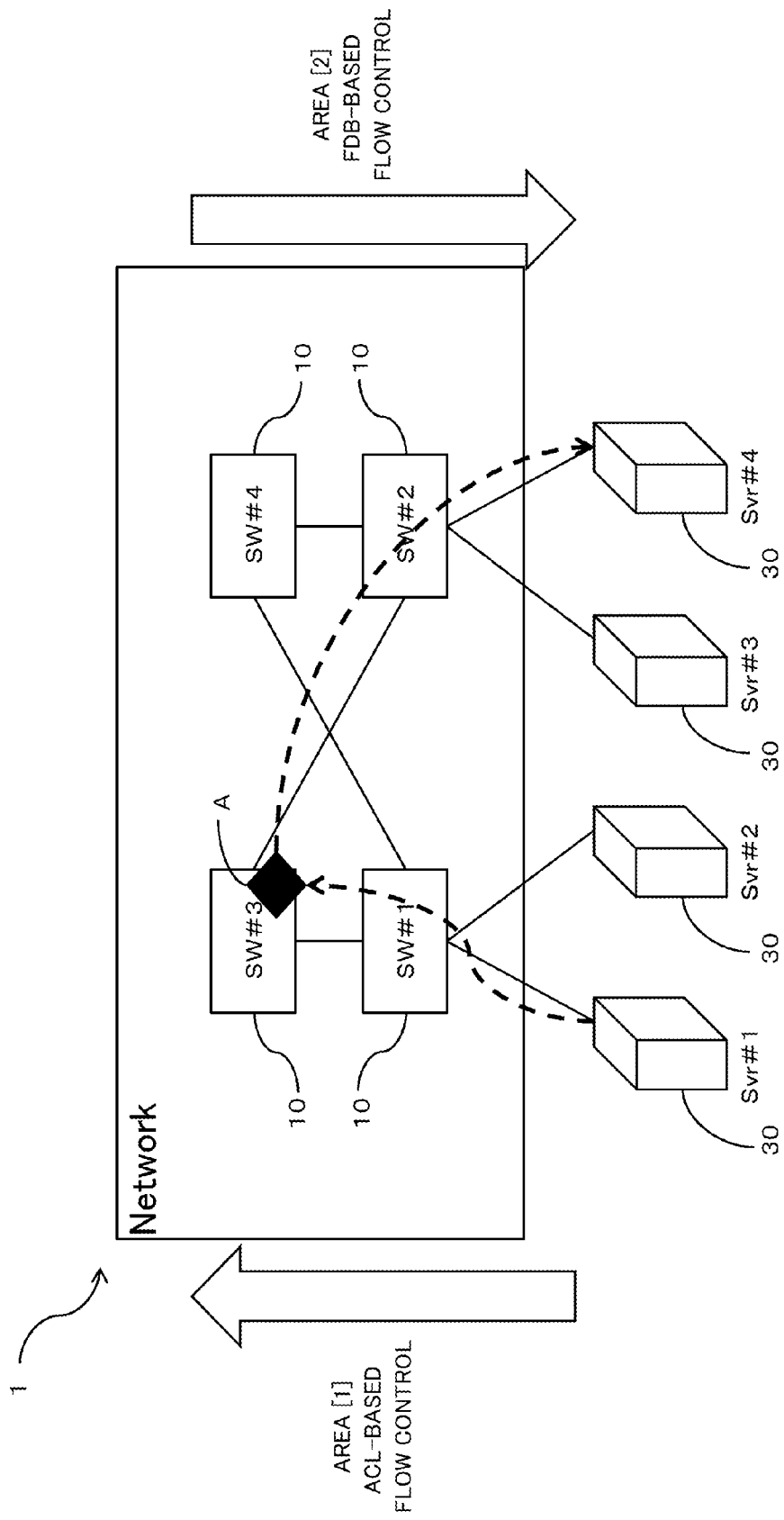

FIG. 7A

Rule: | Ingress Port | MAC src | MAC dst | Ether type | VLAN ID | VLAN pri | IP src | IP dst | IP proto | IP ToS | L4 sport | L4 dport |

FIG. 7B

Action: If L4 TCP/UDP src port matches, forward packet to port (path selection)

FIG. 8A

Rule

| Ingress Port | MAC src | MAC dst | Ether type | VLAN ID | VLAN pri | IP src | IP dst | IP proto | IP ToS | L4 sport | L4 dport |

FIG. 8B

Action

| If MAC dst matches, forward packet to port |

FIG. 20

| FAILURE | Failure Id |
|---|---|
| P3 LINK DOWN | 20 (SW21-P1 down) |
| P4 LINK DOWN | 21 (SW12-P4 down) |

FIG. 23

```
Algorithm: Make Flow List for EMT
Input: Network topology tree T
1. flow list L = {}
2. For each root-node r of T // multiple root exist in Fat-tree
3.      SearchTree(r)
4. Return L
function SearchTree(n)
5. If(node-type(n) == Server) Return { node-id(n) } // leaf machine
6. Else S = {}
7.      For each subtree v of n
8.          p = connected-port(n, v) // port No. of n, which is connected to v
9.          Sv = SearchTree(v)
10.         For each element e of Sv
11.             L = L + [ { id=>node-id(n), op=>Add, rule==e, act=Forward to p } ]
12.         S = S + Sv
13. Return S
```

FIG. 37

| | Back to Back STRUCTURE | | Fat Tree STRUCTURE | |
|---|---|---|---|---|
| | RELATED ART | EXAMPLE OF THIS EMBODIMENT | RELATED ART | EXAMPLE OF THIS EMBODIMENT |
| #VTEP or #host (h) | 2 | 2 | 8 | 8 |
| #VM per host (v) | 8 | 8 | 8 | 8 |
| max. #host underneath of switch (s) | 1 | 1 | 8 | 2 |
| #server-facing port of switch (p) | 1 | 1 | 2 | 2 |
| #multipath per switch (m) | 2 | 2 | 2 | 2 |
| max. #path on switch (t= h*(h−1)*v*v) | 128 | 128 | 3584 | 3584 |
| max. #FDB entries per switch (f) | 128 (=t) | 1 (=s) | — | 8 (=s) |
| max. #ACL entries per switch (a) | 128 (=t) | 2 (=m*p) | 3584 (=t) | 4 (=m*p) |
| Total # Flow table entries per switch (f+a) | 128 | 3 | 3584 | 12 |

FIG. 40

| | Back to Back STRUCTURE | | Fat Tree STRUCTURE | |
|---|---|---|---|---|
| | RELATED ART | MODIFICATION OF THIS EMBODIMENT | RELATED ART | MODIFICATION OF THIS EMBODIMENT |
| #VTEP or #host (h) | 2 | 2 | 8 | 8 |
| #VM per host (v) | 8 | 8 | 8 | 8 |
| max. #host underneath of switch (s) | 1 | 1 | 8 | 8 |
| #server-facing port of switch (p) | 1 | 1 | 2 | 2 |
| #multipath per switch (m) | 2 | 2 | 2 | 2 |
| max. #path on switch (t= h*(h−1)*v*v) | 128 | 128 | 3584 | 3584 |
| max. #FDB entries per switch (f) | − | 16 (=v*s) | − | 64 (=v*s) |
| max. #ACL entries per switch (a) | 128 (=t) | 2 (=m*p) | 3584 (=t) | 4 (=m*p) |
| Total # Flow table entries per switch (f+a) | 128 | 18 | 3584 | 68 |

FIG. 41A

| L4 sport | Port |
|---|---|
| 0 | P3 |
| 1 | P4 |

| L4 sport | Port |
|---|---|
| 0 | P4 |
| 1 | P4 |

230

INFORMATION PROCESSING SYSTEM, SWITCHING DEVICE, AND METHOD FOR CONTROLLING INFORMATION PROCESSING SYSTEM

CROSS-REFERENCE TO RELATED APPLICATION

This application is based upon and claims the benefit of priority of the prior Japanese Patent application No. 2013-230394, filed on Nov. 6, 2013, the entire contents of which are incorporated herein by reference.

FIELD

The embodiments discussed herein are related to an information processing system, a switching device, and a method for controlling an information processing system.

BACKGROUND

There is OpenFlow as a unified management mechanism in which a centralized controller performs multi-layer flow control. OpenFlow refers to a packet field and a rule which defines a flow with wildcards to identify the flow. Therefore, it is possible to control at a flow level.

In the operation of an information processing system using OpenFlow, a packet transmission path is switched at a high speed when a link failure occurs to make the system redundant.

A technique has been known in which a switch that has detected the occurrence of a link failure notifies a controller of the occurrence of the link failure and another switch inquires of the controller about the link failure and receives information about the link failure.

For example, the following technique has been known as a response to the occurrence of a link failure.

A switch which is the upper node of a link with a failure and a switch which is the lower node of the link detect the failure. The switch, which is the upper node, and the switch, which is the lower node, update information about the number of normal ports. The switch, which is the upper node, transmits the updated information about the number of normal ports to switches which are other adjacent lower nodes. The switch which is the lower node that detects the failure updates a packet transmission table on the basis of the updated number of normal ports.

[Patent Document 1] Japanese National Publication of International Patent Application No. 2004-522383

[Patent Document 2] Japanese Laid-open Patent Publication No. 2006-313949

[Patent Document 3] Japanese Laid-open Patent Publication No. 2007-208369

However, the above-mentioned technique has a problem that it is difficult to switch paths at a high speed when a failure occurs. In addition, the above-mentioned technique has a problem that it is difficult to switch paths considering the state of a link.

SUMMARY

Therefore, according to an aspect of an embodiment, an information processing system includes a switching device group including a plurality of switching devices that include a switching device as a root node and switching devices as leaf nodes which are connected to an information processing apparatus, the plurality of switching devices being connected in a tree topology. The switching device includes: a controller that, when a failure that occurs in a communication path connected to the root node side of the switching device is detected, writes identification information indicating the communication path from which the failure is detected to a flow table which stores the identification information and output destination port information indicating a communication path of an output destination of a packet so as to be associated with each other, thereby switching a plurality of communication paths; and a notification unit that, when a failure that occurs in a communication path connected to the leaf node side of the switching device is detected, notifies another switching device connected to the switching device of a position where the failure occurs.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating flow control in the network system as an example of the embodiment;

FIG. 6 is a diagram illustrating flow control in the network system as an example of the embodiment;

FIG. 7A is a diagram illustrating a rule field in ACL-based flow definition which is used by the network system as an example of the embodiment;

FIG. 7B is a diagram illustrating an action field in the ACL-based flow definition which is used by the network system as an example of the embodiment;

FIG. 8A is a diagram illustrating a rule field in FDB-based flow definition which is used by the network system as an example of the embodiment;

FIG. 8B is a diagram illustrating an action field in the FDB-based flow definition which is used by the network system as an example of the embodiment;

FIG. 20 is a diagram illustrating a failure ID table in the network system as an example of the embodiment;

FIG. 23 is a diagram illustrating an algorithm which is used in a flow list creation process in the network system as an example of the embodiment;

FIG. 37 is a diagram illustrating the numbers of entries used in the network system according to the related art and the network system as an example of this embodiment;

FIG. 40 is a diagram illustrating the numbers of entries used in the network system according to the related art and in the network systems according to the first and second modifications of the embodiment;

FIG. 41A is a diagram illustrating a state before an ACL table is rewritten in a switch according to a third modification of the embodiment; and FIG. 41B is a diagram illustrating a state after the ACL table is rewritten in the switch according to the third modification of the embodiment.

DESCRIPTION OF EMBODIMENTS

Figure 1:
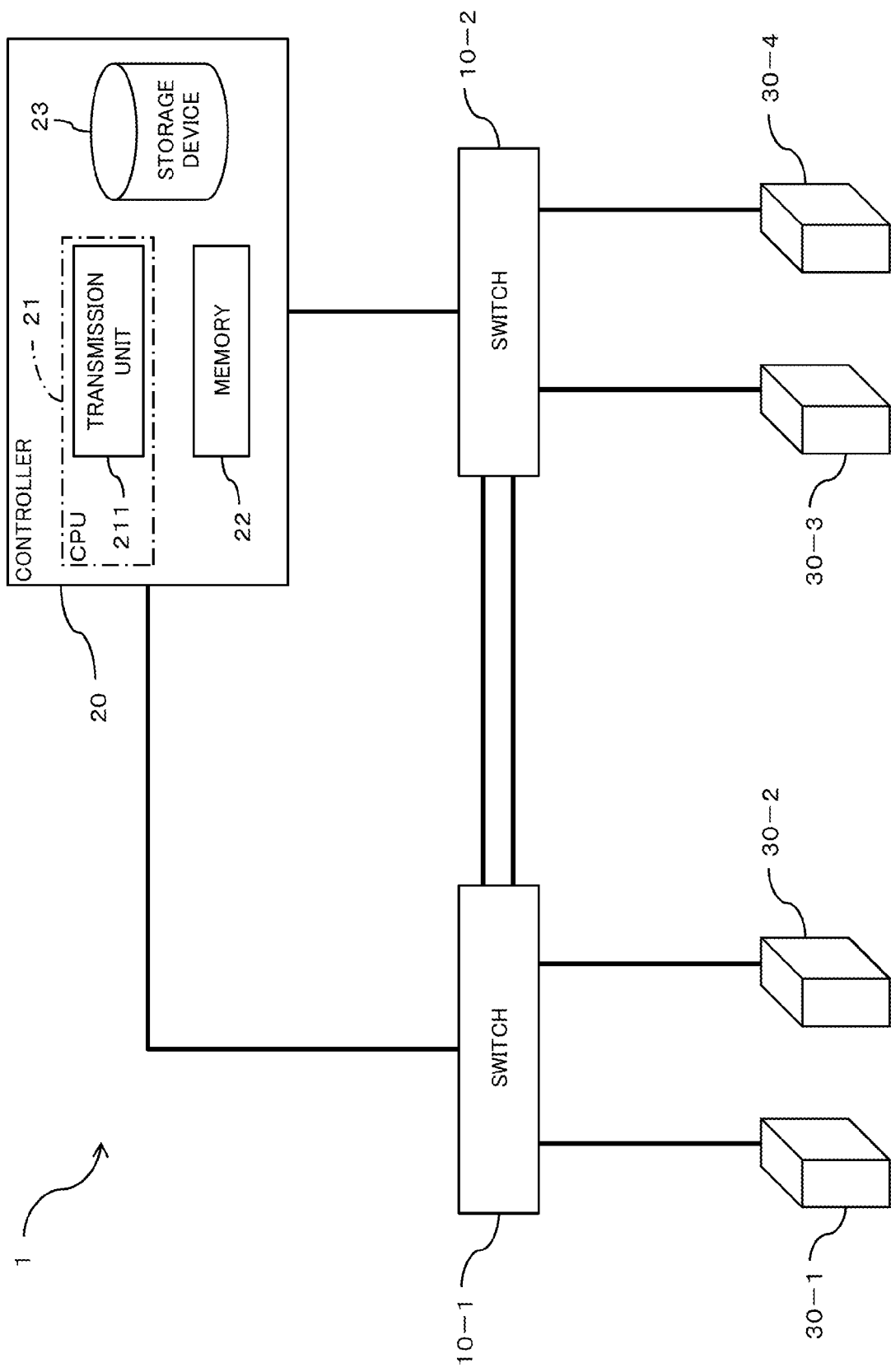
FIG. 1 is a diagram schematically illustrating the functional structure of a network system as an example of an embodiment.

Hereinafter, an information processing system, a switching device, and an information processing system control method according to embodiments will be described with reference to the drawings. However, the following embodiments are just illustrative and the application of various modifications or techniques which are not described in the embodiments is not excluded from the invention. That is, various modifications and changes of the embodiments can be made without departing from the scope and spirit of the embodiments.

The drawings do not include only the components illustrated therein, but can include other functional components.

In the drawings, the same components are denoted by the same reference numerals and the description thereof will not be repeated.

[A] Example of Embodiment

[A-1] Structure of System

FIG. 1 is a diagram schematically illustrating the functional structure of a network system as an example of the embodiment.

A network system (information processing system) 1 as an example of this embodiment includes switches (switching devices) 10-1 and 10-2, a controller (network control device) 20, and server apparatuses (transmission/reception devices and information processing apparatuses) 30-1 to 30-4, as illustrated in FIG. 1. Each of the server apparatuses 30-1 to 30-4 is communicably connected to other server apparatuses 30-1 to 30-4 through one or two switches 10-1 and 10-2. For example, the server apparatus 30-1 is communicably connected to the server apparatus 30-2 through the switch 10-1. In addition, the server apparatus 30-1 is communicably connected to the server apparatus 30-3 through the switches 10-1 and 10-2.

Hereinafter, as reference numerals indicating the switches, reference numerals 10-1 and 10-2 are used to specify one of a plurality of switches and reference numeral 10 is used to designate an arbitrary switch. In addition, hereinafter, as reference numerals indicating the server apparatuses, reference numerals 30-1 to 30-4 are used to specify one of a plurality of server apparatuses and reference numeral 30 is used to designate an arbitrary server apparatus.

The server apparatus 30 is, for example, a computer having a server function. In the example illustrated in FIG. 1, the network system 1 includes four server apparatuses 30-1 to 30-4. However, the network system 1 may include three or less server apparatuses 30 or five or more server apparatuses 30.

The controller 20 controls a plurality of switches 10 and sets settings for flow control to each switch 10. As illustrated in FIG. 1, the controller 20 includes a central processing unit (CPU) 21, a memory 22, and a storage device 23.

The storage device 23 is a known device which stores data such that data can be read or written and is, for example, a hard disk drive (HDD) or a solid state drive (SSD). In an example of this embodiment, the storage device 23 stores, for example, a flow list 100 (setting data; which will be described with reference to, for example, FIG. 3).

The memory 22 is a storage device including a read only memory (ROM) and a random access memory (RAM). A program, such as a basic input/output system (BIOS), is written to the ROM of the memory 22. A software program on the memory 22 is appropriately read by the CPU 21 and is then executed. The RAM of the memory 22 is used as a primary recording memory or a working memory.

The CPU 21 is a processing device which performs various control or calculation processes and executes an OS or a program stored in the memory 22 to implement various functions. That is, the CPU 21 functions as a transmission unit 211, as illustrated in FIG. 1.

A program (control program) for implementing the functions of the transmission unit 211 is recorded on a computer-readable recording medium, such as a flexible disk, a CD (for example, CD-ROM, CD-R, and CD-RW), a DVD (for example, DVD-ROM, DVD-RAM, DVD-R, DVD+R, DVD-RW, DVD+RW, and HD DVD), a Blu-ray disc, a magnetic disk, an optical disk, or a magneto-optical disk, and is then provided. The computer reads the program from the recording medium through a reading device (not illustrated), transmits the program to an internal recording device or an external recording device, stores the program in the recording device, and uses the program. Alternatively, the program may be recorded on a storage device (recording medium), such as a magnetic disk, an optical disk, or a magneto-optical disk, and then provided from the storage device to the computer through a communication path.

When the functions of the transmission unit 211 are implemented, the program stored in the internal storage device (the memory 22 in this embodiment) is executed by a microprocessor (the CPU 21 in this embodiment) of the computer. In this case, the computer may read the program recorded on the recording medium and execute the program.

The transmission unit 211 transmits, to a plurality of switches 10, rule information for packet transmission according to a plurality of packet transmission control methods. Specifically, the transmission unit 211 reads the flow list 100 stored in the storage device 23 and transmits the rule information included in the flow list 100 to a target switch 10. In addition, the transmission unit 211 sets an ACL table 220 (which will be described with reference to FIG. 19) to each switch 10 such that the switches autonomously perform path switching considering the failure state of a link.

Figure 2:
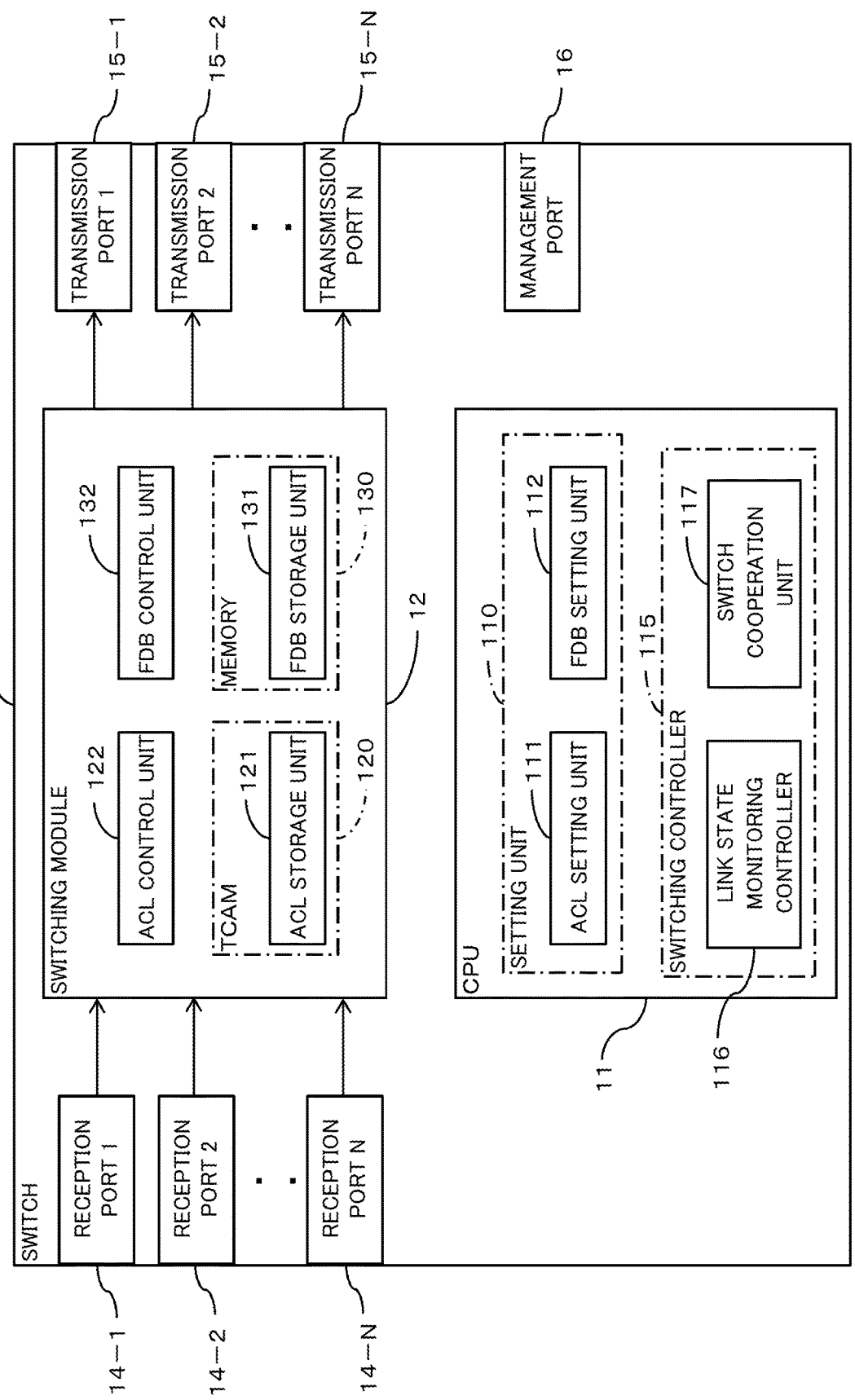
FIG. 2 is a diagram schematically illustrating the functional structure of a switch provided in the network system as an example of the embodiment.

FIG. 2 is a diagram schematically illustrating the functional structure of the switch included in the network system as an example of the embodiment.

The switch 10 transmits packets which are transmitted and received between the server apparatuses 30. The switch 10 includes a CPU 11, a switching module 12, reception ports 14-1 to 14-N (hereinafter, N is an integer equal to or greater than 1), transmission ports 15-1 to 15-N, and a management port 16, as illustrated in FIG. 2.

Hereinafter, as reference numerals indicating the reception ports, reference numerals 14-1 to 14-N are used to specify one of a plurality of reception ports and reference numeral 14 is used to designate an arbitrary reception port. In addition, hereinafter, as reference numerals indicating the transmission ports, reference numerals 15-1 to 15-N are used to specify one of a plurality of transmission ports and reference numeral 15 is used to designate an arbitrary transmission port.

The reception port 14 is an interface for receiving packets which are transmitted from other devices. Specifically, the reception port 14 is communicably connected to other switches 10 or the server apparatuses 30 and receives packets transmitted from other switches 10 or the server apparatuses 30. For example, the reception port 14 provided in the switch 10-1 illustrated in FIG. 1 is communicably connected to the switch 10-2 and the server apparatuses 30-1 and 30-2.

The transmission port 15 is an interface for transmitting packets to other devices. Specifically, the transmission port 15 is communicably connected to other switches 10 or the server apparatuses 30 and transmits packets to other switches 10 or the server apparatuses 30. For example, the transmission port 15 provided in the switch 10-1 illustrated in FIG. 1 is communicably connected to the switch 10-2 and the server apparatuses 30-1 and 30-2.

The management port 16 is an interface that is communicably connected to the controller 20, receives data transmitted from the controller 20, and transmits data to the controller 20. In an example of this embodiment, the management port 16 receives the flow list 100 transmitted from the transmission unit 211 of the controller 20. In addition, the management port 16 transmits, to the controller 20, the setting result of the switch 10 which is performed on the basis of the received flow list 100.

The CPU 11 is a processing device that performs various control or calculation processes, executes an operating system (OS) or a program stored in a memory (not illustrated) or a memory 130, which will be described below, of the switching module 12 to implement various functions. That is, as illustrated in FIG. 2, the CPU 11 functions as a setting unit 110 (an ACL setting unit 111 and an FDB setting unit 112), and a switching controller 115 (a link state monitoring controller 116 and a switch cooperation unit 117).

A program for implementing the functions of the setting unit 110 (the ACL setting unit 111 and the FDB setting unit 112) and the switching controller 115 (the link state monitoring controller 116 and the switch cooperation unit 117) is recorded on a computer-readable recording medium, such as a flexible disk, a CD (for example, CD-ROM, CD-R, and CD-RW), a DVD (for example, DVD-ROM, DVD-RAM, DVD-R, DVD+R, DVD-RW, DVD+RW, and HD DVD), a Blu-ray disc, a magnetic disk, an optical disk, or a magneto-optical disk, and is then provided. The computer reads the program from the recording medium through a reading device (not illustrated), transmits the program to the internal recording device or the external recording device, stores the program in the recording device, and uses the program.

Alternatively, the program may be recorded on a storage device (recording medium), such as a magnetic disk, an optical disk, or a magneto-optical disk, and then provided from the storage device to the computer through a communication path.

When the functions of the setting unit 110 (the ACL setting unit 111 and the FDB setting unit 112) and the switching controller 115 (the link state monitoring controller 116 and the switch cooperation unit 117) are implemented, the program stored in the internal storage device (a memory (not illustrated) or the memory 130 included in the switching module 12 in this embodiment) is executed by the microprocessor (the CPU 11 in this embodiment) of the computer. In this case, the computer may read the program recorded on the recording medium and execute the program.

As illustrated in FIG. 2, the setting unit 110 functions as the ACL setting unit 111 and the FDB setting unit 112.

The ACL setting unit 111 sets a flow table related to flow control based on an access control list (ACL). Specifically, the ACL setting unit 111 registers ACL tables (first rule information; which will be described below with reference to, for example, FIGS. 14 and 19) 200 and 220 for controlling the transmission of packets based on the ACL, among a plurality of packet transmission control methods, on the basis of the flow list 100 received from the transmission unit 211 of the controller 20.

The FDB setting unit 112 sets a flow table related to flow control based on a forwarding database (FDB). Specifically, the FDB setting unit 112 registers an FDB table (second rule information; which will be described below with reference to, for example, FIG. 14) 300 for controlling the transmission of packets based on the FDB, which is different from the ACL, among a plurality of packet transmission control methods, on the basis of the flow list 100 received from the transmission unit 211 of the controller 20.

As illustrated in FIG. 2, the switching controller 115 functions as the link state monitoring controller (controller) 116 and the switch cooperation unit (notification unit) 117.

The link state monitoring controller 116 detects a failure which occurs in the link connected to the switch 10. When a failure which occurs in an uplink (root node) communication path of the switch 10 is detected, the link state monitoring controller 116 rewrites the ACL table 220 (which will be described below with reference to FIG. 19) to switch a plurality of communication paths. The link state monitoring controller 116 rewrites the ACL table 220 on the basis of a link failure occurrence notification from other switches 10 connected to the switch 10 to switch a plurality of communication paths.

In addition, the link state monitoring controller 116 notifies the controller 20 that the communication path (path) has been switched.

The link state monitoring controller 116 detects the recovery of the failure which has occurred in the link connected to the switch 10. When the recovery of the failure is detected on the uplink (root node) side of the switch 10, the link state monitoring controller 116 rewrites the ACL table 220 (which will be described below with reference to FIG. 19) to return the communication path to the state before the switching. The link state monitoring controller 116 writes the ACL table 220 on the basis of a link failure recovery notification which is transmitted from other switches 10 connected to the switch 10 to return the communication path to the state before the switching.

The switch cooperation unit 117 notifies other switches 10 that a link failure has occurred, on the basis of the link failure detected by the link state monitoring controller 116. Specifically, when a failure which occurs in a communication path on the downlink (leaf node) side of the switch 10 is detected, the switch cooperation unit 117 transmits a link failure occurrence notification (a link failure ID; which will be described below with reference to FIG. 19) to other switches 10 connected to the switch 10. In addition, the switch cooperation unit 117 receives the link failure occurrence notification (link failure ID) from other switches 10 connected to the switch 10. Then, when there is no communication path which can be used on the uplink (root node) side of the switch 10, the switch cooperation unit 117 transmits a link failure occurrence notification (link failure ID) to other switches 10 connected to the switch 10. The state in which there is no usable communication path means a state in which, even through a physical communication path is connected, the transmission of packets through the communication path is unavailable.

The switch cooperation unit 117 of the switch 10 which has received the link failure occurrence notification transmits information about path switching as a path switching response to the switch 10 which has transmitted the link failure occurrence notification. The switch cooperation unit 117 of the switch 10 which has transmitted the link failure occurrence notification receives information about path switching as a path switching response from the switch 10 which has received the link failure occurrence notification. Then, the switch cooperation unit 117 which has received the path switching response stores information included in the path switching response as path switching information in, for example, the memory 130.

In addition, the switch cooperation unit 117 notifies other switches 10 that the link failure has been recovered, on the basis of the recovery of the link failure detected by the link state monitoring controller 116. Specifically, when failure recovery is detected on the downlink (leaf node) side of the switch 10, the switch cooperation unit 117 transmits a link failure recovery notification (link failure ID=0; which will be described below with reference to FIG. 19) to the switch 10 which is specified on the basis of the path switching information. Furthermore, the switch cooperation unit 117 receives a link failure recovery notification (link failure ID=0) from other switches 10.

The switching module 12 includes a switching circuit (for example, a crossbar switch) (not illustrated) and freely changes the path of each input packet. As illustrated in FIG. 2, the switching module 12 includes a ternary content addressable memory (TCAM) 120 and the memory 130 and functions as an ACL control unit 122 and an FDB control unit 132.

The TCAM 120 is a storage device obtained by adding a region for storing a mask value to a general CAM (content addressable memory) which accesses data searched with a key. As illustrated in FIG. 2, the TCAM 120 functions as an ACL storage unit (first storage unit) 121.

The ACL storage unit 121 stores the ACL tables 200 and 220. That is, the ACL setting unit 111 of the CPU 11 stores the ACL tables 200 and 220 in the ACL storage unit 121.

The ACL control unit 122 performs flow control based on the ACL. Specifically, the ACL control unit 122 controls packet transmission on the basis of the ACL tables 200 and 220 stored in the ACL storage unit 121.

The memory 130 is a storage device including a ROM and a RAM. As illustrated in FIG. 2, the memory 130 functions as an FDB storage unit (second storage unit) 131.

The FDB storage unit 131 stores an FDB table 300. That is, the FDB setting unit 112 of the CPU 11 stores the FDB table 300 in the FDB storage unit 131.

The FDB control unit 132 performs flow control based on the FDB. Specifically, the FDB control unit 132 controls packet transmission on the basis of the FDB table 300 stored in the FDB storage unit 131.

In the switch 10 according to an example of this embodiment, the ACL setting unit 111, the TCAM 120, and the ACL control unit 122 function as a first packet transmission controller and the FDB setting unit 112, the memory 130, and the FDB control unit 132 function as a second packet transmission controller.

Figure 3:
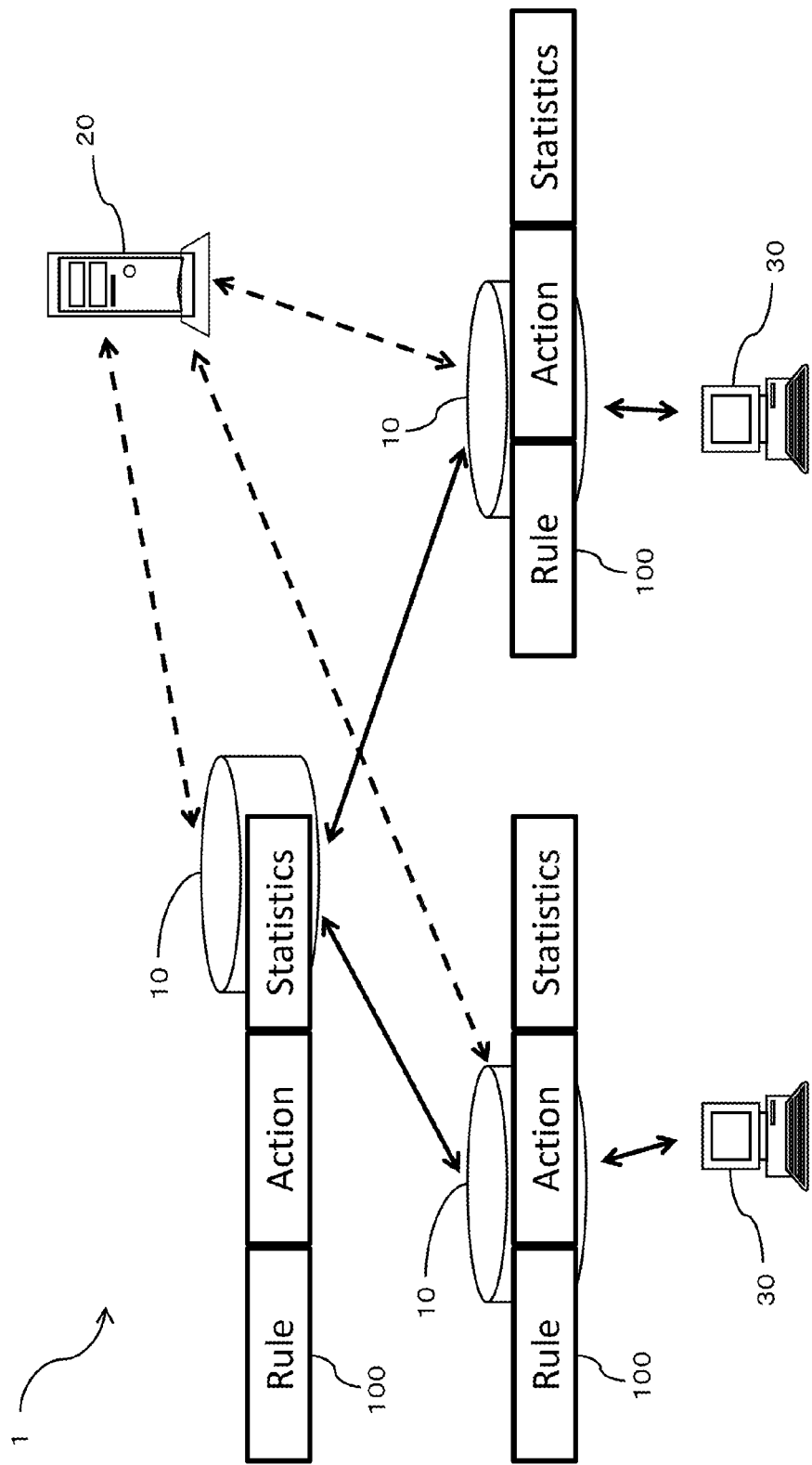
FIG. 3 is a diagram illustrating OpenFlow which is used by the network system as an example of the embodiment.

FIG. 3 is a diagram illustrating OpenFlow used by the network system as an example of the embodiment.

The network system 1 as an example of this embodiment performs network control using OpenFlow. The network system 1 illustrated in FIG. 3 includes three switches 10, a controller 20, and two server apparatuses 30.

Each server apparatus 30 transmits packets to another server apparatus 30 through three switches 10 (see a solid double-headed arrow in FIG. 3).

The controller 20 manages each switch 10. For example, the controller 20 sets the flow list 100 in which rule, action, and statistics fields are associated with each other to each switch 10 prior to packet transmission between the switches 10.

The network system 1 can control a multi-layer flow (for example, layer 2 (L2), layer 3 (L3), and layer 4 (L4)) using the settings of the flow list 100 by the controller 20 and can perform unified flow management.

Figure 4:
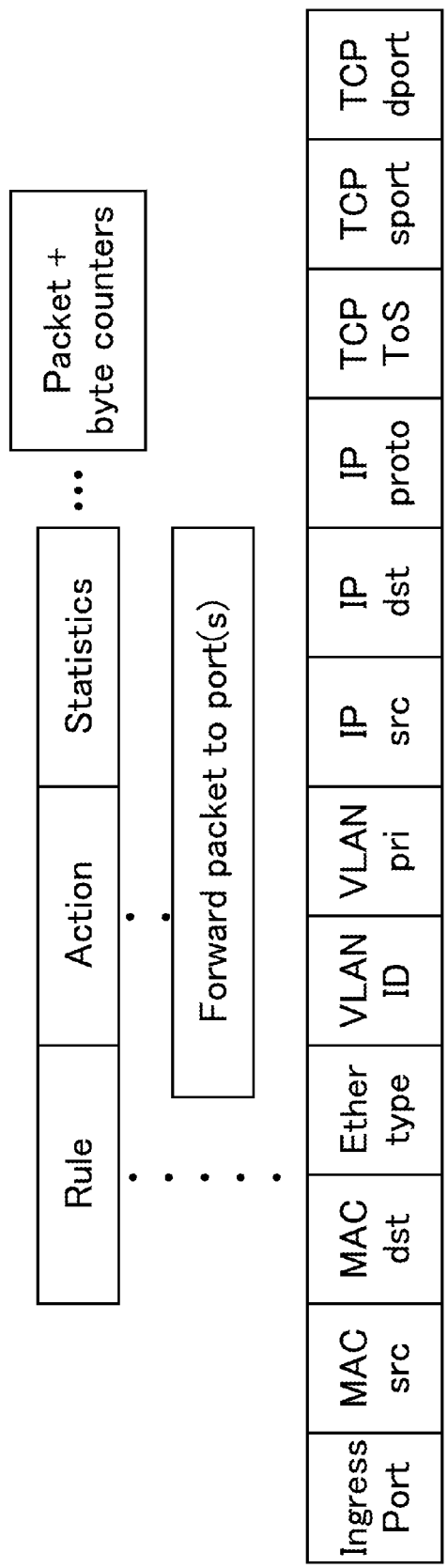
FIG. 4 is a diagram illustrating the flow definition of OpenFlow which is used by the network system as an example of the embodiment.

FIG. 4 is a diagram illustrating the flow definition of OpenFlow used by the network system as an example of the embodiment.

The flow definition of OpenFlow used by the network system 1 includes a 12-tuple of fields in the rule field as illustrated in FIG. 4. The switch 10 identifies the received packet on the basis of the information of each field included in the rule field.

The action field includes information of a forward packet to port(s), as illustrated in FIG. 4.

The switch 10 processes the packet matched with the rule field (designates the number of the transmission port 15) on the basis of the action field.

The statistics field includes the information of packet and byte counters, as illustrated in FIG. 4.

FIG. 5 is a diagram illustrating flow control in the network system as an example of the embodiment.

As illustrated in FIG. 5, the network system 1 according to an example of this embodiment divides a packet transmission path into two areas, that is, an area [1] (first packet transmission control area) and an area [2] (second packet transmission control area) and transmits packets using the two divided areas. Specifically, the network system 1 performs flow control based on the ACL in the area [1] and performs flow control based on the FDB in the area [2]. In other words, the network system 1 includes the first packet transmission control area corresponding to a first packet transmission controller and the second packet transmission control area corresponding to a second packet transmission controller. In addition, the area [1] and the area [2] are separated by a turning point A, as illustrated in FIG. 5.

In the area [1], no address is allocated to a port of the switch 10 for the server apparatus 30 and there are a plurality of paths on the upstream side in the transmission of packets from the server apparatus 30 to the turning point A. In other words, the area [1] is an area which extends to the turning point A and in which a path to the server apparatus 30, which is a transmission destination, is uniquely determined, in a packet transmission path from the server apparatus 30, which is a transmission source, to the server apparatus 30, which is the transmission destination.

In the area [2], an address is allocated to a portion of the switch 10 for the server apparatus 30 and a path is uniquely determined in the transmission of packets from the turning point A to the server apparatus 30. In other words, the area [2] is an area after the turning point A in the packet transmission path from the server apparatus 30, which is the transmission source, to the server apparatus 30, which is the transmission destination.

FIG. 6 is a diagram illustrating flow control in the network system as an example of the embodiment.

The network system 1 illustrated in FIG. 6 includes four switches 10 (SW#1 to SW#4), four server apparatuses 30 (Svr#1 to Svr#4), and a controller 20 (not illustrated).

Hereinafter, in the description with reference to FIG. 6, when a specific switch 10 is designated, it is represented by "SW#1", "SW#2", "SW#3" or "SW#4". In addition, hereinafter, in the description with reference to FIG. 6, when a specific server apparatus 30 is designated, it is represented by "Svr#1", "Svr#2", "Svr#3", or "Svr#4".

In the example illustrated in FIG. 6, Svr#1 is a transmission source device that transmits packets and Svr#4 is a transmission destination device that receives the packets. In the example illustrated in FIG. 6, the packets which are transmitted by Svr#1 are transmitted to Svr#4 through SW#1, SW#3, and SW#2 (see a dashed arrow in FIG. 6).

In the example illustrated in FIG. 6, there are two packet transmission paths from Svr#1 to Svr#4. That is, the packet transmission packets from Svr#1 to Svr#4 include a path through SW#3 which is represented by a dashed arrow in FIG. 6 and a path through SW#4. In addition, a path from SW#3 to Svr#4 is uniquely determined and a path from SW#4 to Svr#4 is also uniquely determined.

As such, in the transmission path from the transmission source device, the first switch 10 which makes it possible to uniquely determine a path to the transmission destination device is defined as the turning point A as in an example of this embodiment (SW#3 in the example illustrated in FIG. 6).

Then, each switch 10 performs flow control based on the ACL in the area [1] from the transmission source device to the turning point A and performs flow control based on the FDB in the area [2] from the turning point A to the transmission destination device. In the example illustrated in FIG. 6, the ACL control unit 122 of SW#1 performs flow control based on the ACL and the FDB control units 132 of SW#3 and SW#2 perform flow control based on the FDB.

In other words, the ACL control unit 122 transmits packets according to the ACL in the area [1], which extends to the turning point A and in which a path to the transmission destination device is not uniquely determined, in the packet transmission path from the transmission source device to the transmission destination device. The FDB control unit 132 transmits packets according to the FDB in the area [2] after the turning point A in the packet transmission path from the transmission source device to the transmission destination device.

The controller 20 which is not illustrated in FIG. 6 forms the flow table of each switch 10 such that packets can be transmitted through a selected path according to the ACL in the area up to the turning point A in the packet transmission path from the transmission source device to the transmission destination device and packets can be transmitted through the determined path according to the FDB in the area from the turning point A to the transmission destination device in the packet transmission path.

FIG. 7A is a diagram illustrating the rule field in the ACL-based flow definition used by the network system as an example of the embodiment and FIG. 7B is a diagram illustrating the action field.

The network system 1 as an example of this embodiment performs ACL-based flow control in the area [1], mainly using a wildcard matching table (WMT) using wildcard matching (which will be described in detail below with reference to FIG. 9).

The controller 20 proactively forms the WMT for the switch 10 in principle (presetting). For example, the transmission unit 211 of the controller 20 performs presetting when the network system 1 starts or when topology information is changed. In addition, the change in the topology information may be dynamically detected or it may be detected by an operation of the operator.

A flow identification method depends on the usage pattern of the network. For example, in an overlay network, such as a virtual extensible local area network (VXLAN) or a stateless transport tunneling (STT) network, attention is paid to L4 sport in the rule field illustrated in FIG. 7A to identify a flow. In addition, attention is paid, for example, to an internet protocol (IP) address in tenant separation (multiple tenants), to a virtual local area network (VLAN) in an end-host mode (EHM), and to an MPLS label in multi-protocol label switching (MPLS), in order to identify the flow.

The network system 1 as an example of this embodiment selects the field of interest for each usage pattern of the network and determines a path to the turning point A on the basis of the value of the field of interest. For example, in the overlay network, as illustrated in the action field of FIG. 7B, a port (path) for transmitting packets is selected on the basis of an L4 TCP/UDP src port.

The network system 1 as an example of this embodiment applies a mask value corresponding to the number of paths to the field of interest to reduce the number of entries consumed in the ACL, which will be described below with reference to FIG. 9.

FIG. 8A is a diagram illustrating the rule field in the FDB-based flow definition used by the network system as an example of the embodiment and FIG. 8B is a diagram illustrating the action field.

The network system 1 as an example of this embodiment performs the FDB-based flow control in the area [2], mainly using an exact matching table (EMT) using exact matching (address specification).

The controller 20 proactively forms the EMT for the switch 10 in principle (presetting). For example, the controller 20 may perform the presetting when the server apparatus 30 or a virtual machine (VM) is deployed such as when the server apparatus 30 is started, is stopped, or is moved, in addition to the same time as the WMT is formed. As such, the method in which the EMT is formed by the setting of the controller 20 is applied to all of a unicast operation, a multicast operation, and a broadcast operation in the network system 1.

A method for forming the EMT is not limited to the method for forming the EMT using the setting of the controller 20. For example, the following methods may be used: the switch 10 performs dynamic learning by hardware; and a hybrid method of the method for forming the EMT using the setting of the controller 20 and the method in which the switch 10 performs dynamic learning. In the dynamic learning method, the switch is configured such that only the packet transmitted from the server to the turning point A (the path from the turning point A to the server) is learned in order to avoid a loop and to prevent competition with WMT-based forwarding and control needs to be performed such that a learning packet is transmitted from the server. In the hybrid method, the controller 20 sets only the switch which is directly connected to the server and the switch on the upstream side is automatically learned. Therefore, it is possible to simplify an algorithm for constructing the EMT of the controller 20 and to exclude server control required for dynamic learning.

As illustrated in FIGS. 8A and 8B, the network system 1 as an example of this embodiment uniquely determines an output destination on the basis of the FDB (a media access control (MAC) table and a static IP routing table), using MAC dst or IP dst. That is, a switch which is included in the second packet transmission control area among a plurality of switches searches whether the address information of an input packet corresponds to any one of a plurality of second rule information items 300 and transmits the input packet on the basis of the corresponding second rule information 300. In the example illustrated in FIG. 8B, exact matching is performed on the basis of MAC dst. However, the embodiment is not limited thereto. For example, matching may be performed on the basis of a combination of MAC dst and VLAN ID or a combination of IP dst and VLAN ID. In the exact matching, a bit mask is not applied to MAC dst, IP dst, and VLAN ID.

The network system 1 as an example of this embodiment is configured such that the search result of the EMT has priority over the search result of the WMT in the search of a flow table for determining the address of an input packet. That is, the search result of the WMT is executed only when there is no destination in the search of the EMT (destination lookup failure: DLF). In other words, when second rule information 300 corresponding to the destination of the input packet is stored in the second storage unit 131, the second packet transmission controller controls the transmission of the input packet on the basis of the second rule information 300. When second rule information 300 corresponding to the destination of the input packet is not stored in the second storage unit 131, the first packet transmission controller controls the transmission of the input packet on the basis of first rule information 200 corresponding to the input packet.

As described above, the EMT and the WMT are proactively set in principle (presetting). However, when a search for both the EMT and the WMT fails, the switch 10 may inquire of the controller 20 about the EMT and the WMT and reactively set the EMT and the WMT (post-setting).

Figure 9:
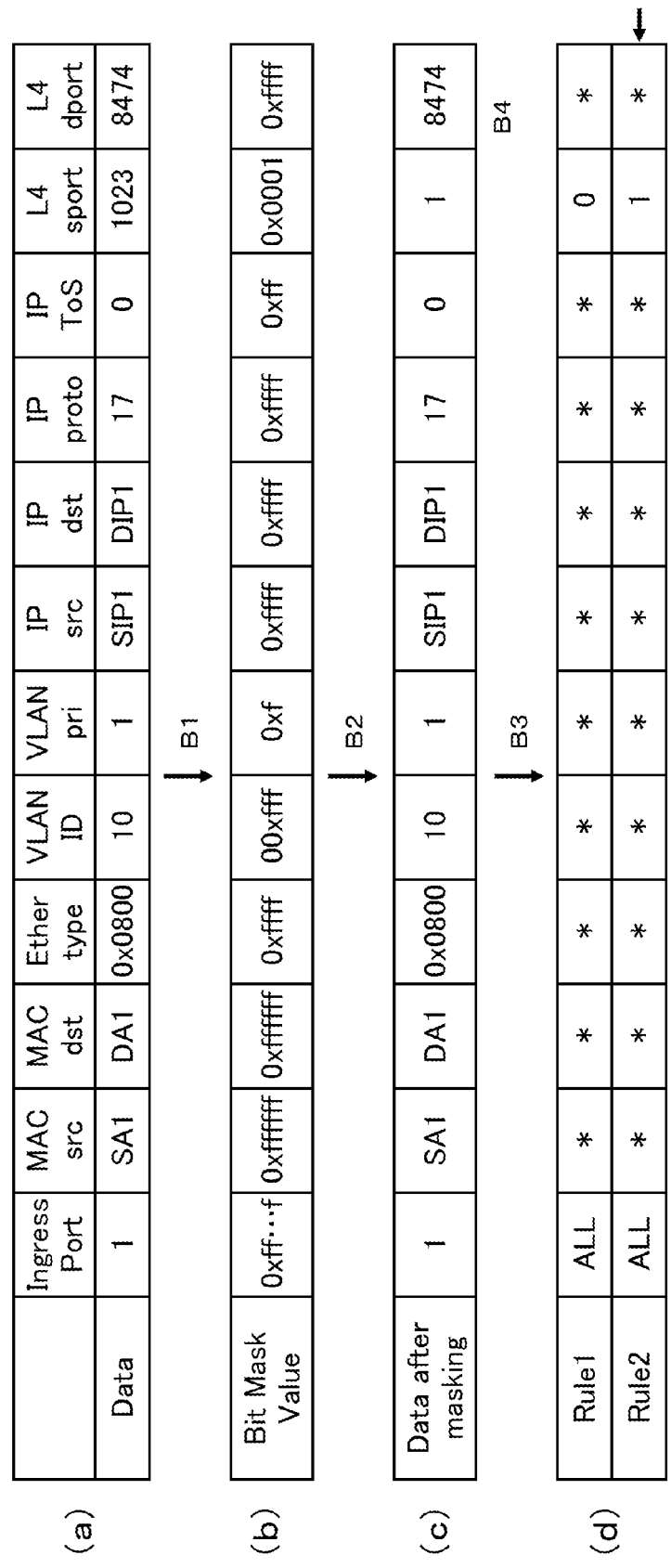
FIG. 9 is a diagram illustrating ACL-based flow control matching in the network system as an example of the embodiment.

FIG. 9 is a diagram illustrating the matching of the ACL-based flow control in the network system as an example of the embodiment.

In FIG. 9, in input data, an ingress port field is reception port information which is added when the switch 10 receives data. In the matching between input data and the rule in the ACL control unit 122, the ingress port field can be designated, for example, in the form of a port vector and can be matched with a plurality of input ports. In data in the form of the port vector, a bit number corresponds to a port number and whether a corresponding portion is designated is identified on the basis of whether the value of a given bit is 0 or 1. The bit width of the port vector depends on the number of ports in the switch 10 and varies depending on switching devices. Therefore, the description thereof will not be made.

The ACL control unit 122 applies a mask to a predetermined field in the header information of an input packet, searches for a table on the basis of packet data after the mask is applied, and performs a predetermined operation, such as the determination of an output port and transmission, on the packet on the basis of the search result.

The ACL control unit 122 calculates the bitwise AND between data for each field illustrated in reference symbol (a) of FIG. 9 and a bit mask value illustrated in reference symbol (b) of FIG. 9 (see an arrow B1) to obtain data after masking illustrated in reference symbol (c) of FIG. 9 (see an arrow B2). In addition, the ACL control unit 122 matches the data after masking in L4 sport with the rule illustrated in reference symbol (d) of FIG. 9 (see an arrow B3).

In reference symbol (d) of FIG. 9, "*" means a wildcard. The term "wildcard" indicates "Don't Care" during a search and an appropriate comparison value is set to the field designated by wildcard of the TCAM 120. In an example of this embodiment, a wildcard designation field is also used, which makes it possible to identify or control the flow in detail.

The ACL control unit 122 mask L4 sport with 0x0001, maps L4 sport to 0 or 1, and determines which one of the two rules is to be matched with L4 sport. In the examples illustrated in FIG. 9, since the data after masking of L4 sport is 1, the ACL control unit 122 determines that L4 sport is matched with rule 2 (Rule 2) (see an arrow B4).

At that time, the number of rules registered in the ACL is determined by the mask value. The mask value is determined by the number of paths to the upstream switch which is directed to the turning point A. In other words, the number of necessary rules is determined by the number of paths from the switch 10 to the turning point A. FIG. 9 illustrates an example in which there are two paths, in which the mask value is 0x0001 and the number of rules is two. When the number of paths is four, the mask value is 0x0003 and the number of rules is four.

The ACL control unit 122 determines that the ingress port is matched when the result of the bitwise AND between the data after masking and the rule is not 0. When the fields other than the ingress port field are completely matched (for example, when the result of an exclusive OR operation is 0), the ACL control unit 122 determines that data and the rule are matched with each other. In addition, when all fields except for the "Don't Care" field are matched, the ACL control unit 122 determines that data and the rule are matched with each other.

Then, the ACL control unit 122 performs predetermined control (for example, the output of data to the designated transmission port 15 or the discard of data) on the input packet, on the basis of an action stored in the entry corresponding to the matched rule in the ACL storage unit 121, using a hard-wired circuit (not illustrated).

That is, a switch which is included in the first packet transmission control area among a plurality of switches applies a mask corresponding to the plurality of numbers of first rule information items 200 to a predetermined position of the header information of the input packet and controls the input packet on the basis of the first rule information 200 which is selected from the first storage unit 121 on the basis of the header information after masking.

FIG. 9 illustrates an example of the mask application operation and the matching operation of the ACL control unit 122. The order of the mask application operation and the matching inspection operation (calculation) is not limited to the method illustrated in FIG. 9 as long as the same result is obtained.

Figure 10:
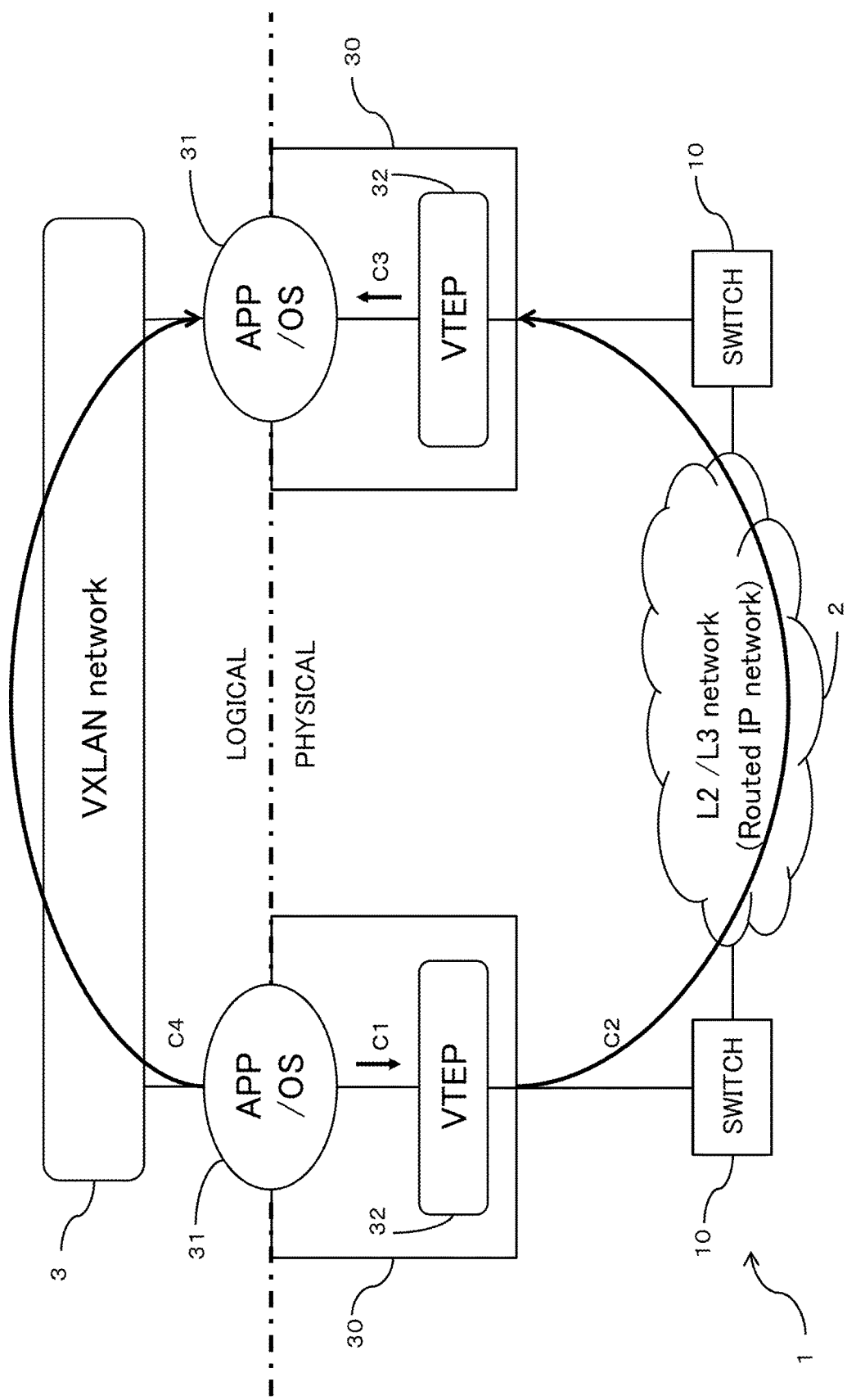
FIG. 10 is a diagram illustrating a VXLAN used by the network system as an example of the embodiment.

FIG. 10 is a diagram illustrating the VXLAN used by the network system as an example of the embodiment.

A network system 1 illustrated in FIG. 10 includes two switches 10, two server apparatuses 30, and a controller 20 (not illustrated). In addition, the network system 1 physically forms an L2/L3 network (Routed IP network) 2 and also logically forms a VXLAN network 3.

As illustrated in FIG. 10, the server apparatus 30 deploys, for example, an application/operating system (APP/OS) 31 and a VXLAN terminal end-point (VTEP) 32 on a CPU (not illustrated).

The VXLAN is a protocol that encapsulates a frame with a user datagram protocol (UDP) to construct a logical layer 2 network on a layer 3 network.

In the VXLAN, a VXLAN header has a 24-bit identifier which is called a VXLAN network identifier (VNI). Therefore, it is possible to define a maximum of 16 million overlay networks.

In the VXLAN, packet conversion is performed by a VTEP 32 which is an end point of the tunnel. Specifically, the VTEP 32 operates on a physical server (on a hypervisor which operates on the physical server) and performs packet conversion between the VXLAN and APP/OS on a VM (not illustrated).

In the example illustrated in FIG. 10, the APP/OS 31 transmits an original frame to the VTEP 32 (see an arrow C1). The VTEP 32 specifies a VNI from the frame transmitted from the VM, encapsulates the frame with a VXLAN header including specified VNI, and transmits the encapsulated frame to an L2/L3 network 2 (see an arrow C2). The VTEP 32 of the transmission destination device specifies a destination VM from the VNI and the address of the original data, removes the VXLAN header, and transmits the frame to the VM (not illustrated) (see the arrow C3). In this way, the communication between the VMs is logically performed through the VXLAN network 3 (see an arrow C4).

As such, in the VXLAN, the communications between VMs are integrated into the communications between VTEPs 32. In other word, the communication between VMs is concealed by encapsulation of VXLAN.

Figure 11:
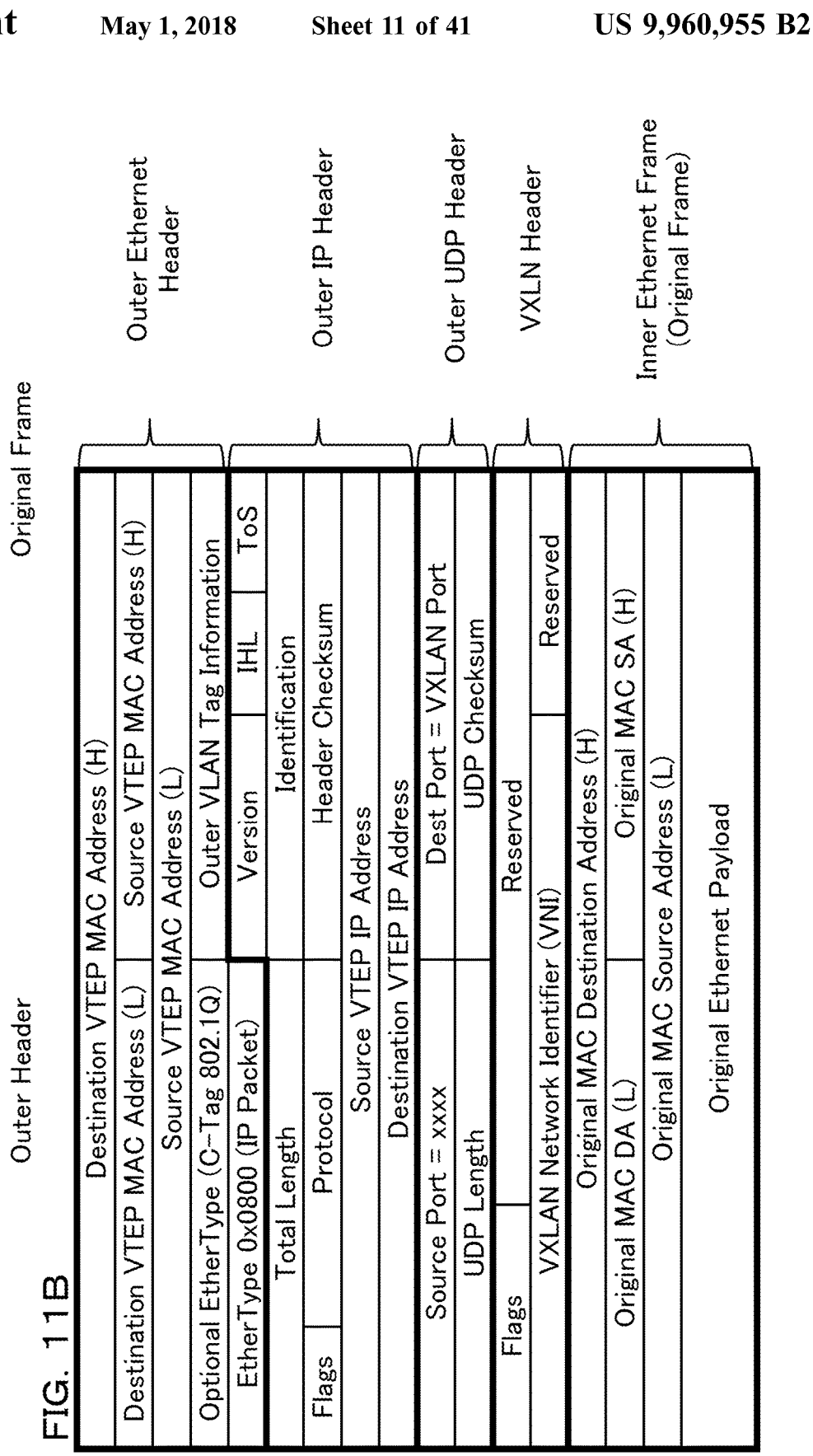
FIG. 11A is a diagram illustrating the outline of a VXLAN packet used by the network system as an example of the embodiment.
FIG. 11B is a diagram illustrating the details of the VXLAN packet used by the network system as an example of the embodiment.

FIG. 11A is a diagram illustrating the outline of a VXLAN packet used by the network system as an example of the embodiment and FIG. 11B illustrates the details of the VXLAN packet.

As illustrated in FIG. 11A, the format of the VXLAN packet includes an outer header and an original frame which are transmitted by UDP communication between the VTEPs 32.

As illustrated in FIG. 11B, the outer header includes an outer Ethernet (registered trademark) header, an outer IP header, an outer UDP header, and a VXLAN header and the original frame includes an inner Ethernet (registered trademark) frame.

Figure 12:
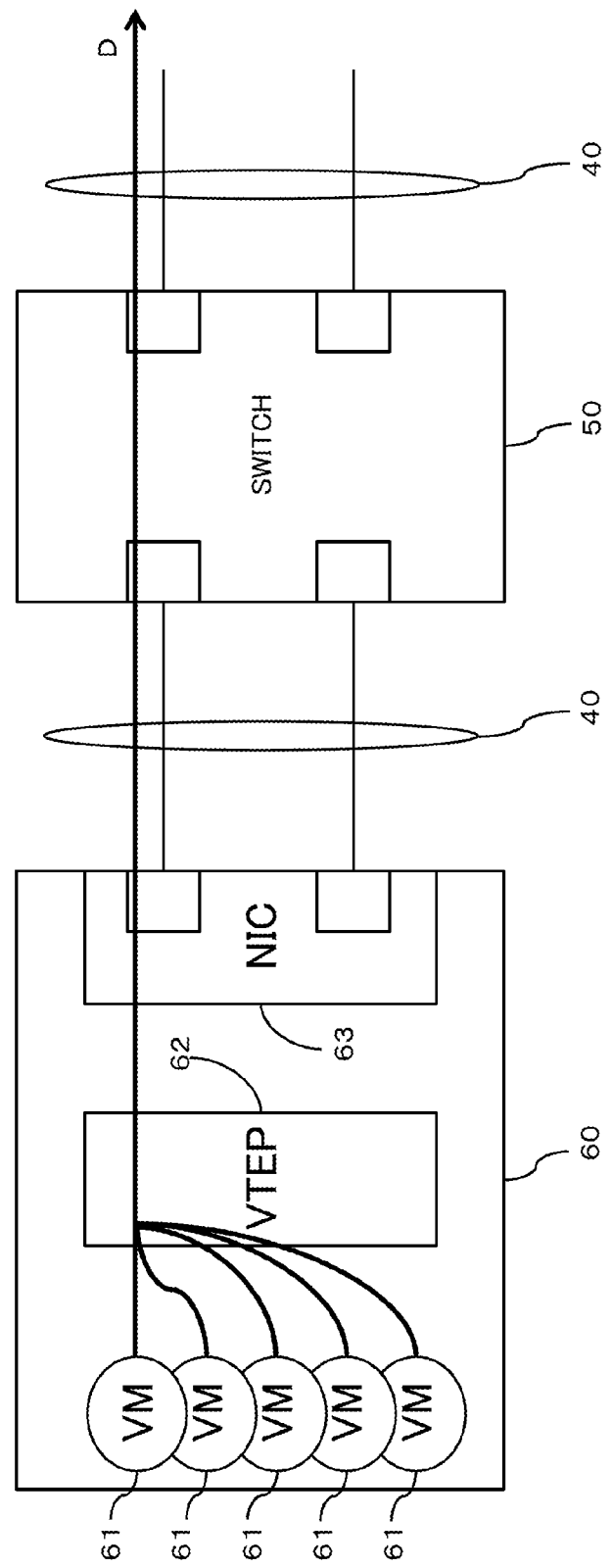
FIG. 12 is a diagram illustrating the traffic characteristics of a VXLAN used by a network system according to the related art.

FIG. 12 is a diagram illustrating the traffic characteristics of a VXLAN which is used by a network system according to a related art.

In the related art illustrated in FIG. 12, a server apparatus 60 and a switch 50 are communicably connected to each other through a link-aggregation group (LAG) 40. The server apparatus 60 deploys a VTEP 62 and five VMs 61 and includes a network interface card (NIC) 63.

The NIC 63 is a communication adapter that connects the server apparatus 60 to an external network, such as a LAN, and is, for example, a LAN card.

In the network system as the related art which uses a distribution algorithm based on an IP/MAC hash, as illustrated in FIG. 12, the communications between a plurality (five in the illustrated example) of VMs 61 are integrated into the communication between the VTEPs. Therefore, the number of flows which can be identified on the network is reduced and a traffic bias is likely to occur. In addition, in a multi-path transmission control protocol (MPTCP), an L4 src port is changed to form multiple paths. However, since the L4 src port of the original data is concealed by the encapsulation of the VXLAN, it is difficult to form multiple paths as expected.

Therefore, in the VXLAN specifications used by the network system 1 as an example of this embodiment, the hash value of a payload is input to the L4 src port.

Figure 13:
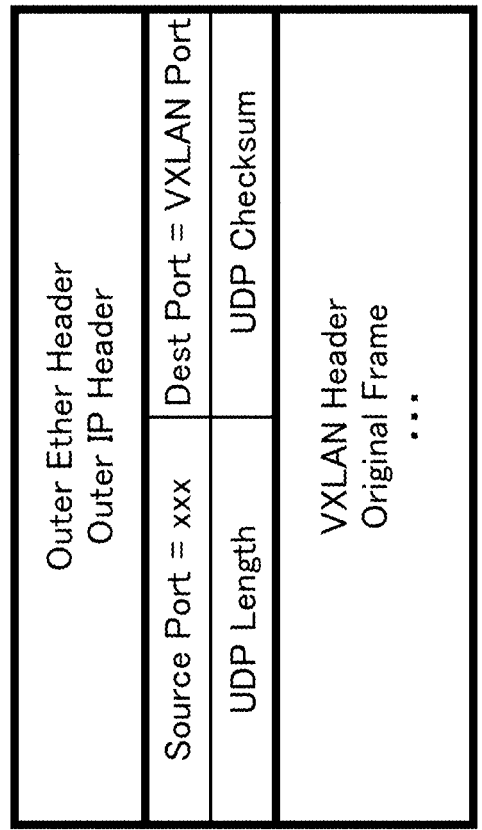
FIG. 13 is a diagram illustrating the distribution of multiple paths in the network system as an example of the embodiment.

FIG. 13 is a diagram illustrating the distribution of multiple paths in the network system as an example of the embodiment.

FIG. 13 illustrates in detail an outer header in a VXLAN packet which is used by the network system as an example of the embodiment illustrated in FIG. 11B.

When performing encapsulation, the VTEP 32 of hypervisor calculates a hash value with reference to the payload and stores the calculated hash value in the L4 src port. That is, the VTEP 32 generates a hash value from the content of the frame and uses the hash value for a UDP source port of the outer header. A 5-tuple, that is, IP src, IP dst, IP proto, L4 src, and dst ports, refer to the payload.

Figure 14:
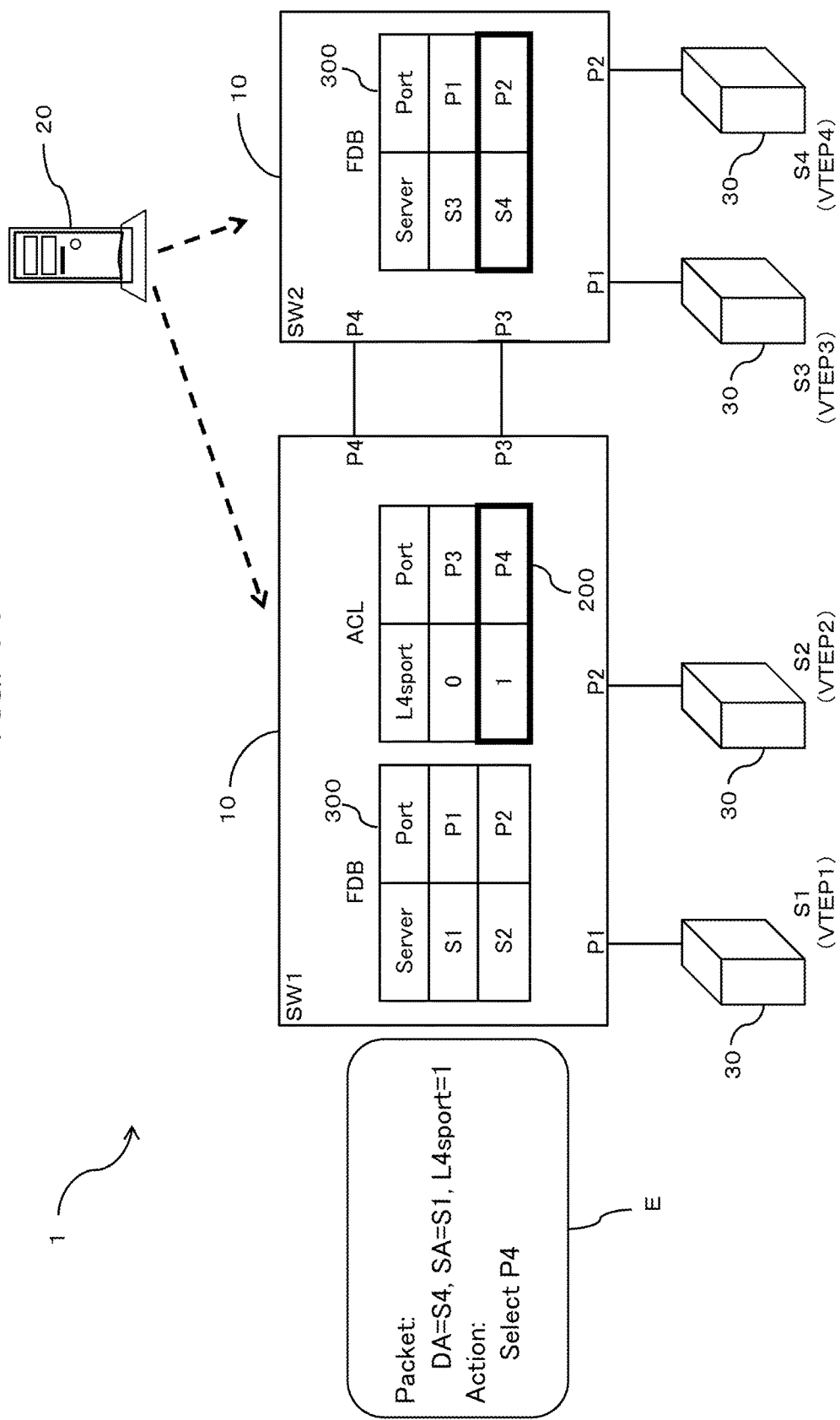
FIG. 14 is a diagram illustrating flow control in a back-to-back structure of the network system as an example of the embodiment.

FIG. 14 is a diagram illustrating flow control in a back-to-back structure of the network system as an example of the embodiment.

The network system 1 illustrated in FIG. 14 has the back-to-back structure and includes two switches 10 (SW1 and SW2), the controller 20, and four server apparatuses 30 (S1 to S4).

Hereinafter, in the description with reference to FIG. 14, when a specific switch 10 is designated, it is simply represented by "SW1" or "SW2". In the description with reference to FIG. 14, when a specific server apparatus 30 is designated, it is simply represented by "S1", "S2", "S3", or "S4". In FIG. 14, it is assumed that the value of L4 sport when the ACL is searched for is masked with a mask value 0x0001, which is not illustrated for simplicity of explanation.

First, the transmission unit 211 of the controller 20 proactively sets (transmits) the entries (the FDB table 300 and the ACL table 200) of the FDB and the ACL to each switch 10. Specifically, the transmission unit 211 stores the FDB table 300 in the FDB storage unit 131 of the memory 130 and stores the ACL table 200 in the ACL storage unit 121 of the TCAM 120. In addition, the transmission unit 211 sets the ACL table 200 to SW2, which is not illustrated in FIG. 14 for simplicity of illustration.

In FIG. 14, an example in which S1 transmits packets to S4 will be described.

As represented by reference numeral E, S4, S1, and 1 are set to the destination address (DA), source address (SA), and L4 sport of a packet, respectively.

The FDB control unit 132 of SW1 checks whether an action when DA is S4 is stored, with reference to the FDB table 300. Here, since S4 is not stored in the FDB table 300 of SW1, the ACL control unit 122 of SW1 checks an action when L4 sport is 1, with reference to the ACL table 200. Here, since Port=P4 is stored with respect to L4 sport=1 in the ACL table 200 of SW1, the ACL control unit 122 of SW1 selects a P4 port as the action, as represented by reference numeral E. That is, the ACL control unit 122 transmits a packet to SW2 through the P4 port of SW1.

The FDB control unit 132 of SW2 checks whether an action when DA is S4 is stored, with reference to the FDB table 300. Here, since Port=P2 is stored with respect to Server=S4 in the FDB table 300 of SW2, the FDB control unit 132 outputs a packet from a P2 port as the action. That is, the FDB control unit 132 transmits a packet to S4 through the P2 port of SW2.

In the example illustrated in FIG. 14, it is assumed that SW2 which performs FDB-based flow control first is the turning point A.

Figure 15:
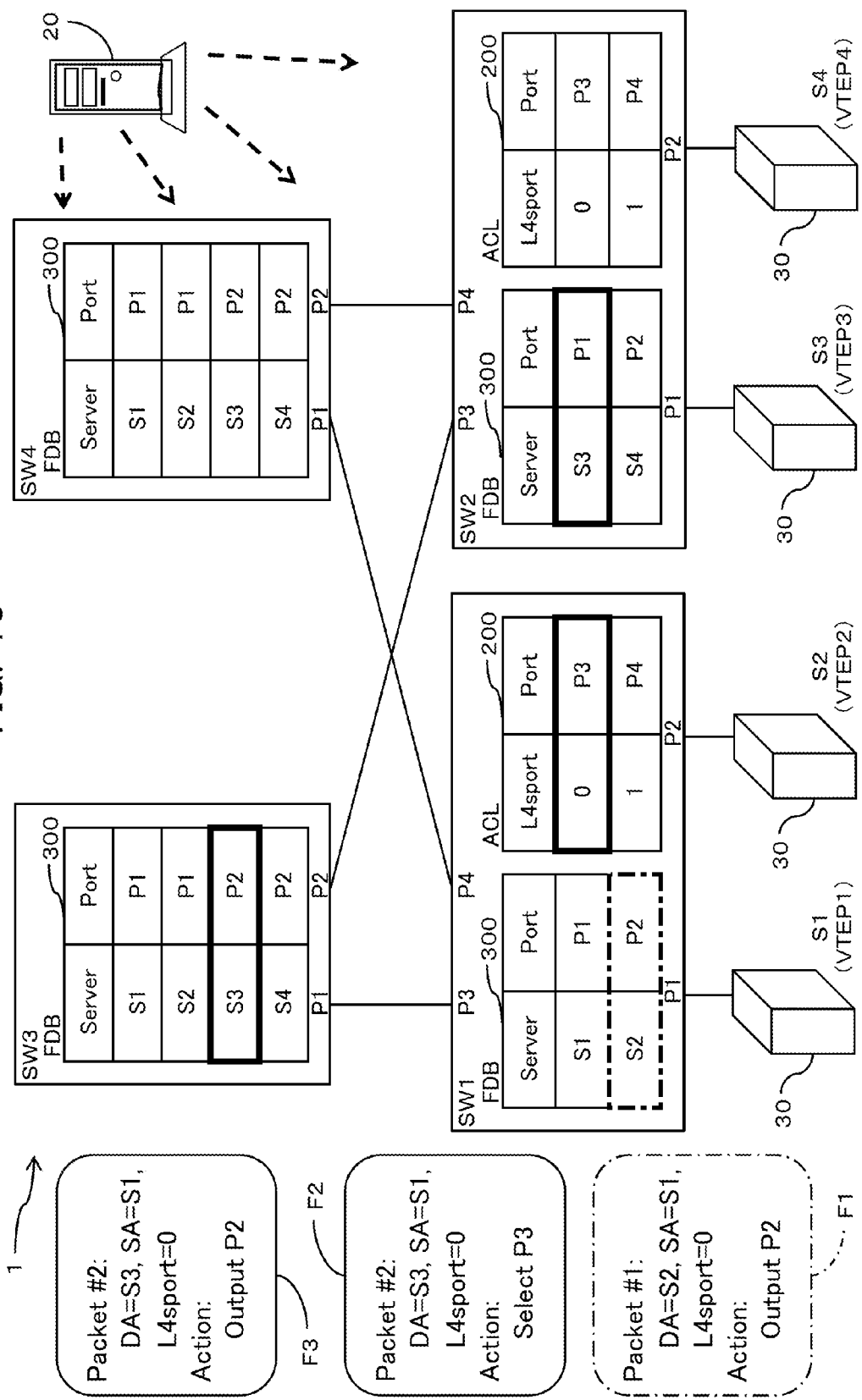
FIG. 15 is a diagram illustrating flow control in a fat tree structure of the network system as an example of the embodiment.

FIG. 15 is a diagram illustrating flow control in a fat tree structure of a network system as an example of the embodiment.

A network system 1 illustrated in FIG. 15 has the fat tree structure and includes four switches 10 (SW1 to SW4), a controller 20, and four server apparatuses 30 (S1 to S4). It is assumed that the value of L4 sport when the ACL is searched for is masked with a mask value 0x0001, which is not illustrated in FIG. 15 for simplicity of illustration.

Hereinafter, in the description with reference to FIG. 15, when a specific switch 10 is designated, it is simply represented by "SW1", "SW2", "SW3", or "SW4". In addition, hereinafter, in the description with reference to FIG. 15, when a specific server apparatus 30 is designated, it is simply represented by "S1", "S2", "S3", or "S4".

First, a transmission unit 211 of a controller 20 proactively sets (transmits) the entries (an FDB table 300 and an ACL table 200) of FDB and ACL to each switch 10. Specifically, the transmission unit 211 stores the FDB table 300 in an FDB storage unit 131 of a memory 130 and stores the ACL table 200 in an ACL storage unit 121 of a TCAM 120. In addition, in FIG. 15, the ACL tables 200 of SW3 and SW4 are not illustrated. However, the transmission unit 211 may set the ACL table 200 to SW3 and SW4.

In FIG. 15, first, an example in which S1 transmits packet #1 to S2 will be described. Then, an example in which S1 transmits packet #2 to S3 will be described.

As represented by reference numeral F1, S2, S1, and 0 are set to the DA, SA, and L4 sport of packet #1, respectively.

The FDB control unit 132 of SW1 checks whether an action when DA is S2 is stored, with reference to the FDB table 300. Here, since Port=P2 is stored with respect to Server=S2 in the FDB table 300 of SW1, the FDB control unit 132 outputs a packet from a P2 port as the action. That is, the FDB control unit 132 transmits a packet to S2 through the P2 port of SW1.

In the example illustrated in FIG. 15 in which packet #1 is transmitted, it is assumed that SW1 which performs FDB-based flow control first is the turning point A.

Then, the example in which S1 transmits packet #2 to S3 will be described.

As represented by reference numeral F2, S3, S1, and 0 are set to the DA, SA, and L4 sport of packet #2, respectively.

The FDB control unit 132 of SW1 checks whether an action when DA is S3 is stored, with reference to the FDB table 300. Here, since S3 is not stored in the FDB table 300 of SW1, the ACL control unit 122 of SW1 checks an action when L4 sport is 0, with reference to the ACL table 200. Here, since Port=P3 is stored with respect to L4 sport=0 in the ACL table 200 of SW1, the ACL control unit 122 of SW1 selects a P3 port as the action, as represented by reference numeral F2. That is, the ACL control unit 122 transmits a packet to SW3 through the P3 port of SW1.

The FDB control unit 132 of SW3 checks whether an action when DA is S3 is stored, with reference to the FDB table 300. Here, since Port=P2 is stored with respect to Server=S3 in the FDB table 300 of SW3, the FDB control unit 132 outputs a packet from a P2 port as the action, as represented by reference numeral F3. That is, the FDB control unit 132 transmits a packet to SW2 through the P2 port of SW3.

In the example illustrated in FIG. 15 in which packet #2 is transmitted, it is assumed that SW3 which performs FDB-based flow control first is the turning point A.

The FDB control unit 132 of SW2 checks whether an action when DA is S3 is stored, with reference to the FDB table 300. Here, since Port=P1 is stored with respect to Server=S3 in the FDB table 300 of SW2, the FDB control unit 132 outputs a packet from a P1 port as the action. That is, the FDB control unit 132 transmits a packet to S3 through the P1 port of SW2.

Figure 16:
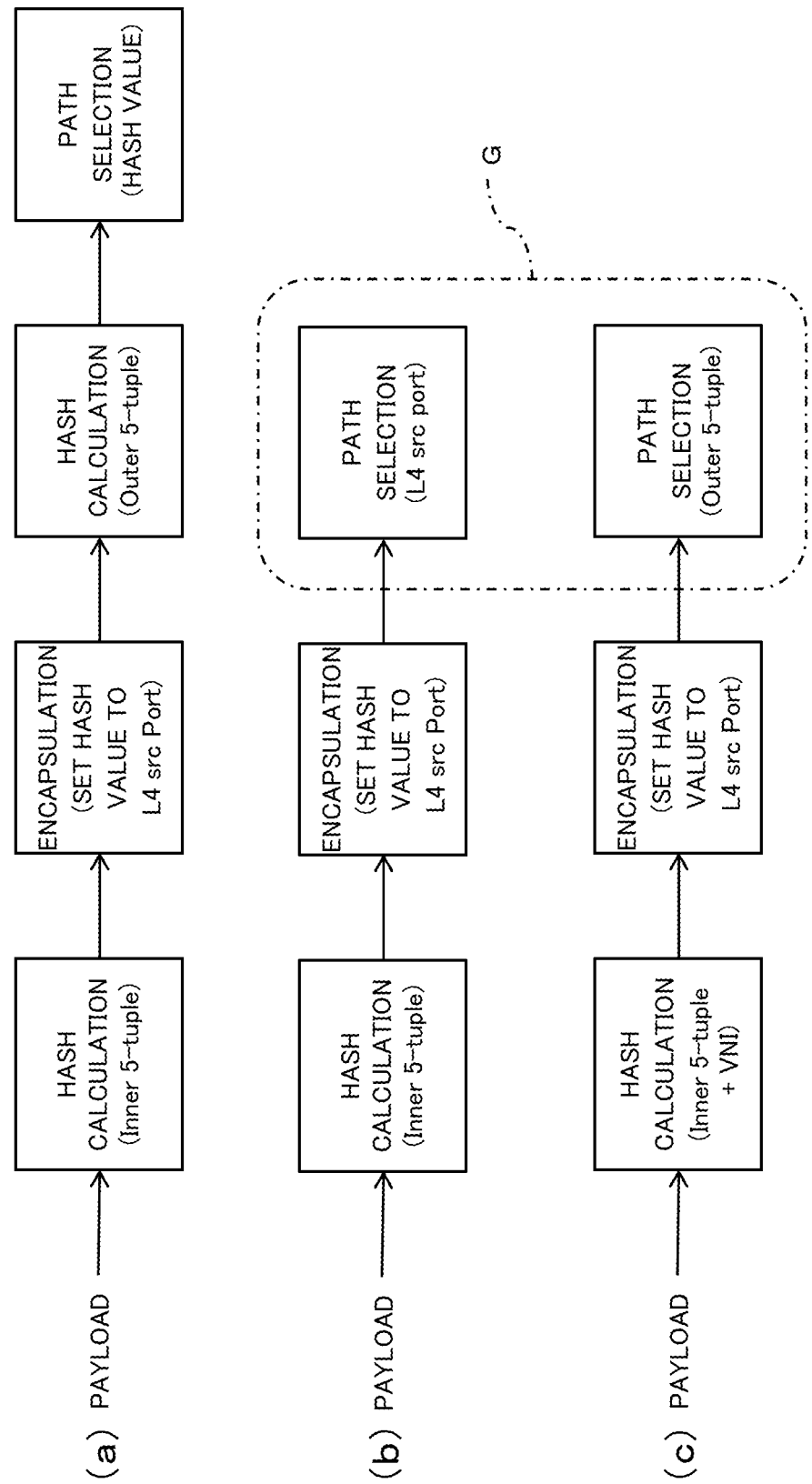
FIG. 16 is a diagram illustrating hash calculation in the network system as an example of the embodiment.

FIG. 16 is a diagram illustrating the calculation of a hash in the network system as an example of the embodiment.

A hash calculation method illustrated in reference symbol (a) of FIG. 16 calculates a first hash value from an inner 5-tuple of the payload, performs encapsulation, and calculates a second hash value for path selection from an outer 5-tuple (IP src, IP dst, IP proto, L4 src, and dst ports) including an outer L4 src port to which the first hash value is set. Since the switch 10 calculates the second hash value and selects a path, it is difficult for the controller 20 to control in detail the selection of the path based on the second hash value, using OpenFlow.

A hash calculation method illustrated in reference symbol (b) of FIG. 16 calculates the first hash value from the inner 5-tuple of the payload and sets the first hash value to the outer L4 src port during encapsulation. The switch 10 selects a path on the basis of the first hash value after the mask is applied.

A hash calculation method illustrated in reference symbol (c) of FIG. 16 is substantially the same as that illustrated in reference symbol (b) of FIG. 16, calculates the first hash value using a VXLAN network identifier (VNI) in addition to the inner 5-tuple. Therefore, it is possible to perform detailed flow identification.

In the hash calculation methods illustrated in FIG. 16, the controller 20 sets the settings of the switch 10 using OpenFlow such that a path is selected on the basis of the first hash value after the mask is applied. At that time, the vendor extension of OpenFlow is needed, as represented by reference numeral G.

Figure 17:
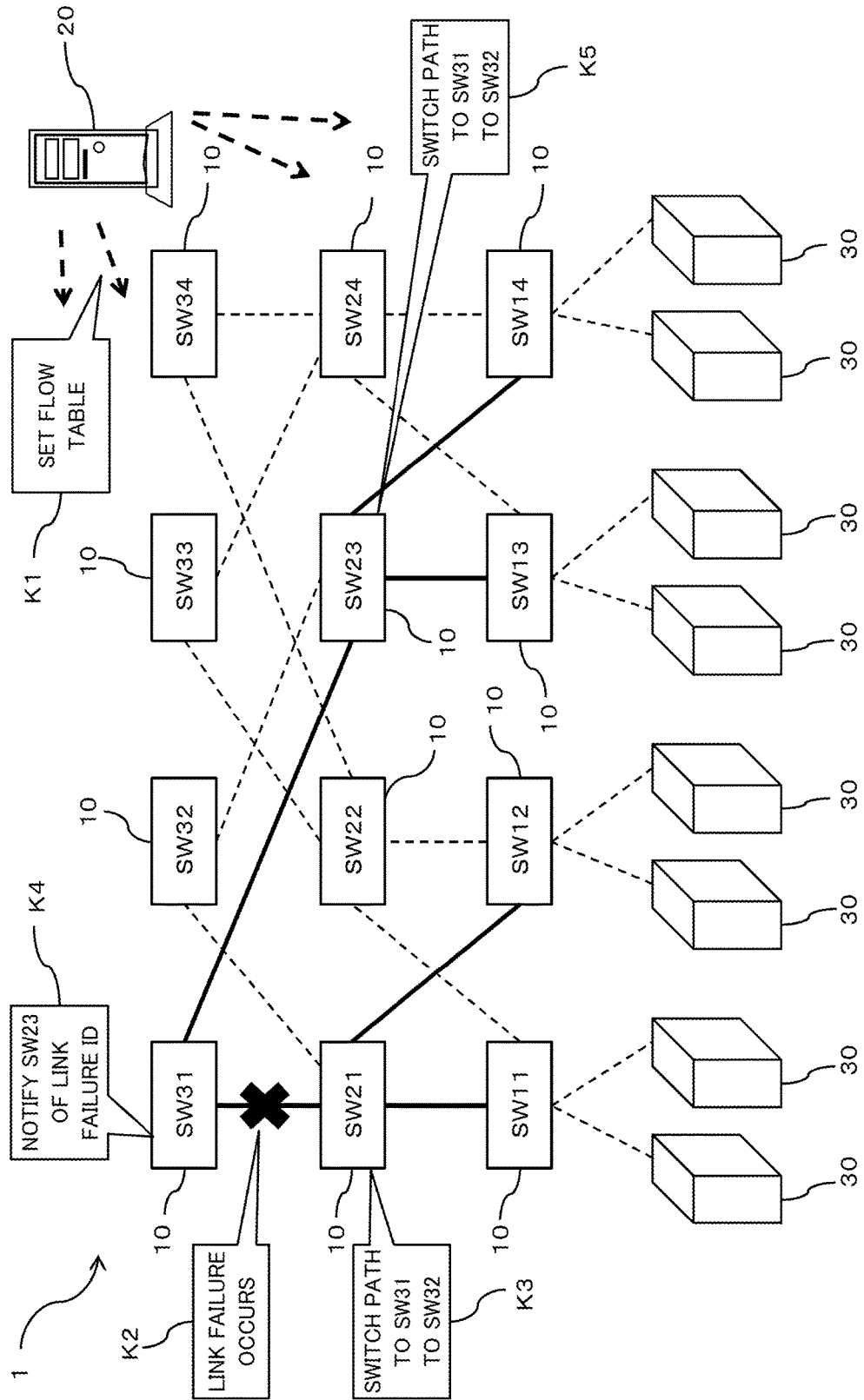
FIG. 17 is a diagram illustrating a first example of a path switching process when a link failure occurs in the network system as an example of the embodiment.

FIG. 17 is a diagram illustrating a first example of a path switching process when a link failure occurs in the network system as an example of the embodiment.

A network system 1 illustrated in FIG. 17 has a fat tree structure and includes twelve switches 10 (SW11 to SW14, SW21 to SW24, and SW31 to SW34), a controller 20, and eight server apparatuses 30.

Hereinafter, in the description with reference to FIG. 17, when specific switches 10 are designated, they are simply represented by "SW11" to "SW14", "SW21" to "SW24", or "SW31" to "SW34". In addition, in the description with reference to FIG. 17, in some cases, "SW31" to "SW34" are referred to as "switches 10 at the root nodes" and "SW11" to "SW14" are referred to as "switches 10 at the leaf nodes". In addition, hereinafter, in some cases, the "side of the switch 10 at the root node" is referred to an "uplink side" and the "side of the switch 10 at the leaf node" is referred to as a "downlink side".

First, a transmission unit 211 of the controller 20 proactively sets (transmits) the entries of an FDB and an ACL to each switch 10 (see reference numeral K1). Specifically, the transmission unit 211 sets the entries of the ACL to each switch 10 such that path switching is performed, considering the state of the link.

In the example illustrated in FIG. 17, a link failure occurs between SW21 and SW31 (see reference numeral K2).

A link state monitoring controller 116 of SW21 detects a link failure which occurs on the uplink (root node) side and switches the path to SW31 to another predetermined usable uplink switch 10, that is, SW32 (see reference numeral K3).

A link state monitoring controller 116 of SW31 detects a link failure which occurs on the downlink (leaf node) side. Then, a switch cooperation unit 117 transmits a link failure ID to all of the connected switches 10, that is, SW23 (see reference numeral K4).

A switch cooperation unit 117 of SW23 receives the link failure ID from SW31. Then, a link state monitoring controller 116 switches the path to SW31 to another predetermined usable uplink switch 10, that is, SW32 (see reference numeral K5).

Figure 18:
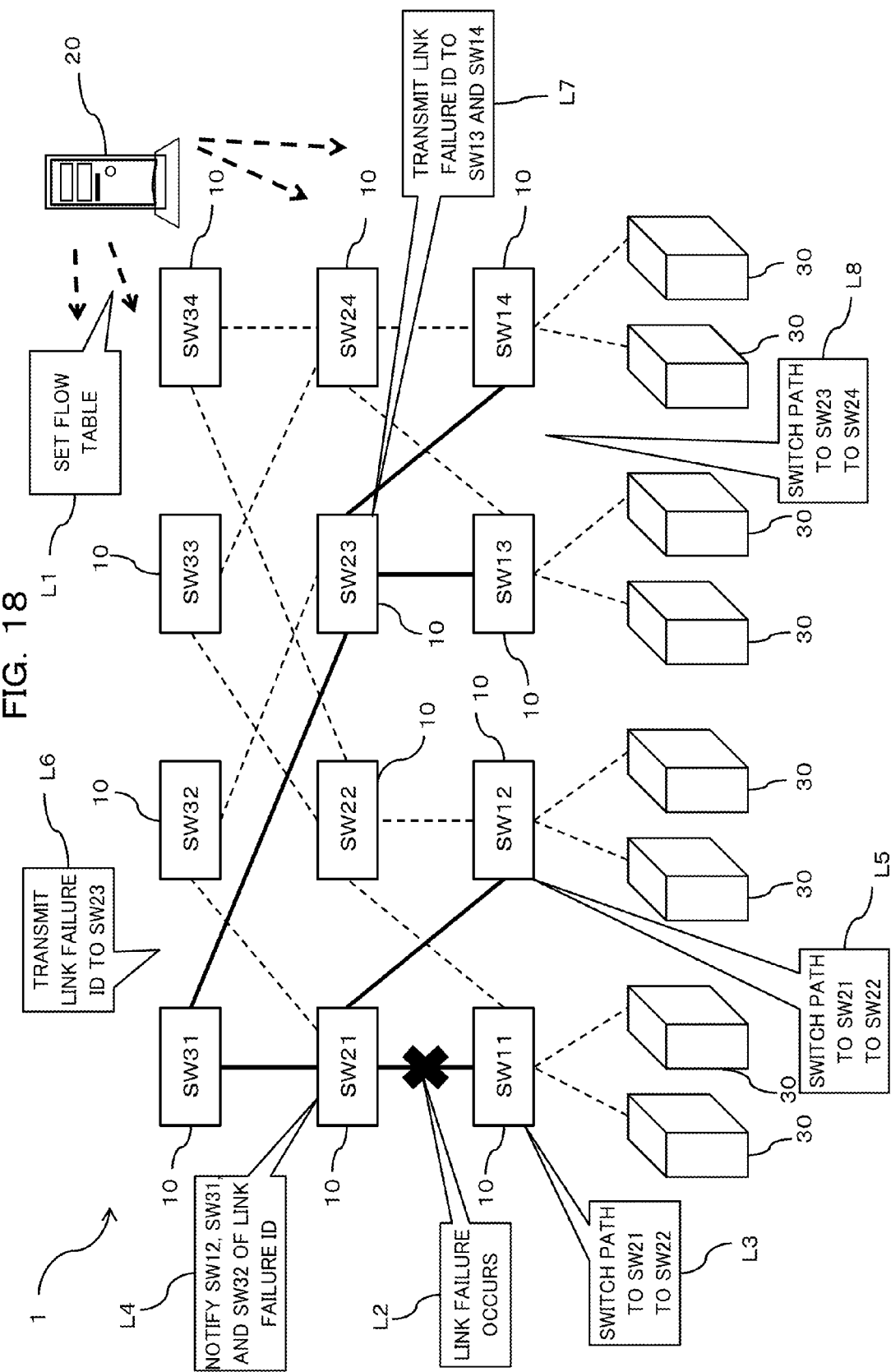
FIG. 18 is a diagram illustrating a second example of the path switching process when a link failure occurs in the network system as an example of the embodiment.

FIG. 18 is a diagram illustrating a second example of the path switching process when a link failure occurs in the network system as an example of the embodiment.

A network system 1 illustrated in FIG. 18 has the same fat tree structure as the network system 1 illustrated in FIG. 17.

First, a transmission unit 211 of a controller 20 proactively sets (transmits) the entries of FDB and ACL to each switch 10 (see reference numeral L1). Specifically, the transmission unit 211 sets the entries of the ACL to each switch 10 such that path switching is performed, considering the state of a link.

In the example illustrated in FIG. 18, a link failure occurs between SW11 and SW21 (see reference numeral L2).

A link state monitoring controller 116 of SW11 detects a link failure which occurs on the uplink (root node) side and switches the path to SW21 to another predetermined usable uplink switch 10, that is, SW22 (see reference numeral L3).

A link state monitoring controller 116 of SW21 detects a link failure which occurs on the downlink (leaf node) side. Then, a switch cooperation unit 117 transmits a link failure ID to all of the connected switches 10, that is, SW12, SW31, and SW32 (see reference numeral L4).

A switch cooperation unit 117 of SW12 receives the link failure ID from SW21. Then, a link state monitoring controller 116 switches the path to SW21 to another predetermined usable uplink switch 10, that is, SW22 (see reference numeral L5).

Switch cooperation units 117 of SW31 and SW32 receive the link failure ID from SW21. SW31 and SW32 are both the switches 10 at the root nodes and is not connected with the uplink-side switch 10. Therefore, the switch cooperation units 117 of SW31 and SW32 transmit (relay) the received link failure ID to all of the connected switches 10, that is, SW23 (see reference numeral L6).

A switch cooperation unit 117 of SW23 receives the link failure ID from SW31 and SW32. Since there is no usable communication path on the uplink (root node) side of SW23, the switch cooperation unit 117 of SW23 transmits (relays) the received link failure ID to all of the connected switches 10, that is, SW13 and SW14 (see reference numeral L7).

Switch cooperation units 117 of SW13 and SW14 receive the link failure ID from SW23. Then, link state monitoring controllers 116 of SW13 and SW14 switch the path to SW23 to another predetermined usable uplink switch 10, that is, SW24 (see reference numeral L8).

Figure 19:
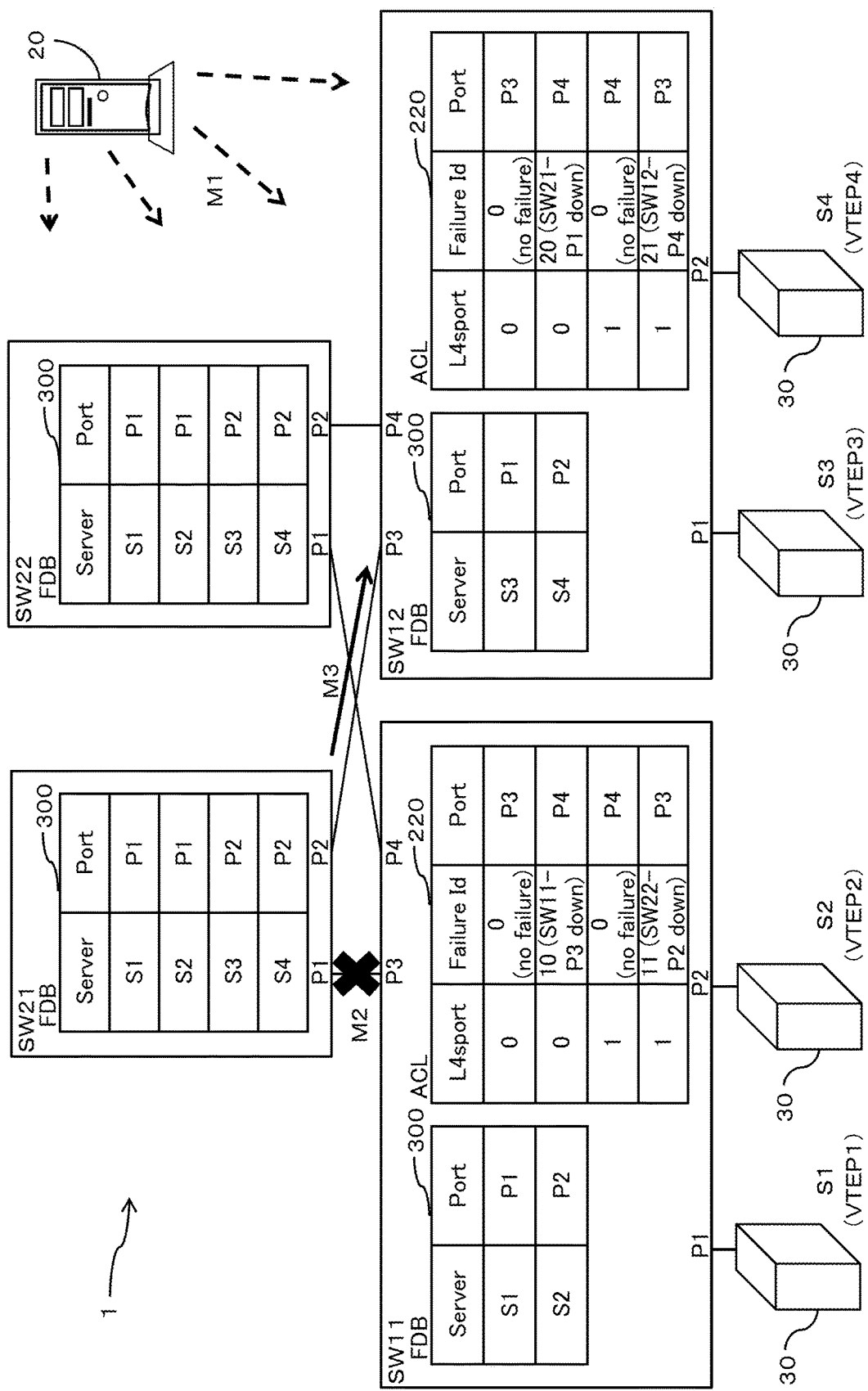
FIG. 19 is a diagram illustrating the details of the path switching process when a link failure occurs in the network system as an example of the embodiment.

FIG. 19 is a diagram illustrating the details of a path switching process when a link failure occurs in a network system as an example of the embodiment.

A network system 1 illustrated in FIG. 19 has a fat tree structure and includes four switches 10 (SW11, SW12, SW21, and SW22), a controller 20, and four server apparatuses 30 (S1 to S4). In addition, it is assumed that the value of L4 sport when an ACL is searched for is masked with a mask value 0x0001, which is not illustrated in FIG. 19 for simplicity of illustration.

Hereinafter, in the description with reference to FIG. 19, when a specific switch 10 is designated, it is simply represented by "SW11", "SW12", "SW21", or "SW22". In addition, hereinafter, in the description with reference to FIG. 19, when a specific server apparatus 30 is designated, it is simply represented by "S1", "S2", "S3", or "S4".

First, a transmission unit 211 of a controller 20 proactively sets (transmits) the entries (an FDB table 300 and an ACL table 220) of an FDB and the ACL to each switch 10 (see reference numeral M1). Specifically, the transmission unit 211 stores the FDB table 300 in an FDB storage unit 131 of a memory 130 and stores the ACL table 220 in an ACL storage unit 121 of a TCAM 120. That is, the transmission unit 211 sets the ACL table 220 to each switch 10 such that path switching is performed, considering the state of a link. In FIG. 19, the ACL tables 220 of SW21 and SW22 are not illustrated. However, the transmission unit 211 may set the ACL table 220 to SW21 and SW22.

The ACL table 220 illustrated in FIG. 19 stores Failure Id (link failure ID), in addition to L4 sport and Port stored in the ACL table 200 illustrated in FIGS. 14 and 15. That is, the ACL table 220 stores L4 sport, Failure Id, and Port so as to be associated with each other. The link failure ID is identification information indicating the link (communication path) from which a failure is detected. For example, the ACL table 220 of SW11 stores Port=P3 and Port=P4 as output destination ports so as to be associated with L4 sport=0 when Failure Id is 0 and when Failure Id is 10, respectively. In addition, Failure Id=0 indicates that no failure occurs and Failure Id=10 indicates that a link failure (SW11-P3 down) occurs in a P3 port of SW11. In addition, the ACL table 220 of SW11 stores Port=P4 and Port=P3 as the output destination ports so as to be associated with L4 sport=1 when Failure Id is 0 and when Failure Id is 11, respectively. Here, Failure Id=11 indicates that a link failure (SW22-P2 down) occurs in a P2 port of SW22. In addition, the ACL table 220 of SW12 stores Port=P3 and Port=P4 as output destination ports so as to be associated with L4 sport=0 when Failure Id is 0 and when Failure Id is 20, respectively. Here, Failure Id=20 indicates that a link failure (SW21-P1 down) occurs in a P1 port of SW21. Furthermore, the ACL table 220 of SW21 stores Port=P4 and Port=P3 as output destination ports so as to be associated with L4 sport=1 when Failure Id is 0 and when Failure Id is 21, respectively. Here, Failure Id=21 indicates that a link failure (SW12-P4 down) occurs in a P4 port of SW12.

Next, an example in which packet #2 represented by reference numerals F2 and F3 in FIG. 15 is transmitted when no link failure occurs in the network system 1 will be described with reference to FIG. 19.

As represented by reference numeral F2 in FIG. 15, S3, S1, and 0 are set to DA, SA, and L4 sport of packet #2, respectively.

An FDB control unit 132 of SW11 checks whether an action when DA is S3 is stored, with reference to the FDB table 300. Here, since S3 is not stored in the FDB table 300 of SW1, an ACL control unit 122 of SW11 checks the action when L4 sport is 0, with reference to the ACL table 220. Here, the link failure ID is not written to the ACL table 220 and Port=P3 is stored with respect to L4 sport=0 in the ACL table 220 of SW11. An ACL control unit 122 of SW11 selects a P3 port as the action, as represented by reference numeral F2 in FIG. 15. That is, the ACL control unit 122 transmits a packet to SW21 through the P3 port of SW11.

An FDB control unit 132 of SW21 checks whether the action when DA is S3 is stored, with reference to the FDB table 300. Here, since Port=P2 is stored with respect to Server=S3 in the FDB table 300 of SW21, the FDB control unit 132 outputs a packet from the P2 port as the action, as represented by reference numeral F3 in FIG. 15. That is, the FDB control unit 132 transmits a packet to SW12 through the P2 port of SW21.

An FDB control unit 132 of SW12 checks whether the action when DA is S3 is stored, with reference to the FDB table 300. Here, since Port=P1 is stored with respect to Server=S3 in the FDB table 300 of SW12, the FDB control unit 132 outputs a packet from the P1 port as the action. That is, the FDB control unit 132 transmits a packet to S3 through the P1 port of SW12.

Next, the details of a path switching process when a link failure occurs will be described with reference to FIG. 19.

As described above, a transmission unit 211 of the controller 20 proactively sets (transmits) the entries (the FDB table 300 and the ACL table 220) of the FDB and the ACL to each switch 10 (see reference numeral M1).

Here, a link failure occurs between the P3 port of SW11 and the P1 port of SW21 (see reference numeral M2).

A link state monitoring controller 116 of SW11 detects the link failure which occurs in the P3 port and switches the path to SW21 through the P3 portion to SW22 through a P4 port. Specifically, the link state monitoring controller 116 inputs, to the ACL table 220, Failure Id=10 indicating that the link failure has occurred in the P3 port of SW11, on the basis of a failure ID table which will be described below. Then, the link state monitoring controller 116 switches the output destination port for a packet with L4 sport=0 from the P3 port to the P4 port.

A link state monitoring controller 116 of SW21 detects the link failure which occurs in the P1 port. Then, a switch cooperation unit 117 transmits, to SW12, Failure Id=20 indicating that the link failure has occurred in the P1 port of SW21 as a link failure occurrence notification, on the basis of a failure ID table which will be described with reference to FIG. 20 (see reference numeral M3).

A switch cooperation unit 117 of SW12 receives the link failure occurrence notification (Failure Id=20) from SW21. Then, a link state monitoring controller 116 switches the path to SW21 through the P3 port to SW22 through the P4 port. Specifically, the link state monitoring controller 116 inputs, to the ACL table 220, Failure Id=20 received from SW21, on the basis of the failure ID table which will be described with reference to FIG. 20. Then, the link state monitoring controller 116 switches the output destination port for a packet with L4 sport=0 from the P3 port to the P4 port.

That is, the ACL table 220 stores a link failure ID indicating the communication path from which a failure is detected and output destination port information indicating the communication path of a packet output destination so as to be associated with each other. Then, the link state monitoring controller 116 writes the link failure ID to the ACL table 220 to switch a plurality of communication paths.

Next, an example in which packet #2 represented by reference numerals F2 and F3 in FIG. 15 is transmitted when a link failure occurs between the P3 port of SW11 and the P1 port of SW21 (see reference numeral M2) will be described with reference to FIG. 19.

As represented by reference numeral F2 in FIG. 15, S3, S1, and 0 are set to DA, SA, and L4 sport of packet #2, respectively.

The FDB control unit 132 of SW11 checks whether the action when DA is S3 is stored, with reference to the FDB table 300. Here, since S3 is not stored in the FDB table 300 of SW1, the ACL control unit 122 of SW11 checks the action when L4 sport is 0, with reference to the ACL table 220. Here, Port=P3 is stored in the ACL table 220 of SW11 and Failure Id=10 are written thereto with respect to L4 sport=0. The ACL control unit 122 of SW11 performs the action when Failure Id is 10 prior to the action when Failure Id is 0, thereby selecting the P4 port. That is, the ACL control unit 122 transmits a packet to SW22 through the P4 port of SW11.

The FDB control unit 132 of SW22 checks whether the action when DA is S3 is stored, with reference to the FDB table 300. Here, since Port=P2 is stored with respect to Server=S3 in the FDB table 300 of SW22, the FDB control unit 132 outputs a packet from the P2 port as the action. That is, the FDB control unit 132 transmits a packet to SW12 through the P2 port of SW22.

The FDB control unit 132 of SW12 checks whether the action when DA is S3 is stored, with reference to the FDB table 300. Here, since Port=P1 is stored with respect to Server=S3 in the FDB table 300 of SW12, the FDB control unit 132 outputs a packet from the P1 port as the action. That is, the FDB control unit 132 transmits a packet to S3 through the P1 port of SW12.

As such, when a link failure occurs between the P3 port of SW11 and the P1 port of SW21 (see reference numeral M2), for example, it is possible to transmit a packet in which S1, S3, and 0 are set to DA, SA, and L4 sport, respectively, using the same method as that for packet #2. Port=P3 is stored in the ACL table 220 of SW12 and Failure Id=20 is written thereto, with respect to L4 sport=0. Here, the ACL control unit 122 of SW12 performs the action when Failure Id is 20, prior to the action when Failure Id is 0, thereby selecting the P4 port. Therefore, SW12 does not transmit a packet to SW21 in which a link failure occurs, but can transmit a packet to SW22 which is a usable communication path.

That is, the ACL table 220 stores, as rule information, the link failure ID and output destination port information so as to be associated with header information after masking which is obtained by applying a mask corresponding to the number of output destination port information items to a predetermined position of the header information of an input packet. Then, the switch 10 controls the input packet on the basis of the rule information which is selected on the basis of the header information after masking. In other words, when a link failure ID is input to the ACL table 220, the switch 10 outputs an input packet to a port which is associated with the link failure ID.

FIG. 20 is a diagram illustrating the failure ID table in the network system as an example of the embodiment.

The transmission unit 211 of the controller 20 proactively sets (transmits) the FDB table 300, the ACL table 220, and the failure ID table illustrated in FIG. 20 to each switch 10.

FIG. 20 illustrates an example of the failure ID table which is set to SW12 illustrated in FIG. 19.

The failure ID table stores the content of a failure and the link failure ID which will be set to the ACL table 220 by the link state monitoring controller 116 when the failure occurs so as to be associated with each other. For example, as illustrated in FIG. 20, when link-down occurs in the P3 port of SW12, the link state monitoring controller 116 of SW12 writes Failure Id=20 to the ACL table 220 with reference to the failure ID table. When link-down occurs in the P4 port of SW12, the link state monitoring controller 116 of SW12 writes Failure Id=21 to the ACL table 220 with reference to the failure ID table.

Figure 21B:
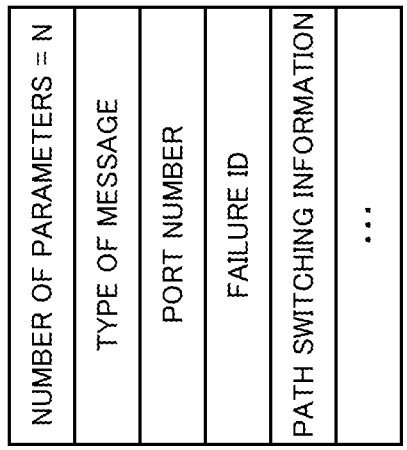
FIG. 21B is a diagram illustrating the details of RPC parameters of the control message in the network system as an example of the embodiment.
Figure 21A:
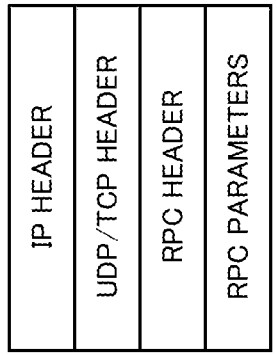
FIG. 21A is a diagram illustrating a control message in the network system as an example of the embodiment.

FIG. 21A is a diagram illustrating a control message in the network system as an example of the embodiment and FIG. 21B is a diagram illustrating the details of RPC parameters.

The switch cooperation unit 117 transmits a link failure occurrence notification, a link failure recovery notification, and a path switching response (responses to the link failure occurrence notification and the link failure recovery notification) using the control message illustrated in FIGS. 21A and 21B.

As illustrated in FIG. 21A, the control message includes an IP header, a user datagram protocol/transmission control protocol (UDP/TCP) header, a remote procedure call (RPC) header, and the RPC parameters.

As illustrated in FIG. 21B, the RPC parameters include the number of parameters, the type of message, a port number, a failure ID, and path switching information.

The type of message indicates discrimination among the link failure occurrence notification, the link failure recovery notification, and the path switching response. For example, the switch cooperation unit 117 sets 10, 11, and 12 to the link failure occurrence notification, the link failure recovery notification, and the path switching response, respectively.

The port number indicates the ID and port number of the switch in which a failure occurs or the failure is recovered. For example, the switch cooperation unit 117 sets 21/01 to the port number when a failure occurs or the failure is recovered in the P1 port of SW21.

The failure ID indicates the content of the failure. For example, the switch cooperation unit 117 sets 0 to the failure ID when no failure occurs and sets 20 to the failure ID when link-down occurs in the P1 port of SW21.

The path switching information indicates the switched path. For example, the switch cooperation unit 117 sets 12/03 to the path switching information when the path of SW12 is switched to the P3 port.

[A-2] Operation

Figure 22:
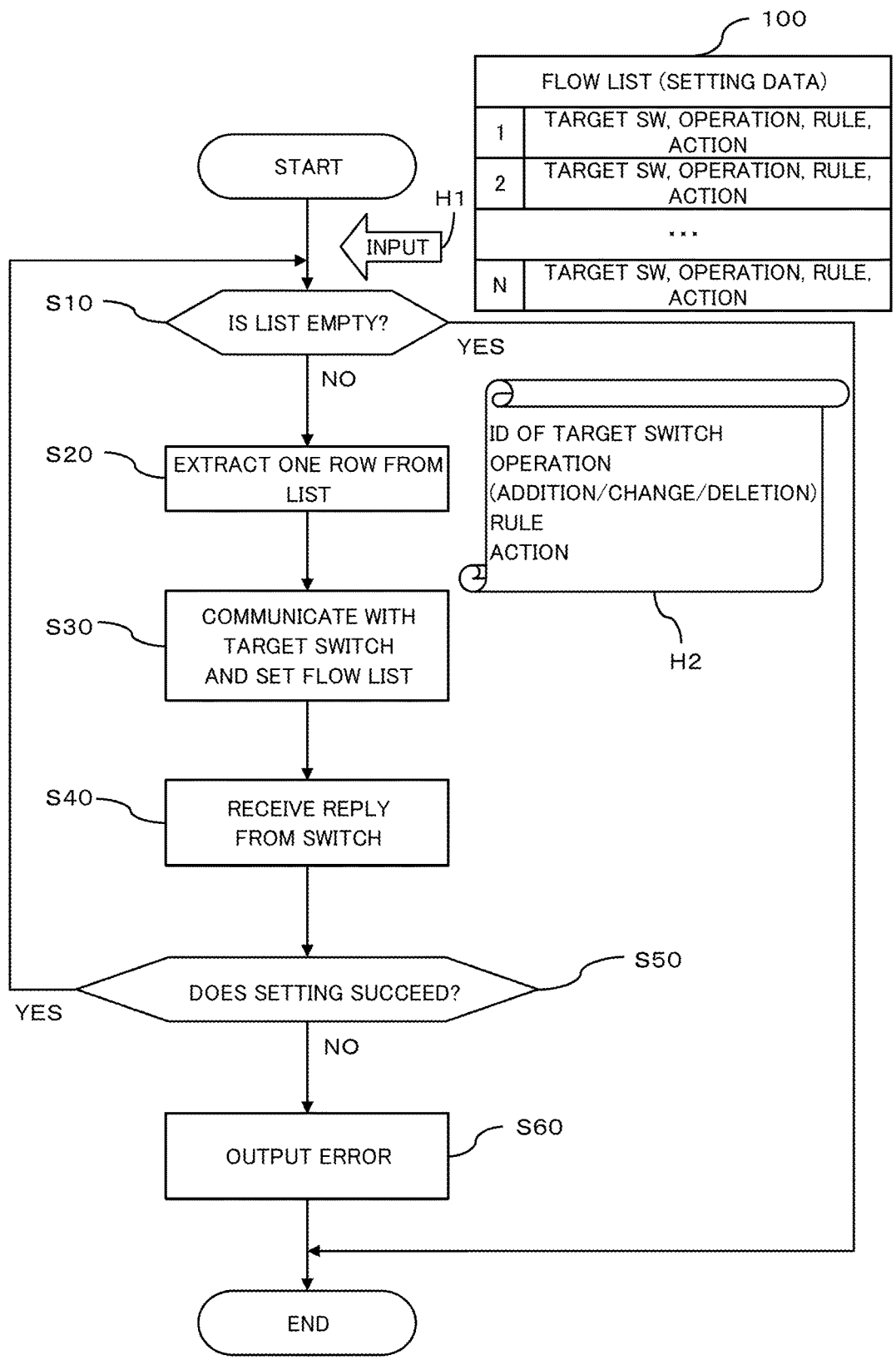
FIG. 22 is a flowchart illustrating a flow list setting process of a controller provided in the network system as an example of the embodiment.

The process of setting the flow list 100 in the controller 20 provided in the network system 1 having the above-mentioned structure as an example of the embodiment will be described with reference to the flowchart (Steps S10 to S60) illustrated in FIG. 22.

First, the flow list 100 which is made by the method which will be described with reference to FIG. 23 is input (stored in) to, for example, the storage device 23 of the controller 20 (see reference numeral H1). In the input flow list 100, for example, a target SW indicating the switch 10 to be set, an operation of designating the addition, deletion, and change of a flow, a rule which is a matching rule for identifying the flow, and an action indicating an operation when matching is performed are associated with each other.

The transmission unit 211 of the controller 20 determines whether the flow list 100 is empty (Step S10). In other words, the transmission unit 211 determines whether all of the content of 1 to N in the flow list 100 illustrated in FIG. 22 has been set to the target switch 10.

When the flow list 100 is empty (see a YES route in Step S10), the process of the controller 20 setting the flow list 100 is completed.

When the flow list 100 is not empty (see a NO route in Step S10), the transmission unit 211 extracts one row from the flow list 100 (Step S20). Information extracted from the flow list 100 includes, for example, the ID of the target switch, the operation (addition/change/deletion), the rule, and the action (see reference numeral H2).

The transmission unit 211 communicates with the target switch 10 and sets the flow list 100 (Step S30).

The transmission unit 211 receives a reply from the switch 10 (Step S40).

The transmission unit 211 determines whether setting has succeeded on the basis of the reply from the switch 10 (Step S50).

When setting has succeeded (see a YES route in Step S50), the process proceeds to the next row of the flow list 100 and returns to Step S10.

When setting has not succeeded (see a NO route in Step S50), the transmission unit 211 outputs, for example, an error to a display device (not illustrated) of the controller 20 (Step S60). The process of the controller 20 setting the flow list 100 is completed.

FIG. 23 is a diagram illustrating an algorithm which is used in a flow table creation process in the network system as an example of the embodiment.

The algorithm illustrated in FIG. 23 receives topology information T as an input and outputs a presetting flow setting list L. The input topology information T may be statically held by the controller 20 or it may be given by dynamic detection.

A function search tree (n) receives node information n as an input and returns a server list S which is dependent to the node information n. In addition, an entry group to be set to the node information n is added to the flow list L.

Flow setting information of each switch 10 can be added to the flow list L for the proactive setting by recursively performing Search Tree (v) on the subtrees from root-node r because it returns node-id of the node information n if the node information n indicates Server (the server apparatus 30).

Figure 24:
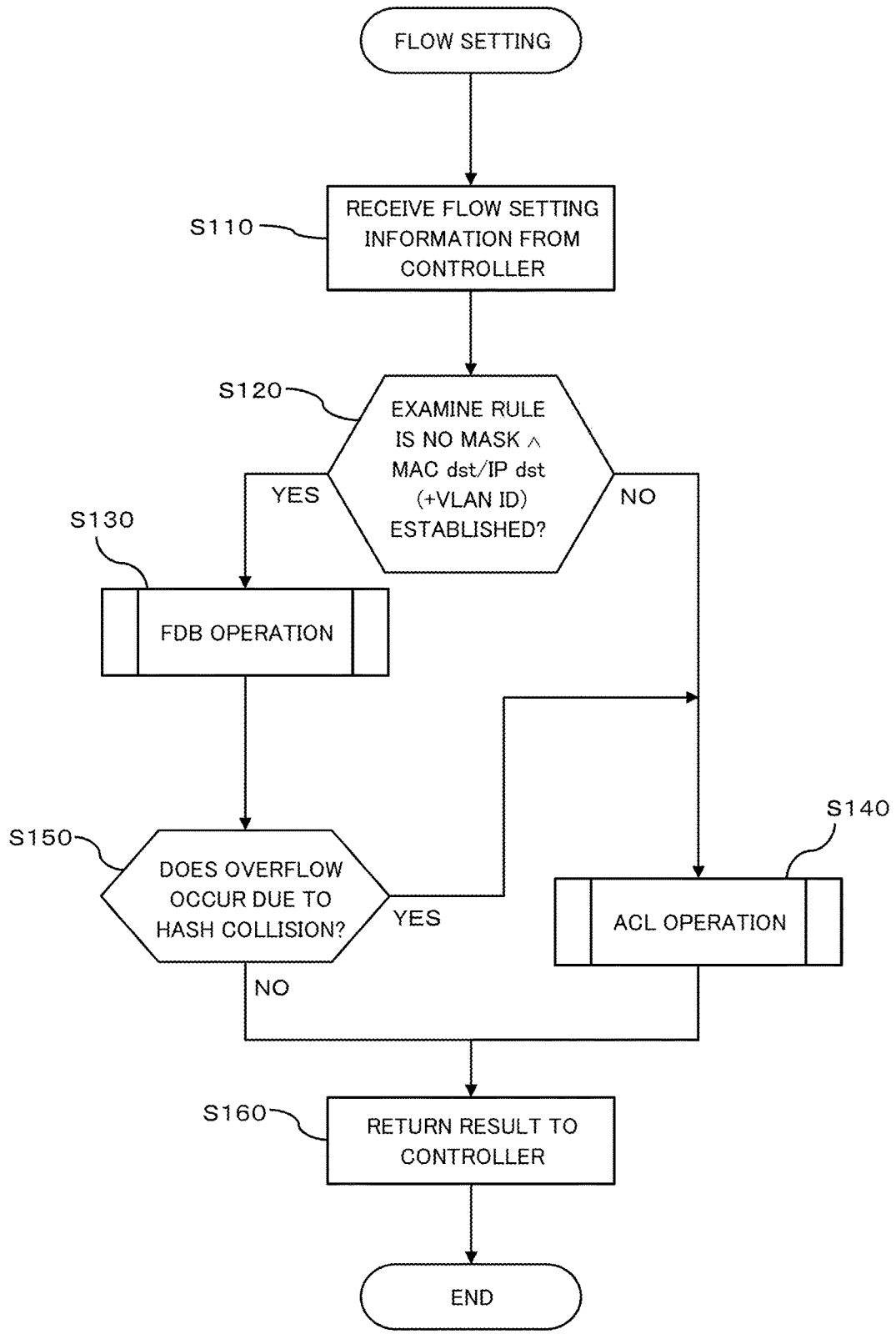
FIG. 24 is a flowchart illustrating a flow list setting process of a switch provided in the network system as an example of the embodiment.

Next, the process of setting the flow list 100 in the switch 10 provided in the network system 1 as an example of the embodiment will be described with reference to the flowchart (Steps S110 to S160) illustrated in FIG. 24.

The setting unit 110 of the switch 10 receives flow setting information from the controller 20 (Step S110).

The setting unit 110 examines the rule of the flow setting information and determines whether no mask Λ MAC dst/IP dst (+VLAN ID) is established (Step S120). In the determination conditions of Step S120, "Λ" and "/" indicate "and" and "or", respectively. The determination conditions of Step S120 indicate that the determination result is "YES" even though a VLAN ID is included, in addition to MAC dst or IP dst.

Figure 25:
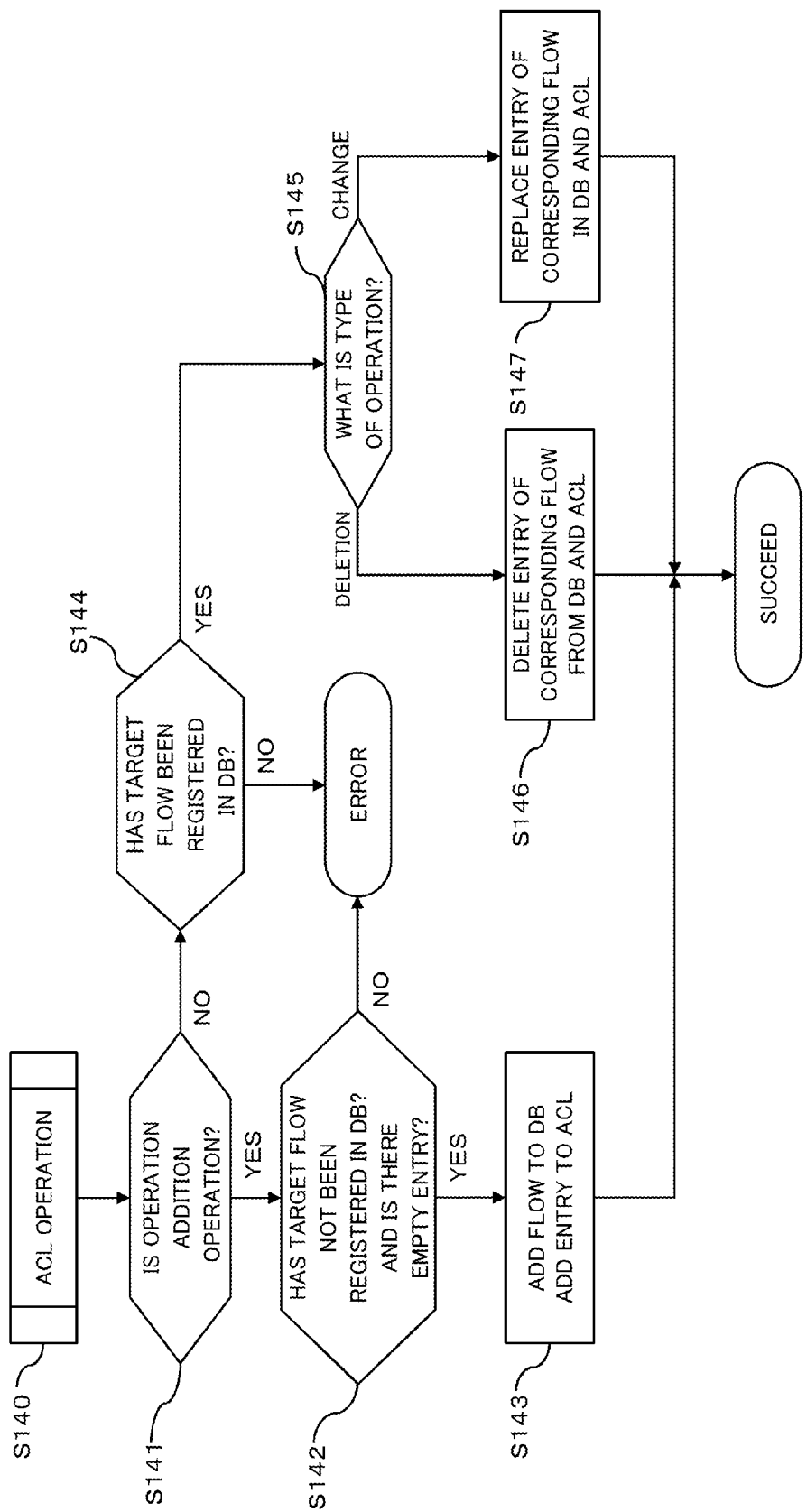
FIG. 25 is a flowchart illustrating an ACL table setting process of the switch provided in the network system as an example of the embodiment.

When no mask Λ MAC dst/IP dst (+VLAN ID) is not established (see a NO route in Step S120), the ACL setting unit 111 performs an ACL operation which will be described below with reference to FIG. 25 (Step S140) and the process proceeds to Step S160.

Figure 26:
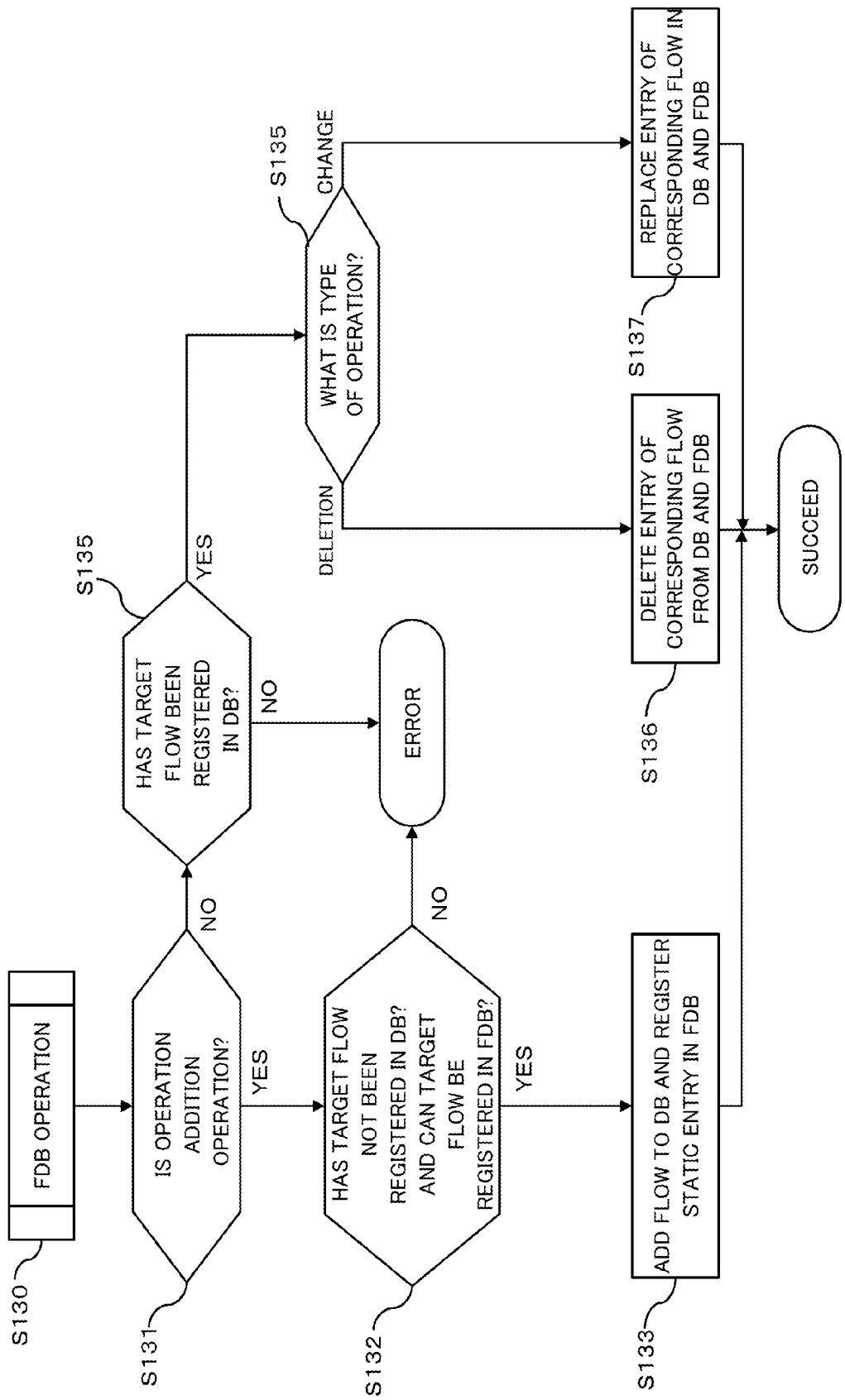
FIG. 26 is a flowchart illustrating an FDB table setting process of the switch provided in the network system as an example of the embodiment.

When no mask Λ MAC dst/IP dst (+VLAN ID) is established (see a YES route in Step S120), the FDB setting unit 112 performs an FDB operation which will be described below with reference to FIG. 26 (Step S130).

The setting unit 110 determines whether a target flow is registered in a database by the FDB operation in Step S130. That is, the setting unit 110 determines whether an overflow occurs due to hash collision in the FDB operation in Step S130 (Step S150).

When an overflow occurs due to hash collision in the FDB operation in Step S130 (see a YES route in Step S150), the process proceeds to S140.

On the other hand, when an overflow does not occur due to hash collision in the FDB operation in Step S130 (see a NO route in Step S150), the process proceeds to S160.

Then, the setting unit 110 returns the setting result to the controller 20 (Step S160) and the process of the switch 10 setting the flow list 100 is completed.

Next, the details of the ACL operation in Step S140 of FIG. 24 will be described with reference to the flowchart (Steps S141 to S147) illustrated in FIG. 25.

The ACL setting unit 111 determines whether the operation is an addition operation (Step S141).

When the operation is addition (see a YES route in Step S141), the ACL setting unit 111 determines whether the target flow has not been registered in the database (DB) and there is an empty entry (Step S142).

When the target flow has not been registered in the database and there is an empty entry (see a YES route in Step S142), the ACL setting unit 111 adds a flow to the database and adds an entry to the ACL (Step S143). The ACL operation succeeds.

On the other hand, when the target flow has been registered in the database or there is no empty entry (see a NO route in Step S142), an error occurs in the ACL operation.

When the operation is not an addition operation (see a NO route in Step S141), the ACL setting unit 111 determines whether the target flow has been registered in the database (Step S144).

When the target flow has been registered in the database (see a YES route in Step S144), the ACL setting unit 111 determines whether the operation is a deletion or change operation (Step S145).

When the operation is a deletion operation (see a deletion route in Step S145), the ACL setting unit 111 deletes the entry of the corresponding flow from the database and the ACL (Step S146). The ACL operation succeeds.

When the operation is a change operation (see a change route in Step S145), the ACL setting unit 111 replaces the corresponding flow in the database and the ACL (Step S147). The ACL operation succeeds.

When the target flow has not been registered in the database (see a NO route in Step S144), an error occurs in the ACL operation.

Next, the details of the FDB operation in Step S130 of FIG. 24 will be described with reference to the flowchart (Steps S131 to S137) illustrated in FIG. 26.

The FDB setting unit 112 determines whether the operation is an addition operation (Step S131).

When the operation is an addition operation (see a YES route in Step S131), the FDB setting unit 112 determines whether the target flow has not been registered in the database and can be registered in the FDB (Step S132).

When the target flow has not been registered in the database and can be registered in the FDB (see a YES route in Step S132), the FDB setting unit 112 adds a flow to the database and a static entry is registered in the FDB (Step S133). The FDB operation succeeds.

On the other hand, when the target flow has been registered in the database or it is not capable of being registered in the FDB (see a NO route in Step S132), an error occurs in the FDB operation.

When the operation is not an addition operation (see a NO route in Step S131), the FDB setting unit 112 determines whether the target flow has been registered in the database (Step S134).

When the target flow has been registered in the database (see a YES route in Step S134), the FDB setting unit 112 determines whether the operation is a deletion or change operation (Step S135).

When the operation is a deletion operation (see a deletion route in Step S135), the FDB setting unit 112 deletes the entry of the corresponding flow from the database and the FDB (Step S136). The FDB operation succeeds.

When the operation is a change operation (see a change route in Step S135), the FDB setting unit 112 replaces the entry of the corresponding flow in the database and the FDB (Step S137). The FDB operation succeeds.

When the target flow has not been registered in the database (see a NO route in Step S134), an error occurs in the FDB operation.

Next, a link failure occurrence notification transmission process when a downlink failure occurs in the switch as an example of the embodiment will be described with reference to the flowchart (Steps S211 and S212) illustrated in FIG. 27.

The link state monitoring controller 116 determines whether the occurrence of a downlink (leaf node side) failure is detected (Step S211).

When the occurrence of a downlink (leaf node side) failure is not detected (see a NO route in Step S211), the process returns to Step S211.

On the other hand, when the occurrence of a downlink (leaf node side) failure is detected (see a YES route in Step S211), the switch cooperation unit 117 transmits the link failure occurrence notification (link failure ID) to adjacent switches 10 (Step S212) and the process returns to Step S211.

Next, a path switching information recording process when a downlink failure occurs in the switch as an example of the embodiment will be described with reference to the flowchart (Steps S221 and S222) illustrated in FIG. 28.

Figure 27:
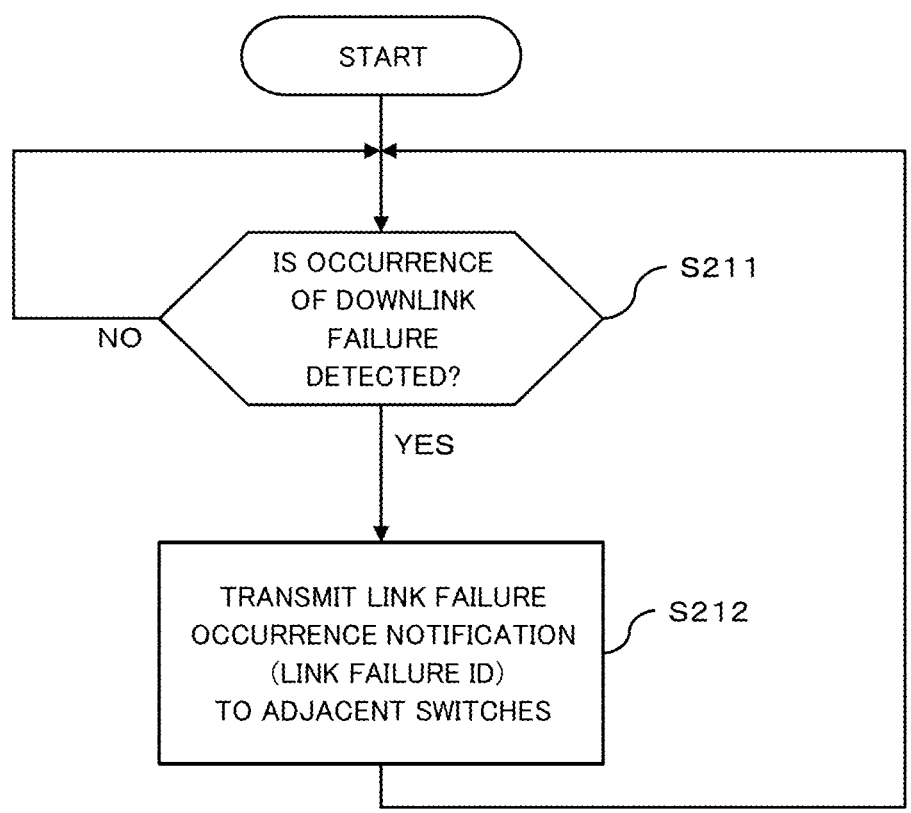
FIG. 27 is a flowchart illustrating a link failure occurrence notification transmission process when a downlink failure occurs in the switch as an example of the embodiment.

The switch cooperation unit 117 of the switch 10 which has performed the process in the flowchart (Steps S211 and S212) illustrated in FIG. 27 determines whether a path switching response is received from other switches 10 (Step S221).

When the path switching response is not received from other switches 10 (see a NO route in Step S221), the process returns to Step S221.

On the other hand, when the path switching response is received from other switches 10 (see a YES route in Step S221), the switch cooperation unit 117 records information included in the control message illustrated in FIGS. 21A and 21B as the path switching information in, for example, the memory 130 (Step S222). Then, the process returns to Step S221.

Figure 29:
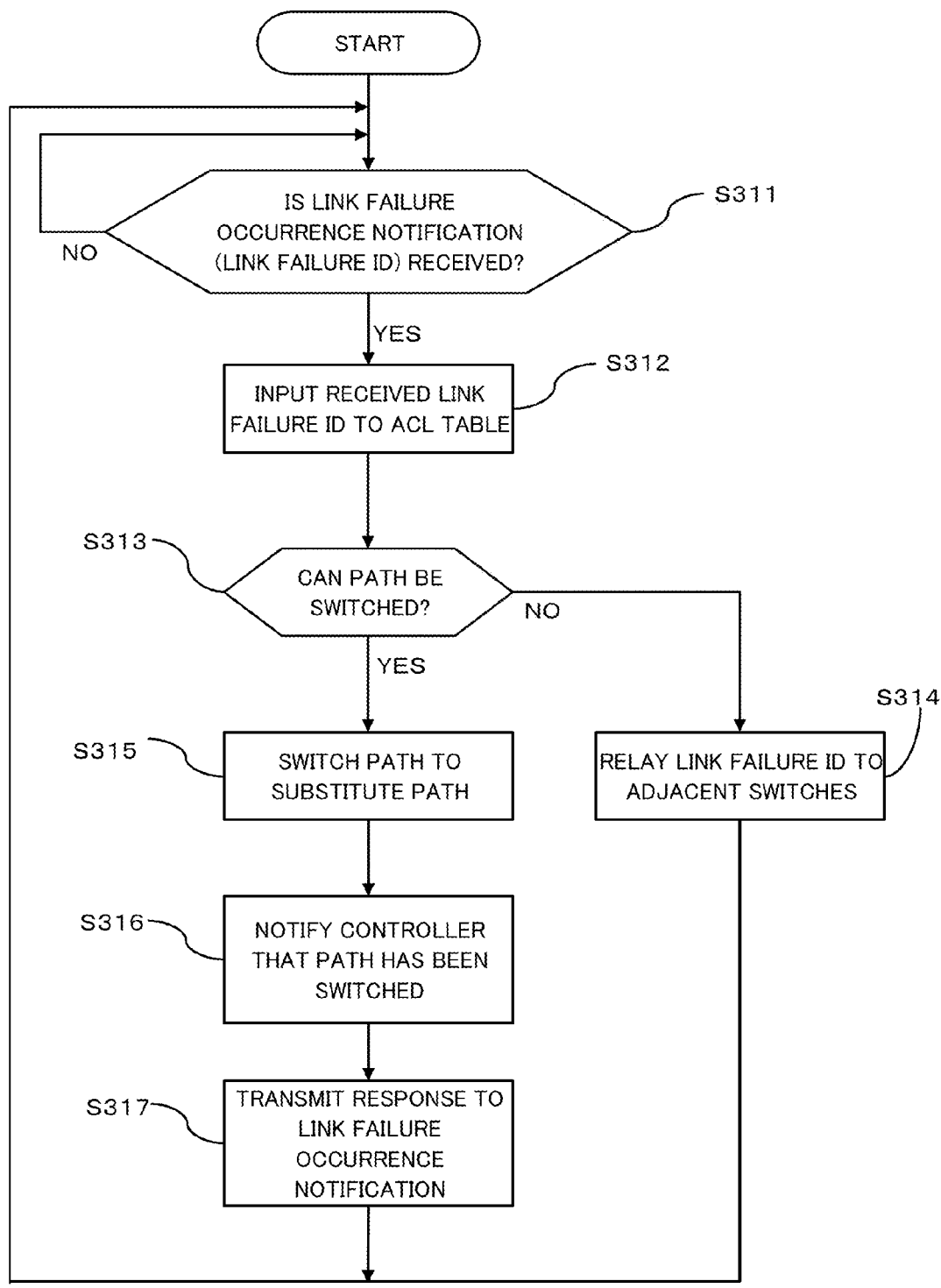
FIG. 29 is a flowchart illustrating a path switching process when a link failure notification is received in the switch as an example of the embodiment.

Next, a path switching process when a link failure notification is received in the switch as an example of the embodiment will be described with reference to the flowchart (Steps S311 to S317) illustrated in FIG. 29.

The switch cooperation unit 117 determines whether the link failure occurrence notification (link failure ID) is received (Step S311).

When the link failure occurrence notification (link failure ID) is not received (see a NO route in Step S311), the process returns to Step S311.

On the other hand, when the link failure occurrence notification (link failure ID) is received (see a YES route in Step S311), the link state monitoring controller 116 inputs the received link failure ID to the ACL table 220 on the basis of the failure ID table illustrated in FIG. 20 (Step S312).

The link state monitoring controller 116 determines whether the path can be switched (Step S313).

When the path is not capable of being switched (see a NO route in Step S313), the switch cooperation unit 117 relays the link failure ID to adjacent switches 10 other than the switch 10 which is the transmission source of the link failure ID (Step S314) and the process returns to Step S311.

On the other hand, when the path can be switched (see a YES route in Step S313), the link state monitoring controller 116 switches the path to the switch 10, which is the transmission source of the link failure ID, to a substitute path (Step S315). A method for switching the path may be a round-robin method or a random method.

The link state monitoring controller 116 notifies the controller 20 that the path has been switched (Step S316).

The switch cooperation unit 117 transmits a path switching response to the switch 10 which is the transmission source of the link failure occurrence notification (Step S317) and the process returns to Step S311.

Figure 30:
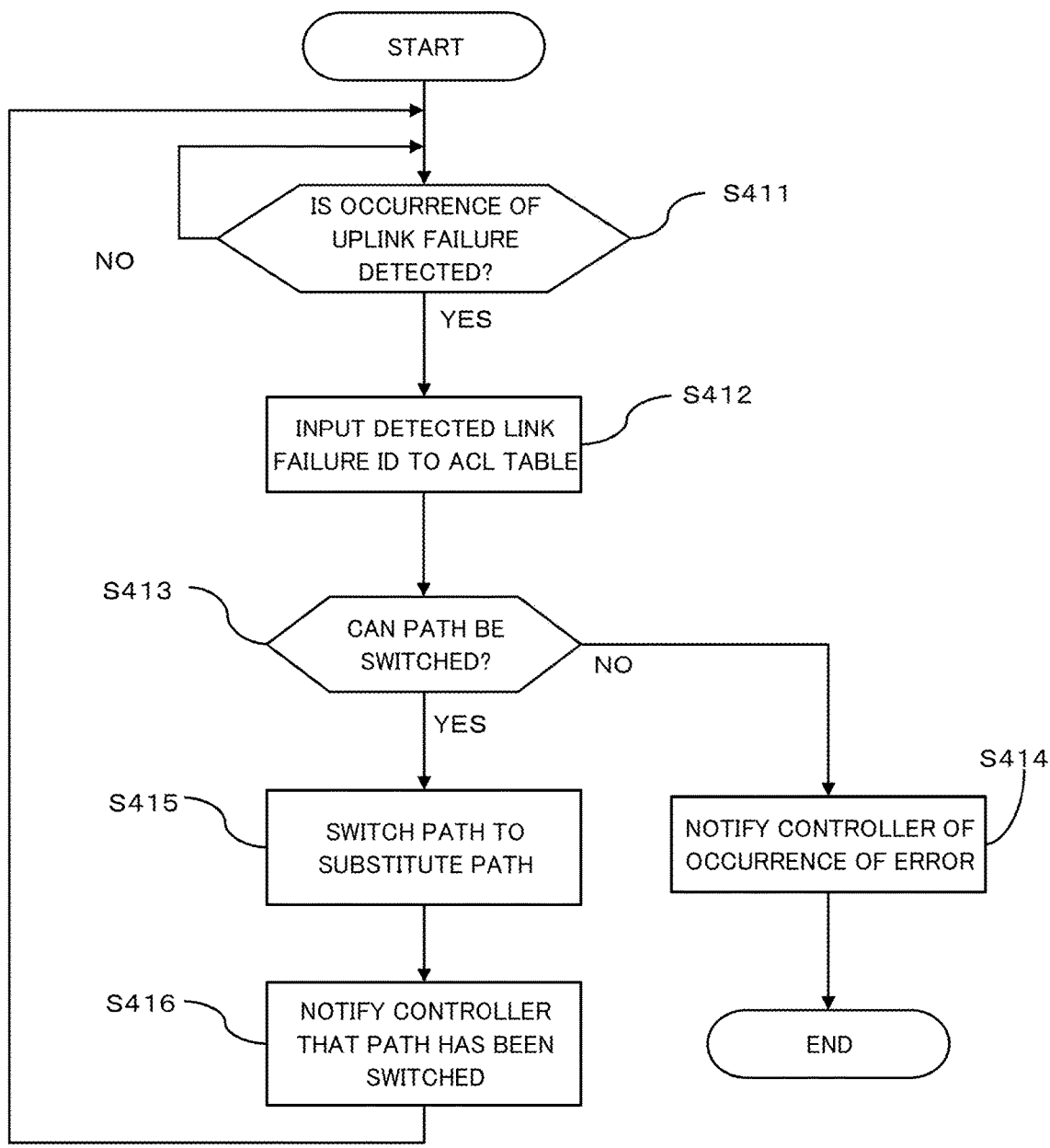
FIG. 30 is a flowchart illustrating a path switching process when an uplink failure occurs in the switch as an example of the embodiment.

Next, a path switching process when an uplink failure occurs in the switch as an example of the embodiment will be described with reference to the flowchart (Steps S411 to S416) illustrated in FIG. 30.

The link state monitoring controller 116 determines whether the occurrence of an uplink (root node side) failure is detected (Step S411).

When the occurrence of the uplink (root node side) failure is not detected (see a NO route in Step S411), the process returns to Step S411.

On the other hand, the occurrence of the uplink (root node side) failure is detected (see a YES route in Step S411), the link state monitoring controller 116 inputs a link failure ID related to the detected link failure to the ACL table 220 on the basis of the failure ID table illustrated in FIG. 20 (Step S412).

The link state monitoring controller 116 determines whether the path can be switched (Step S413).

When the path is not capable of being switched (see a NO route in Step S413), the link state monitoring controller 116 notifies, for example, the controller 20 that an error has occurred (Step S414) and the path switching process is completed.

On the other hand, when the path can be switched (see a YES route in Step S413), the link state monitoring controller 116 switches the path to the switch 10, which is the transmission source of the link failure ID, to a substitute path (Step S415). A method for switching the path may be a round-robin method or a random method.

The link state monitoring controller 116 notifies the controller 20 that the path has been switched (Step S416) and the process returns to Step S411.

Figure 31:
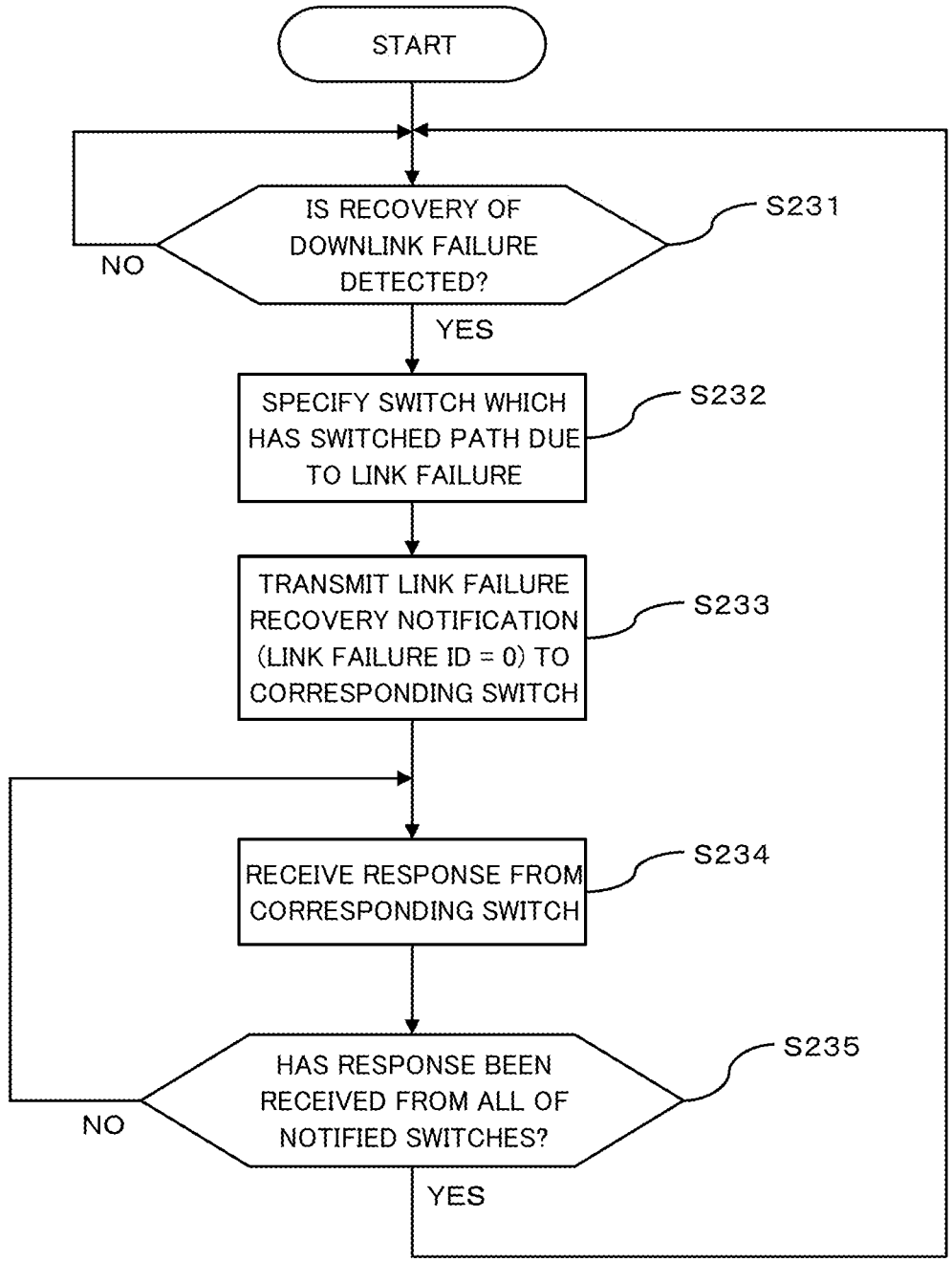
FIG. 31 is a flowchart illustrating a link failure recovery notification transmission process when a downlink failure is recovered in the switch as an example of the embodiment.

Next, a link failure recovery notification transmission process when a downlink failure is recovered in the switch as an example of the embodiment will be described with reference to the flowchart (Steps S231 to S235) illustrated in FIG. 31.

The link state monitoring controller 116 determines whether the recovery of a downlink (leaf node side) failure is detected (Step S231).

When the recovery of the downlink (leaf node side) failure is not detected (see a NO route in Step S231), the process returns to Step S231.

Figure 28:
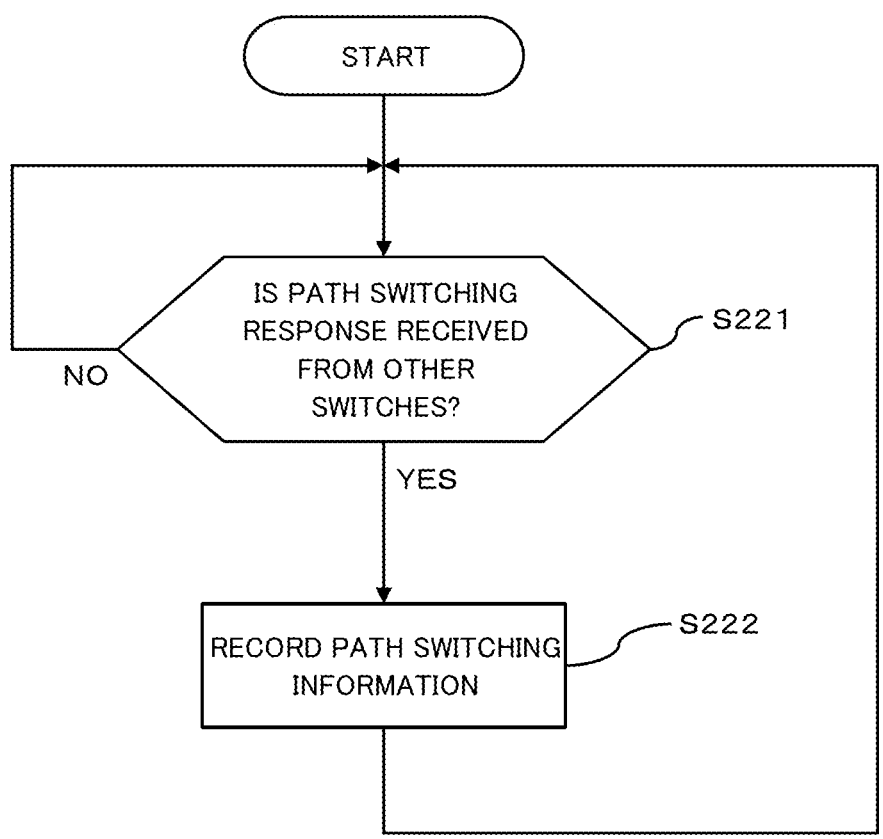
FIG. 28 is a flowchart illustrating a path switching information recording process when a downlink failure occurs in the switch as an example of the embodiment.

On the other hand, when the recovery of the downlink (leaf node side) failure is detected (see a YES route in Step S231), the switch cooperation unit 117 specifies the switch 10 which has switched the path due to the link failure, on the basis of the path switching information acquired in Step S222 of FIG. 28 (Step S232).

The switch cooperation unit 117 transmits a link failure recovery notification (link failure ID=0) to the switch 10 which has switched the path (Step S233).

The switch cooperation unit 117 receives a response from the switch 10 which has switched the path (Step S234) and updates the path switching information.

The switch cooperation unit 117 determines whether a response has been received from all of the switches 10 to which the link failure recovery notification has been transmitted (Step S235).

When the response has not been received from all of the switches 10 to which the link failure recovery notification has been transmitted (see a NO route in Step S235), the process returns to Step S234.

On the other hand, when the response has been received from all of the switches 10 to which the link failure recovery notification has been transmitted (see a YES route in Step S235), the process returns to Step S231.

Figure 32:
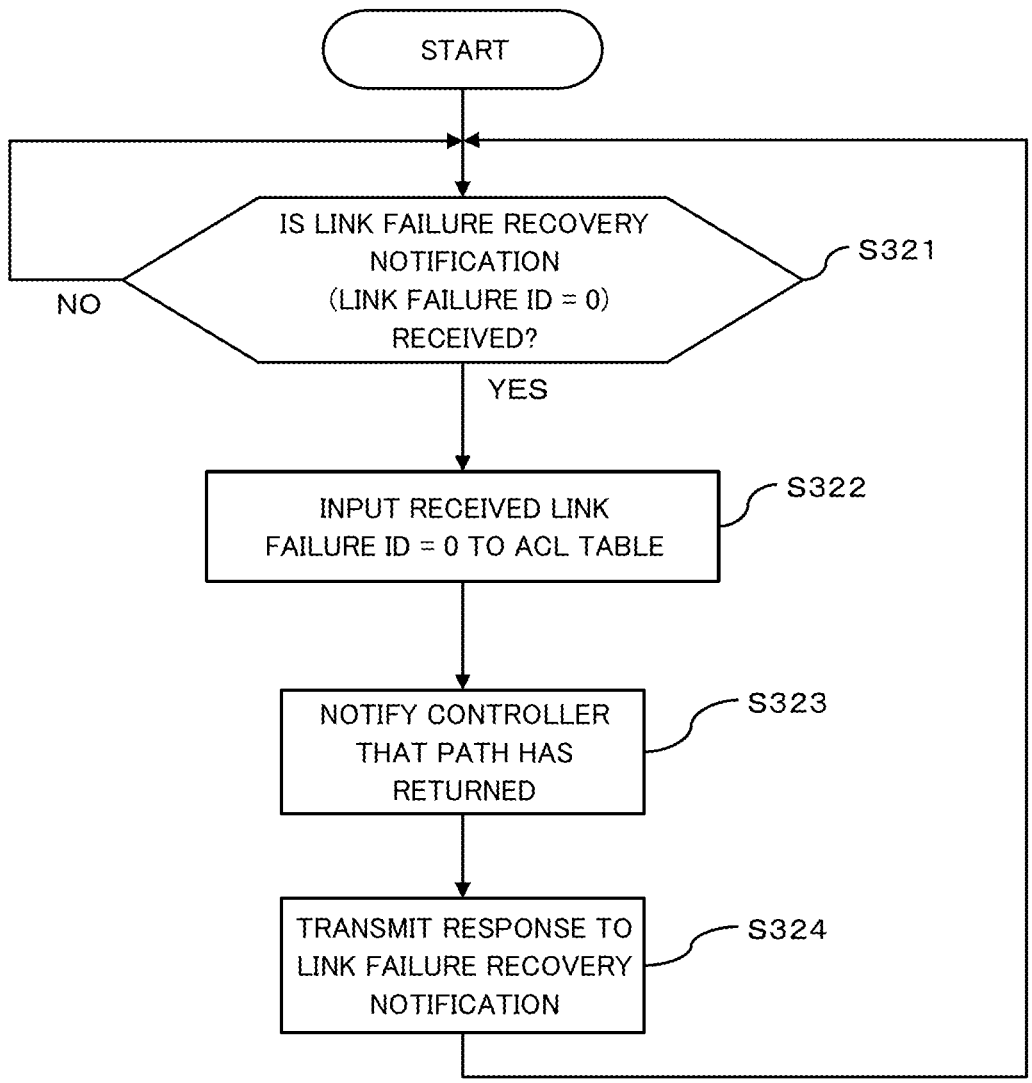
FIG. 32 is a flowchart illustrating a process of returning a path to a state before switching when an uplink failure recovery notification is received in the switch as an example of the embodiment.

Next, a process of returning to the state before the path is switched when the link failure recovery notification is received in the switch as an example of the embodiment will be described with reference to the flowchart (Steps S321 to S324) illustrated in FIG. 32.

The switch cooperation unit 117 determines whether the link failure recovery notification (link failure ID=0) is received (Step S321).

When the link failure recovery notification (link failure ID=0) is not received (see a NO route in Step S321), the process returns to Step S321.

On the other hand, when the link failure recovery notification (link failure ID=0) is received (see a YES route in Step S321), the link state monitoring controller 116 inputs the received link failure ID=0 to the ACL table 220 (Step S322) and returns the path to the state before the link failure occurs.

The link state monitoring controller 116 notifies the controller that the path has returned to the state before the link failure occurs (Step S323).

The switch cooperation unit 117 transmits a path switching response to the switch 10 which has transmitted the link failure recovery notification (Step S324) and the process returns to Step S321.

Figure 33:
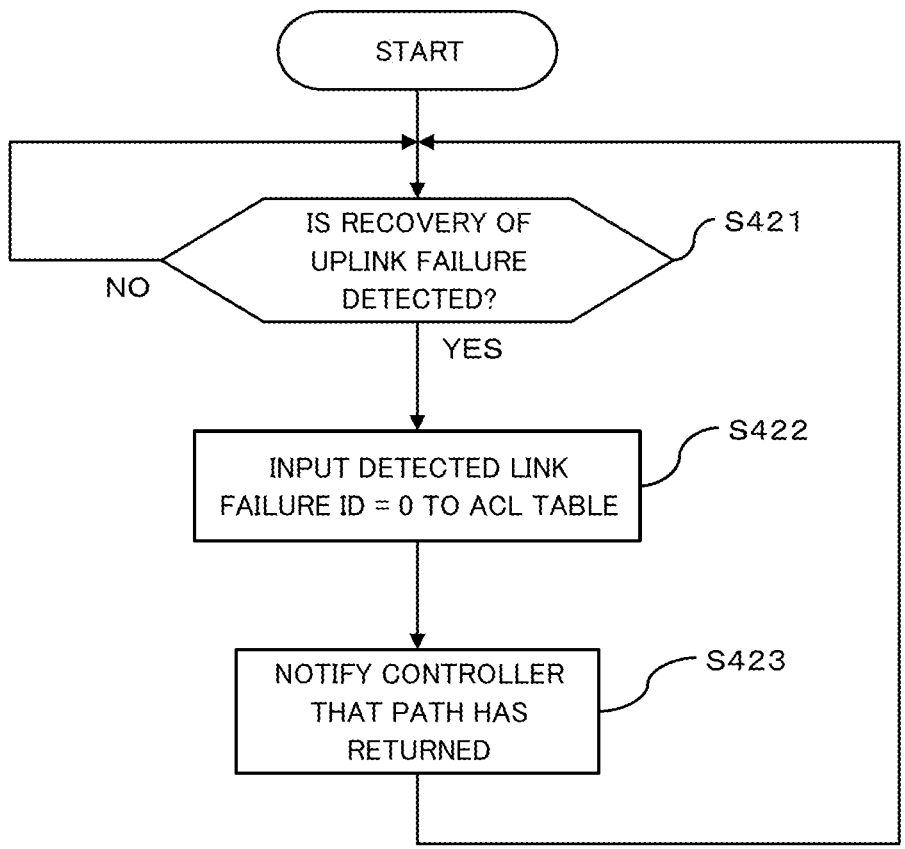
FIG. 33 is a flowchart illustrating a process of returning the path to the state before switching when an uplink failure is recovered in the switch as an example of the embodiment.

Next, a process of returning to the state before the path is switched when the uplink failure is recovered in the switch as an example of the embodiment will be described with reference to the flowchart (Steps S421 to S423) illustrated in FIG. 33.

The link state monitoring controller 116 determines whether the recovery of the uplink (root node side) failure is detected (Step S421).

When the recovery of the uplink (root node side) failure is not detected (see a NO route in Step S421), the process returns to Step S421.

On the other hand, when the recovery of the uplink (root node side) failure is detected (see a YES route in Step S421), the link state monitoring controller 116 inputs the detected link failure ID=0 to the ACL table 220 (Step S422) and returns the path to the state before the link failure occurs.

The link state monitoring controller 116 notifies the controller 20 that the path has returned to the state before the link failure occurs (Step S423) and the process returns to Step S421.

[A-3] Effect

Next, the effect of the network system 1 as an example of the embodiment will be described with reference to FIGS. 34 to 37.

Figure 34:
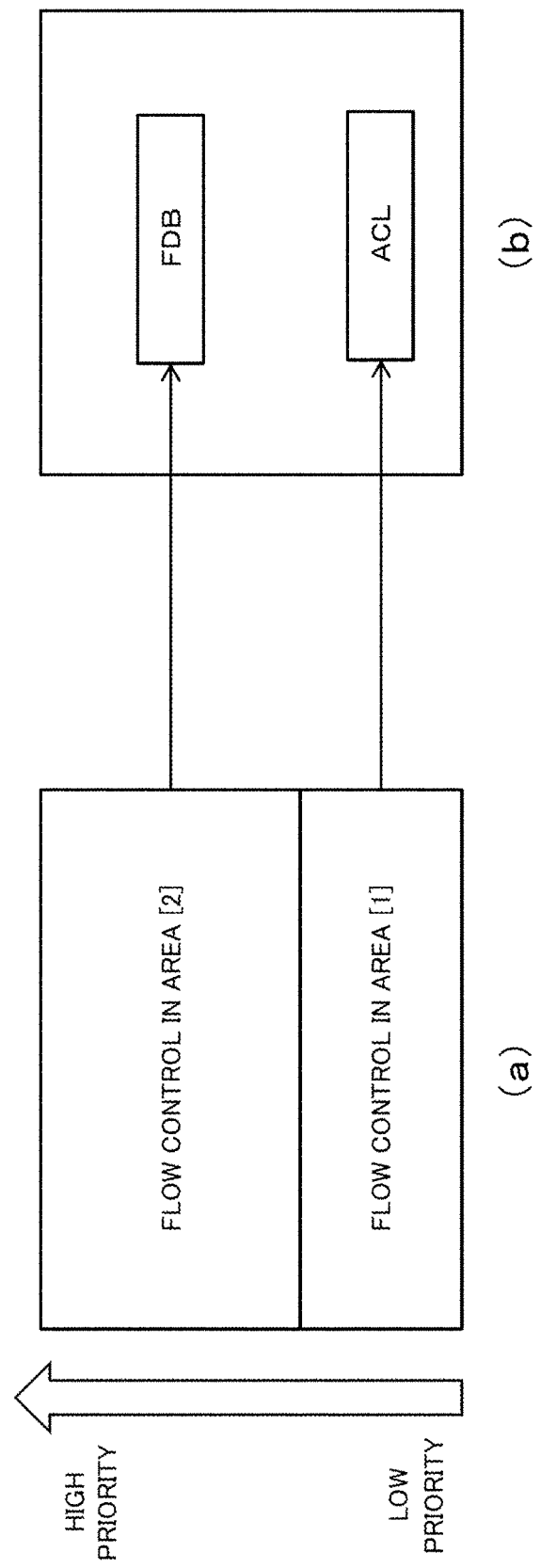
FIG. 34 is a diagram schematically illustrating an Open-Flow table and a commodity switch used by the network system as an example of the embodiment.

FIG. 34 is a diagram schematically illustrating an Open-Flow table (see reference symbol (a)) and a commodity switch (see reference symbol (b)) used by the network system as an example of the embodiment.

As illustrated in FIG. 34, the FDB control unit 132 performs flow control based on the FDB in the area [2] with high priority and the ACL control unit 122 performs flow control based on the ACL modified with an ingress port in the area [1] with low priority.

Therefore, in OpenFlow 1.0 capable switch semantics, hardware using a high-capacity FDB can be mapped to the commodity switch and it is possible to reduce the usage of the ACL.

Figure 35:
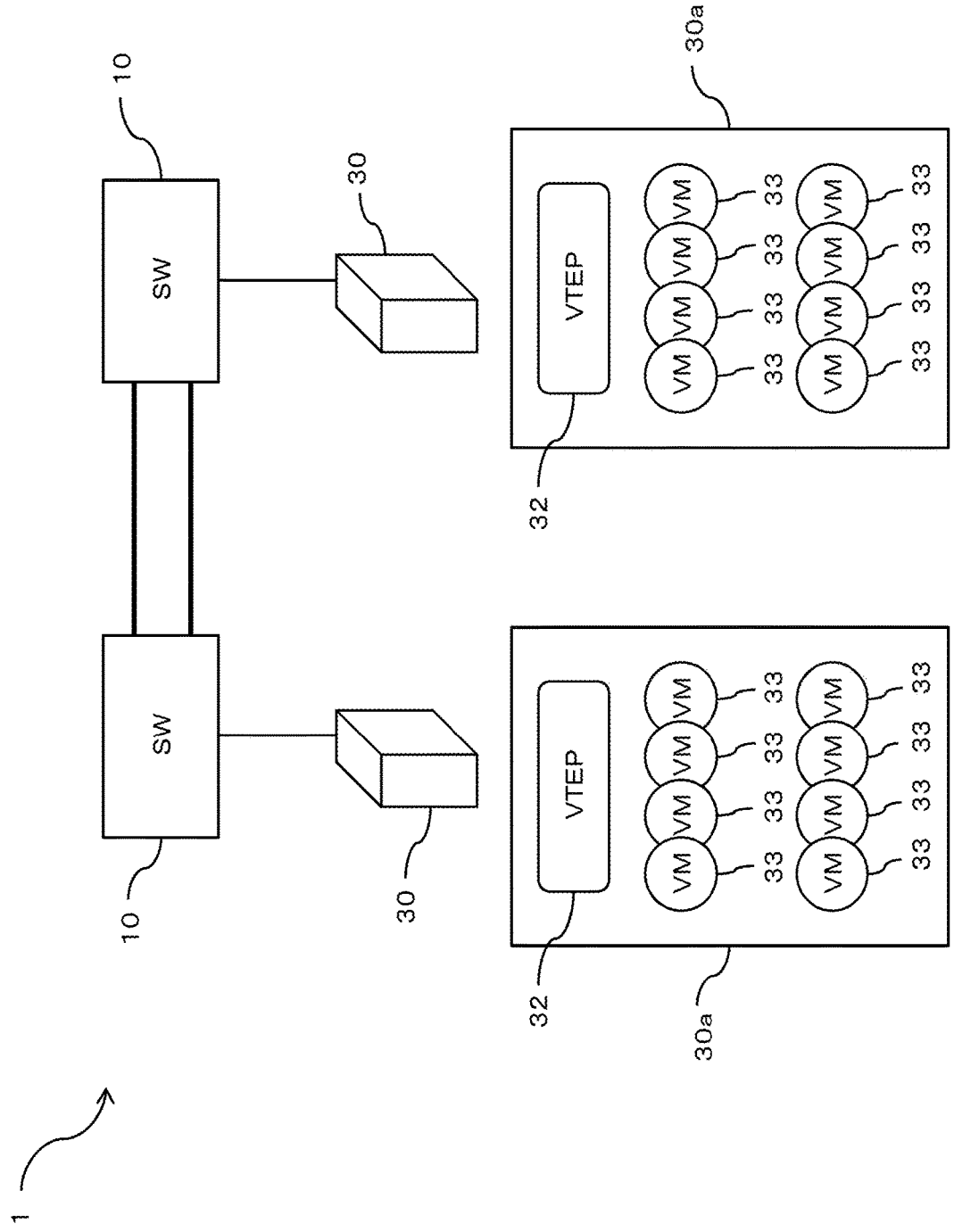
FIG. 35 is a diagram illustrating the back-to-back structure of the network system as an example of the embodiment.
Figure 36:
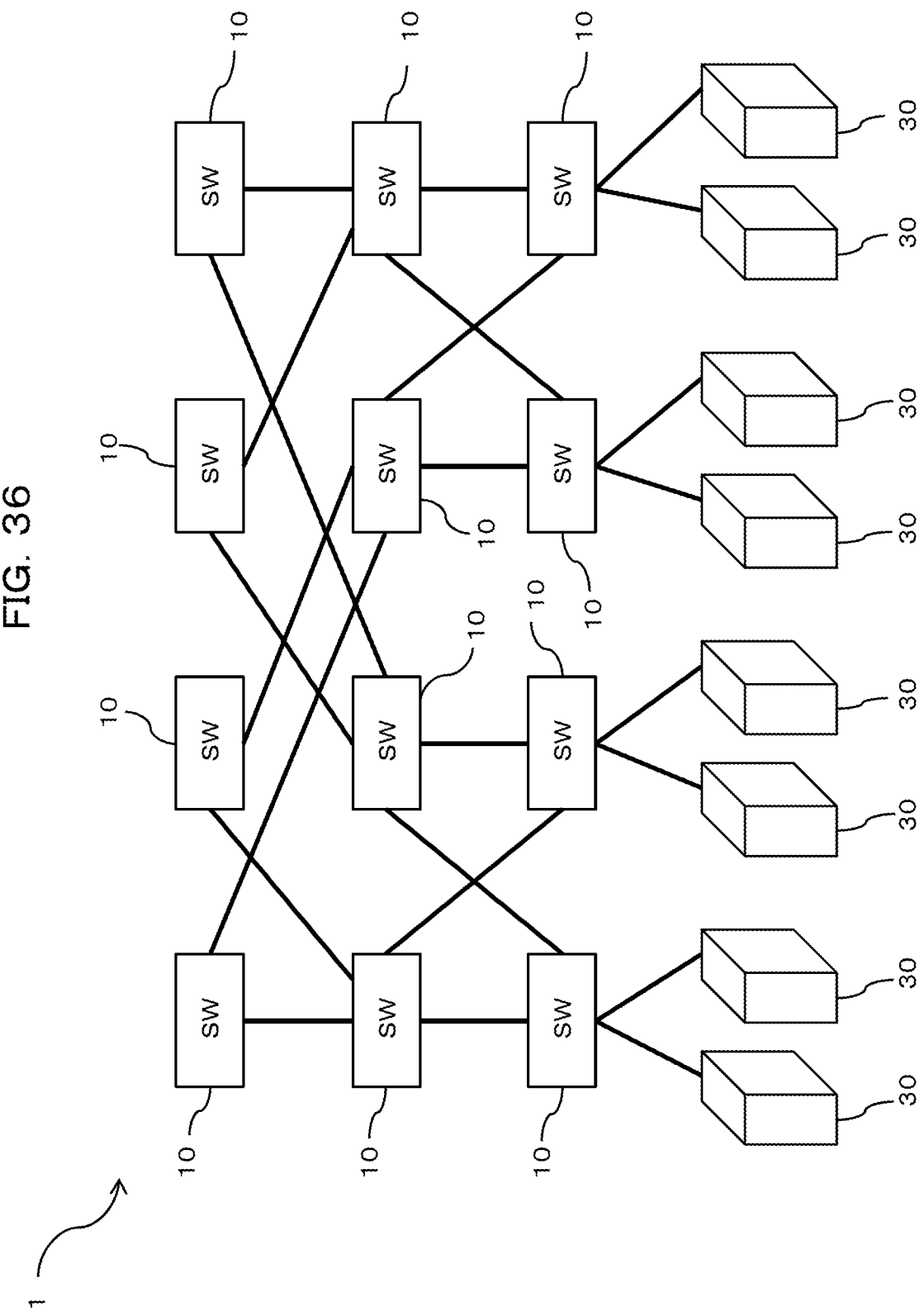
FIG. 36 is a diagram illustrating the fat tree structure of the network system as an example of the embodiment.

FIG. 35 is a diagram illustrating the back-to-back structure of the network system as an example of the embodiment and FIG. 36 is a diagram illustrating the fat tree structure thereof. FIG. 37 is a diagram illustrating the number of entries used in a network system according to the related art and the network system as an example of this embodiment.

A network system 1 illustrated in FIG. 35 has the back-to-back structure and includes two switches (SW) 10, two server apparatuses 30, and a controller 20 (not illustrated).

The server apparatus 30 forms a virtual environment 30a and deploys a VTEP 32 and eight VMs 33.

As illustrated in FIG. 37, in the back-to-back structure illustrated in FIG. 35, the network system according to the related art consumes 128 entries per switch as Total #Flow table entries per switch. In contrast, the network system 1 as an example of this embodiment consumes three entries per switch 10 as Total #Flow table entries per switch.

A network system 1 illustrated in FIG. 36 has the fat tree structure and includes twelve switches (SW) 10, eight server apparatuses 30, and a controller 20 (not illustrated).

The server apparatus 30 forms the same virtual environment 30a as the server apparatus 30 illustrated in FIG. 35 and deploys a VTEP 32 and eight VMs 33.

As illustrated in FIG. 37, in the fat tree structure illustrated in FIG. 36, the network system according to the related art consumes 3584 entries per switch as Total #Flow table entries per switch. In contrast, the network system 1 as an example of this embodiment consumes twelve entries per switch 10 as Total #Flow table entries per switch.

As such, according to the network system 1 as an example of this embodiment, it is possible to reduce the number of entries consumed in each switch 10.

The switch 10 applies a mask corresponding to the plurality of numbers of first rule information items 200 to a predetermined position of the header information of an input packet and performs control the input packet on the basis of the first rule information 200 which is selected from the first storage unit 121 on the basis of the header information after masking. That is, the mask value is determined by the number of connections between each switch 10 and another switch 10 on the upstream side to determine the number of entries consumed on the basis of the number of connections, without depending on the number of VMs or the number of servers. Therefore, it is possible to reduce the number of entries used by each switch 10.

When the second rule information 300 corresponding to the address of the input packet is stored in the second storage unit 131, the second packet transmission controller controls the transmission of the input packet on the basis of the second rule information 300. When the second rule information 300 corresponding to the address of the input packet is not stored in the second storage unit 131, the first packet transmission controller controls the transmission of the input packet on the basis of the first rule information 200 corresponding to the input packet. Therefore, since the FDB is used in the area from the turning point A to the transmission destination device, it is possible to reduce the number of entries used in the ACL.

According to the network system 1 as an example of this embodiment, a communication path is effectively switched when a failure occurs.

When detecting a failure in the communication path on the root node side, the link state monitoring controller 116 rewrites the ACL table 220 indicating the transmission destination of a packet to switch a plurality of communication paths. Therefore, the switch 10 which detects a link failure on the root node side performs path switching at a high speed without inquiring of the controller 20 and can output a packet to a usable communication path without a link failure.

When detecting a failure in the communication path on the leaf node side, the switch cooperation unit 117 notifies another connected switch 10 of the position where the failure occurs. Then, the link state monitoring controller 116 rewrites the ACL table 220 on the basis of the notification from another connected switch 10 to switch a plurality of communication paths. Therefore, a switch 10 which receives a link failure occurrence notification from another switch 10 that detects a failure on the leaf node side performs path switching at a high speed, without inquiring of the controller 20, and can output a packet to a usable communication path without a link failure.

When there is no usable communication path on the root node side on the basis of the notification from another connected switch 10, the switch cooperation unit 117 transmits a notification to another connected switch 10. Therefore, even when there is no usable communication path on the root node side of the switch 10 which has received the link failure occurrence notification, it is possible to perform path switching and to transmit a packet.

[B] Modifications

The disclosed technique is not limited to the above-described embodiment and various modifications and changes of the disclosed technique can be made without departing from the scope and spirit of this embodiment.

Each structure and each process according to this embodiment can be appropriately selected or combined, if necessary.

[B-1] First Modification

Figure 38:
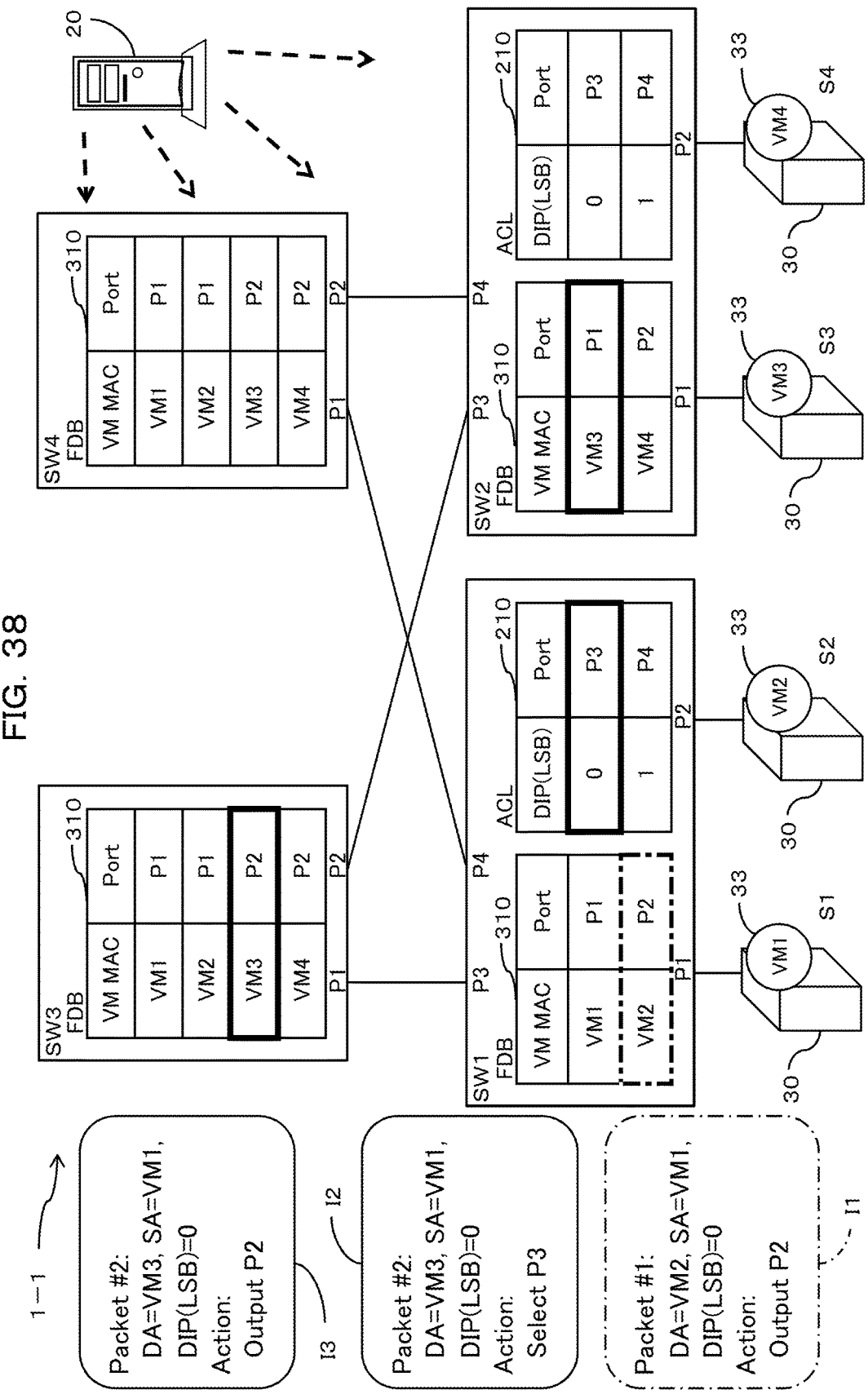
FIG. 38 is a diagram illustrating flow control in the fat tree structure of a network system according to a first modification of the embodiment.

FIG. 38 is a diagram illustrating flow control in the fat tree structure of a network system as a first modification of the embodiment.

In an example of the above-described embodiment, the network system 1 in the overlay environment of the VXLAN has been described. However, in the first modification of this embodiment, a case in which the packet is not encapsulated and a MAC table is used as the FDB will be described.

A network system 1-1 illustrated in FIG. 38 has the fat tree structure and includes four switches 10 (SW1 to SW4), a controller 20, and four server apparatuses 30 (S1 to S4).

Hereinafter, in the description with reference to FIG. 38, when a specific switch 10 is designated, it is simply represented by "SW1", "SW2", "SW3", or "SW4". In addition, hereinafter, in the description with reference to FIG. 38, when a specific server apparatus 30 is designated, it is simply represented by "S1", "S2", "S3", or "S4". In addition, it is assumed that the value of DIP (LSB) is obtained by masking DIP with a mask value 0x000000000001 and DIP is masked by the mask value when an ACL is searched for, which is not illustrated in FIG. 38 for simplicity of illustration.

As illustrated in FIG. 38, S1 to S4 each deploy a VM 33 (VM 1 to VM 4). In the example illustrated in FIG. 38, each server apparatus 30 deploys one VM 33. However, the modification is not limited thereto. For example, each server apparatus 30 may deploy two or more VMs 33.

Hereinafter, in the description with reference to FIG. 38, when a specific VM 33 is designated, it is simply represented by "VM 1", "VM2", "VM 3", or "VM 4".

First, a transmission unit 211 of the controller 20 proactively sets (transmits) the entries (an FDB table 310 and an ACL table 210) of an FDB and the ACL to each switch 10. Specifically, the transmission unit 211 stores the FDB table 310 in an FDB storage unit 131 of a memory 130 and stores the ACL table 210 in an ACL storage unit 121 of a TCAM 120. In FIG. 38, the ACL tables 210 of SW3 and SW4 are not illustrated. However, the transmission unit 211 may set the ACL table 210 to SW3 and SW4.

In FIG. 38, an example in which VM1 (S1) transmits packet #1 to VM2 (S2) will be described and then an example in which VM1 (S1) transmits packet #2 to VM3 (S3) will be described.

As represented by reference numeral I1, VM2, VM1, and 0 are set to the DA, SA, and DIP (LSB) of packet #1, respectively. In addition, DIP and LSB indicate a destination IP address and a least small bit, respectively, and DIP (LSB) indicates the most significant bit of DIP.

An FDB control unit 132 of SW1 checks whether an action when DA is VM2 is stored, with reference to the FDB table 310. Here, since Port=P2 is stored with respect to VM MAC=VM2 in the FDB table 310 of SW1, the FDB control unit 132 outputs a packet from a P2 port as an action. That is, the FDB control unit 132 transmits a packet to VM2 (S2) through the P2 port of SW1.

In the example illustrated in FIG. 38 in which packet #1 is transmitted, it is assumed that SW1 which performs FDB-based flow control first is a turning point A.

Next, the example in which VM1 (S1) transmits packet #2 to VM3 (S3) will be described.

As represented by reference numeral I2, VM3, VM1, and 0 are set to the DA, SA, and DIP (LSB) of packet #2, respectively.

The FDB control unit 132 of SW1 checks whether an action when DA is VM3 is stored, with reference to the FDB table 310. Here, since VM3 is not stored in the FDB table 310 of SW1, an ACL control unit 122 of SW1 checks an action when DIP (LSM) is 0, with reference to the ACL table 210. Here, since Port=P3 is stored with respect to DIP (LSB)=0 in the ACL table 210 of SW1, the ACL control unit 122 of SW1 selects a P3 port as the action, as represented by reference numeral I2. That is, the ACL control unit 122 transmits a packet to SW3 through the P3 port of SW1.

An FDB control unit 132 of SW3 checks whether an action when DA is VM3 is stored, with reference to the FDB table 310. Here, since Port=P2 is stored with respect to VM MAC=VM3 in the FDB table 310 of SW3, the FDB control unit 132 outputs a packet from the P2 port as the action, as represented by reference numeral I3. That is, the FDB control unit 132 transmits a packet to SW2 through the P2 port of SW3.

In the example illustrated in FIG. 38 in which packet #2 is transmitted, it is assumed that SW3 which performs FDB-based flow control first is the turning point A.

An FDB control unit 132 of SW2 checks whether an action when DA is VM3 is stored, with reference to the FDB table 310. Here, since Port=P1 is stored with respect to VM MAC=VM3 in the FDB table 310 of SW3, the FDB control unit 132 outputs a packet from the P1 port as the action. That is, the FDB control unit 132 transmits a packet to S3 through the P1 port of SW2.

[B-2] Second Modification

Figure 39:
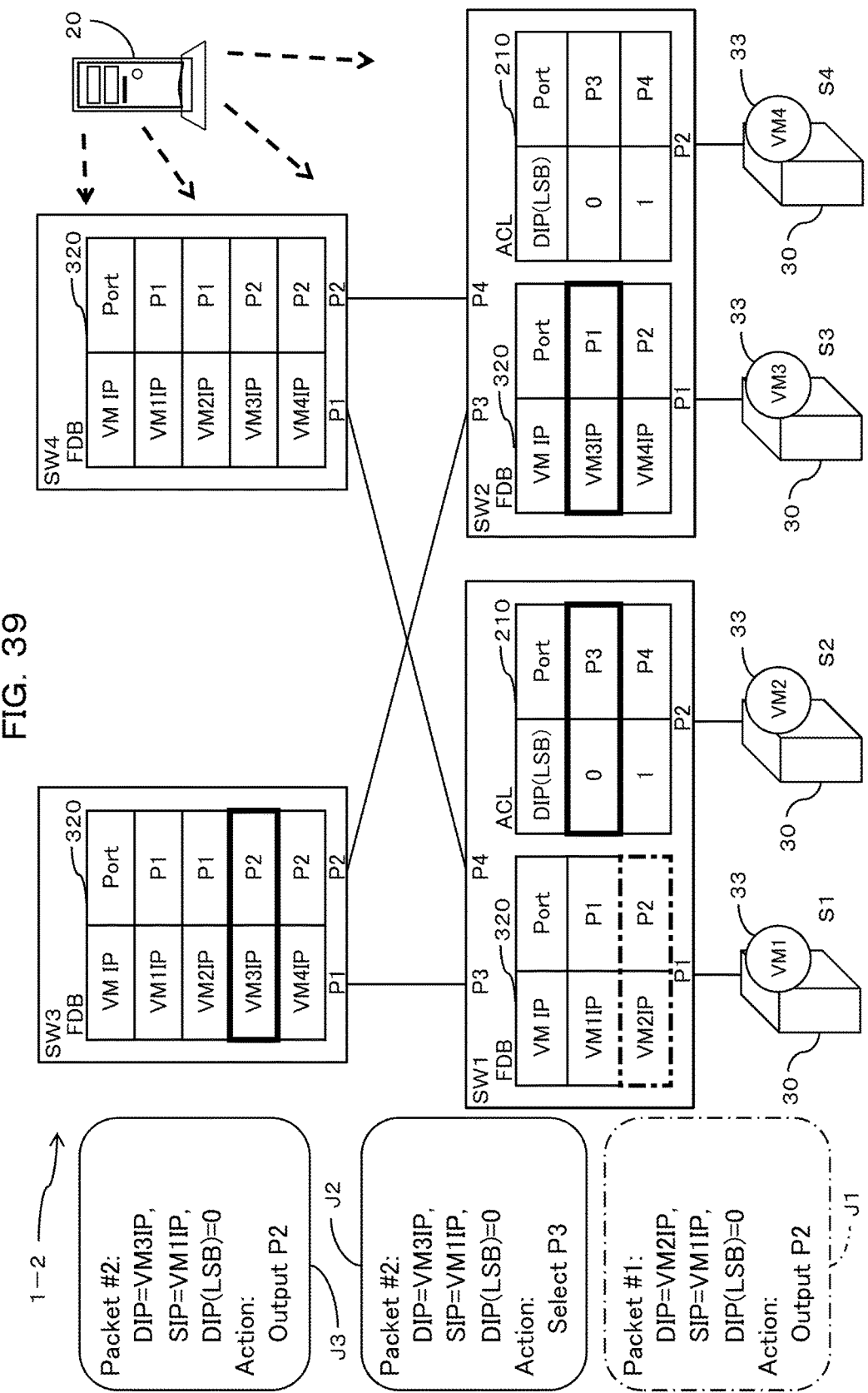
FIG. 39 is a diagram illustrating flow control in the fat tree structure of a network system according to a second modification of the embodiment.

FIG. 39 is a diagram illustrating flow control in the fat tree structure of a network system as a second modification of the embodiment.

In an example of the above-described embodiment, the network system 1 in the overlay environment of the VXLAN has been described. However, in the second modification of this embodiment, a case in which a packet is not encapsulated and a static IP routing table is used as the FDB will be described.

A network system 1-2 illustrated in FIG. 39 has the fat tree structure and includes four switches 10 (SW1 to SW4), a controller 20, and four server apparatuses 30 (S1 to S4).

Hereinafter, in the description with reference to FIG. 39, when a specific switch 10 is designated, it is simply represented by "SW1", "SW2", "SW3", or "SW4". In addition, hereinafter, in the description with reference to FIG. 39, when a specific server apparatus 30 is designated, it is simply represented by "S1", "S2", "S3", or "S4". It is assumed that the value of DIP (LSB) is obtained by masking DIP with a mask value 0x000000000001 and DIP is masked by the mask value when an ACL is searched for, which is not illustrated in FIG. 39 for simplicity of illustration.

As illustrated in FIG. 39, S1 to S4 each deploy a VM 33 (VM1 to VM4). In the example illustrated in FIG. 39, each server apparatus 30 deploys one VM 33. However, the modification is not limited thereto. For example, each server apparatus 30 may deploy two or more VMs 33.

Hereinafter, in the description with reference to FIG. 39, when a specific VM 33 is designated, it is simply represented by "VM1", "VM2", "VM 3", or "VM 4".

First, a transmission unit 211 of the controller 20 proactively sets (transmits) the entries (an FDB table 320 and an ACL table 210) of an FDB and the ACL to each switch 10. Specifically, the transmission unit 211 stores the FDB table 320 in an FDB storage unit 131 of a memory 130 and stores the ACL table 210 in an ACL storage unit 121 of a TCAM 120. In FIG. 39, the ACL tables 210 of SW3 and SW4 are not illustrated. However, the transmission unit 211 may set the ACL table 210 to SW3 and SW4.

In FIG. 39, an example in which VM1 (S1) transmits packet #1 to VM2 (S2) will be described and then an example in which VM1 (S1) transmits packet #2 to VM3 (S3) will be described.

As represented by reference numeral J1, VM2IP, VM1IP, and 0 are set to the DIP, SIP, and DIP (LSB) of packet #1, respectively. In addition, SIP indicates a source IP address.

An FDB control unit 132 of SW1 checks whether an action when DIP is VM2IP is stored, with reference to the FDB table 320. Here, since Port=P2 is stored with respect to VM IP=VM2IP in the FDB table 320 of SW1, the FDB control unit 132 outputs a packet from a P2 port as the action. That is, the FDB control unit 132 transmits a packet to VM2 (S2) through the P2 port of SW1.

In the example illustrated in FIG. 39 in which packet #1 is transmitted, it is assumed that SW1 which performs FDB-based flow control first is a turning point A.

Next, the example in which VM1 (S1) transmits packet #2 to VM3 (S3) will be described.

As represented by reference numeral J2, VM3IP, VM1IP, and 0 are set to the DIP, SIP, and DIP (LSB) of packet #2, respectively.

The FDB control unit 132 of SW1 checks whether an action when DIP is VM3IP is stored, with reference to the FDB table 320. Here, since VM3IP is not stored in the FDB table 320 of SW1, an ACL control unit 122 of SW1 checks an action when DIP (LSM) is 0, with reference to the ACL table 210. Here, since Port=P3 is stored with respect to DIP (LSB)=0 in the ACL table 210 of SW1, the ACL control unit 122 of SW1 selects a P3 port as the action, as represented by reference numeral J2. That is, the ACL control unit 122 transmits a packet to SW3 through the P3 port of SW1.

An FDB control unit 132 of SW3 checks whether an action when DIP is VM3IP is stored, with reference to the FDB table 320. Here, since Port=P2 is stored with respect to VM IP=VM3IP in the FDB table 320 of SW3, the FDB control unit 132 outputs a packet from the P2 port as the action, as represented by reference numeral J3. That is, the FDB control unit 132 transmits a packet to SW2 through the P2 port of SW3.

In the example illustrated in FIG. 39 in which packet #2 is transmitted, it is assumed that SW3 which performs FDB-based flow control first is the turning point A.

An FDB control unit 132 of SW2 checks whether an action when DIP is VM3IP is stored, with reference to the FDB table 320. Here, since Port=P1 is stored with respect to VM IP=VM3IP in the FDB table 320 of SW3, the FDB control unit 132 outputs a packet from the P1 port as the action. That is, the FDB control unit 132 transmits a packet to S3 through the P1 port of SW2.

[B-3] Effect of First and Second Modifications of Embodiment

Hereinafter, the effect of the network systems 1-1 and 1-2 according to the first and second modifications of this embodiment will be described with reference to FIG. 40.

FIG. 40 is a diagram illustrating the number of entries used in the network system according to the related art and the network systems according to the first and second modifications of this embodiment.

As illustrated in FIG. 40, in the back-to-back structure illustrated in FIG. 35, the network system according to the related art consumes 128 entries per switch as Total #Flow table entries per switch. In contrast, the network systems 1-1 and 1-2 according to the first and second modifications of this embodiment consume 18 entries per switch 10 as Total #Flow table entries per switch.

As illustrated in FIG. 40, in the fat tree structure illustrated in FIG. 36, the network system according to the related art consumes 3584 entries per switch as Total #Flow table entries per switch. In contrast, the network systems 1-1 and 1-2 according to the first and second modifications of this embodiment consume 68 entries per switch 10 as Total #Flow table entries per switch.

As such, in the network systems 1-1 and 1-2 according to the first and second modifications of this embodiment, it is possible to reduce the number of entries consumed in each switch 10, similarly to the network system 1 according to an example of the embodiment.

[B-4] Third Modification

FIG. 41A is a diagram illustrating a state before an ACL table is rewritten in a switch according to a third modification of the embodiment and FIG. 41B is a diagram illustrating a state after the rewriting.

As illustrated in FIGS. 41A and 41B, an ACL table 230 according to the third modification of this embodiment stores L4 sport and Port, similarly to the ACL table 200 illustrated in FIGS. 14 and 15.

A transmission unit 211 of a controller 20 proactively sets (transmits) the entries of an FDB and an ACL (an FDB table 300 illustrated in FIG. 19 and an ACL table 230 illustrated in FIG. 41A) to each switch 10.

For example, when a link failure occurs between the P3 port of SW11 and the P1 port of SW21 illustrated in FIG. 19 (see reference numeral M2 in FIG. 19), a link state monitoring controller 116 of SW11 rewrites an output destination port for L4 sport=0 to Port=P4, as illustrated in FIG. 41B. In addition, as illustrated in FIG. 41B, SW12 which receives a link failure occurrence notification from SW21 that has detected a link failure represented by reference numeral M2 in FIG. 19 also rewrites the output destination port for L4 sport=0 to Port=P4.

That is, the link state monitoring controller 116 rewrites the communication path of the output destination of a packet in the ACL table 230 to switch a plurality of communication paths.

As such, in the network system 1 according to the third modification of this embodiment, similarly to the network system 1 according to an example of the embodiment, it is possible to effectively switch a communication path when a failure occurs.

According to the disclosed information processing system, it is possible to effectively switch a communication path when a failure occurs.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing system comprising:
a plurality of switching device groups including a plurality of switching devices that include a switching device as a root node and switching devices as leaf nodes which are connected to an information processing apparatus, the plurality of switching devices being connected in a tree topology,
wherein a first switching device among the plurality of switching devices includes:
a controller that, when a failure that occurs in a communication path directly connected without another switching device to the root node side of the first switching device is detected, writes identification information indicating the communication path from which the failure is detected to a flow table which stores the identification information and output destination port information indicating a communication path of an output destination of a packet so as to be associated with each other, thereby switching a plurality of communication paths; and
a processor configured to, when a failure that occurs in a communication path directly connected without the another switching device to the leaf node side of the first switching device is detected, notify the another switching device connected to the first switching device of a position where the failure occurs,
the flow table stores, as rule information, the identification information and the output destination port information so as to be associated with header information after masking which is obtained by applying a mask corresponding to the number of output destination port information items to a predetermined position of header information of an input packet, the mask being determined according to the number of a communication path to a destination of the packet,
the switching device controls the input packet based on the rule information which is selected based on the header information after masking, and
the controller rewrites the flow table based on the notification from the another switching device connected to the switching device to switch the plurality of communication paths.

2. The information processing system according to claim 1, wherein the processor transmits the notification to the another switching device connected to the switching device when there is no usable communication path on the root node side of the switching device based on the notification from the another switching device connected to the switching device.

3. The information processing system according to claim 1, wherein the switching device transmits the packet to an output destination port corresponding to the identification information when the identification information has been registered in the flow table.

4. The information processing system according to claim 1, wherein, when switching the plurality of communication paths, the controller notifies a network control device which is communicably connected to the plurality of switching devices that the communication paths have been switched.

5. A switching device that is provided an information processing system including a plurality of switching device groups of a plurality of switching devices that include a switching device as a root node and switching devices as leaf nodes which are connected to an information processing apparatus, the plurality of switching devices being connected in a tree topology, the switching device among the plurality of switching devices comprising:
a controller that, when a failure that occurs in a communication path directly connected without another switching device to the root node side of the switching device is detected, writes identification information indicating the communication path from which the failure is detected to a flow table which stores the identification information and output destination port information indicating a communication path of an output destination of a packet so as to be associated with each other, thereby switching a plurality of communication paths; and
a processor configured to, when a failure that occurs in a communication path directly connected without the another switching device to the leaf node side of the switching device is detected, notify the another switching device connected to the switching device of a position where the failure occurs,
the flow table stores, as rule information, the identification information and the output destination port information so as to be associated with header information after masking which is obtained by applying a mask corresponding to the number of output destination port information items to a predetermined position of header information of an input packet, the mask being determined according to the number of a communication path to a destination of the packet, the switching device controls the input packet based on the rule information which is selected based on the header information after masking, and the controller rewrites the flow table based on the notification from the another switching device connected to the switching device to switch the plurality of communication paths.

6. The switching device according to claim 5, wherein the processor transmits the notification to the another switching device connected to the switching device when there is no usable communication path on the root node side of the switching device based on the notification from the another switching device connected to the switching device.

7. The switching device according to claim 5, wherein, when switching the plurality of communication paths, the controller notifies a network control device which is communicably connected to the plurality of switching devices that the communication paths have been switched.

8. A method of controlling an information processing system including a plurality of switching device groups of a plurality of switching devices that include a switching device as a root node and switching devices as leaf nodes which are connected to an information processing apparatus, the plurality of switching devices being connected in a tree topology, the method comprising:

by a first switching device among the plurality of switching devices, when a failure that occurs in a communication path directly connected without another switching device to the root node side of the first switching device is detected, writing identification information indicating the communication path, from which the failure is detected, to a flow table which stores the identification information and output destination port information indicating a communication path of an output destination of a packet so as to be associated with each other, thereby switching a plurality of communication paths; and when a failure that occurs in a communication path directly connected without the another switching device to the leaf node side of the first switching device is detected, notifying the another switching device connected to the first switching device of a position where the failure occurs, the flow table stores, as rule information, the identification information and the output destination port information so as to be associated with header information after masking which is obtained by applying a mask corresponding to the number of output destination port information items to a predetermined position of header information of an input packet, the mask being determined according to the number of a communication path to a destination of the packet, controlling the input packet based on the rule information which is selected based on the header information after masking, and rewriting the flow table based on the notification from the another switching device connected to the switching device to switch the plurality of communication paths.

9. The method of controlling an information processing system according to claim 8, further comprising:

transmitting the notification to the another switching device connected to the switching device when there is no usable communication path on the root node side of the switching device based on the notification from the another switching device connected to the switching device.

10. The information processing system according to claim 1, wherein the first switching device further includes:

a detector that detects a failure in a communication path directly connected without another switching device to the root node side and the leaf node side of the first switching device, and wherein the controller switches the plurality of communication paths when the failure that occurs in the root node side of the first switching device is detected by the detector, and the processor notifies of the position where the failure occurs when the failure that occurs in the leaf node side of the first switching device is detected by the detector.

11. The switching device according to claim 5, further comprising:

a detector that detects a failure in a communication path directly connected without another switching device to the root node side and the leaf node side of the switching device, wherein the controller switches the plurality of communication paths when the failure that occurs in the root node side of the switching device is detected by the detector, and the processor notifies of the position where the failure occurs when the failure that occurs in the leaf node side of the switching device is detected by the detector.

12. The method of controlling an information processing system according to claim 8, further comprising:

detecting a failure in a communication path directly connected without another switching device to the root node side and the leaf node side of the first switching device, wherein the switching includes switching the plurality of communication paths when the failure that occurs in the root node side of the first switching device is detected by the detecting, and the notifying includes notifying of the position where the failure occurs when the failure that occurs in the leaf node side of the first switching device is detected by the detecting.

* * * * *